United States Patent
Debes et al.

(10) Patent No.: US 8,346,838 B2
(45) Date of Patent: *Jan. 1, 2013

(54) METHOD AND APPARATUS FOR EFFICIENT INTEGER TRANSFORM

(75) Inventors: Eric Debes, Santa Clara, CA (US); William W. Macy, Palo Alto, CA (US); Jonathan J. Tyler, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 12/560,225

(22) Filed: Sep. 15, 2009

(65) Prior Publication Data

US 2010/0011042 A1    Jan. 14, 2010

Related U.S. Application Data

(63) Continuation of application No. 10/749,738, filed on Dec. 30, 2003, now Pat. No. 7,624,138, which is a continuation-in-part of application No. 09/952,891, filed on Oct. 29, 2001, now Pat. No. 7,085,795.

(51) Int. Cl.
*G06F 7/38* (2006.01)
(52) U.S. Cl. ........................................... 708/523
(58) Field of Classification Search ................ None
See application file for complete search history.

(56) References Cited

U.S. PATENT DOCUMENTS

| | | | |
|---|---|---|---|
| 3,711,692 A | 1/1973 | Batcher | |
| 3,723,715 A | 3/1973 | Chen et al. | |
| 4,139,899 A | 2/1979 | Tulpule et al. | |
| 4,161,784 A | 7/1979 | Cushing et al. | |
| 4,393,468 A | 7/1983 | New | |
| 4,418,383 A | 11/1983 | Doyle et al. | |
| 4,490,786 A | 12/1984 | Nakatani | |
| 4,498,177 A | 2/1985 | Larson | |
| 4,707,800 A | 11/1987 | Montrone et al. | |
| 4,771,379 A | 9/1988 | Ando et al. | |
| 4,903,228 A | 2/1990 | Gregoire et al. | |
| 4,989,168 A | 1/1991 | Kuroda et al. | |

(Continued)

OTHER PUBLICATIONS

Avaro, Olivier, et al., *MPEG-4 Systems Overview and Architecture*, woody.imag.fr/MPEG4/syssite/syspub/docs/tutorial/, May 28, 1998, pp. 1-71 plus Yahoo site ref.

(Continued)

*Primary Examiner* — David H Malzahn
(74) *Attorney, Agent, or Firm* — Blakely, Sokoloff, Taylor & Zafman LLP

(57) ABSTRACT

A method and apparatus for including in a processor instructions for performing integer transforms including multiply-add operations and horizontal-add operations on packed data. In one embodiment, a processor is coupled to a memory that stores a first packed byte data and a second packed byte data. The processor performs operations on said first packed byte data and said second packed byte data to generate a third packed data in response to receiving a multiply-add instruction. A plurality of the 16-bit data elements in this third packed data storing the result of performing multiply-add operations on data elements in the first and second packed byte data. The processor adds together at least a first and a second 16-bit data element of the third packed data in response to receiving an horizontal-add instruction to generate a 16-bit result as one of a plurality of data elements of a fourth packed data.

21 Claims, 40 Drawing Sheets

U.S. PATENT DOCUMENTS

| | | | |
|---|---|---|---|
| 5,019,968 | A | 5/1991 | Wang et al. |
| 5,081,698 | A | 1/1992 | Kohn |
| 5,095,457 | A | 3/1992 | Jeong |
| 5,168,571 | A | 12/1992 | Hoover et al. |
| 5,187,679 | A | 2/1993 | Vassiliadis et al. |
| 5,268,995 | A | 12/1993 | Diefendorff et al. |
| 5,321,810 | A | 6/1994 | Case et al. |
| 5,390,135 | A | 2/1995 | Lee et al. |
| 5,408,670 | A | 4/1995 | Davies |
| 5,423,010 | A | 6/1995 | Mizukami |
| 5,426,783 | A | 6/1995 | Norrie et al. |
| 5,465,374 | A | 11/1995 | Dinkjian et al. |
| 5,487,159 | A | 1/1996 | Byers et al. |
| 5,497,497 | A | 3/1996 | Miller et al. |
| 5,524,256 | A | 6/1996 | Turkowski |
| 5,579,253 | A | 11/1996 | Lee et al. |
| 5,594,437 | A | 1/1997 | O'Malley |
| 5,625,374 | A | 4/1997 | Turkowski |
| 5,680,161 | A | 10/1997 | Lehman et al. |
| 5,781,457 | A | 7/1998 | Cohen et al. |
| 5,819,117 | A | 10/1998 | Hansen |
| 5,822,619 | A | 10/1998 | Sidwell |
| 5,838,984 | A | 11/1998 | Nguyen et al. |
| 5,859,997 | A | 1/1999 | Peleg et al. |
| 5,909,572 | A | 6/1999 | Thayer et al. |
| 5,933,650 | A | 8/1999 | van Hook et al. |
| 5,983,253 | A * | 11/1999 | Fischer et al. ............... 708/300 |
| 6,041,404 | A | 3/2000 | Roussel et al. |
| 6,115,812 | A | 9/2000 | Abdallah et al. |
| 6,192,467 | B1 | 2/2001 | Abdallah et al. |
| 6,211,892 | B1 | 4/2001 | Huff et al. |
| 6,212,618 | B1 * | 4/2001 | Roussel ..................... 712/7 |
| 6,223,277 | B1 | 4/2001 | Karguth |
| 6,243,803 | B1 * | 6/2001 | Abdallah et al. ............ 712/210 |
| 6,288,723 | B1 | 9/2001 | Huff et al. |
| 6,377,970 | B1 * | 4/2002 | Abdallah et al. ............ 708/603 |
| 6,381,690 | B1 | 4/2002 | Lee |
| 6,385,634 | B1 * | 5/2002 | Peleg et al. ................. 708/490 |
| 6,484,255 | B1 | 11/2002 | Dulong |
| 6,546,480 | B1 | 4/2003 | Mandavilli et al. |
| 6,745,319 | B1 | 6/2004 | Balmer et al. |
| 6,816,961 | B2 | 11/2004 | Rice et al. |
| 7,085,795 | B2 | 8/2006 | Debes et al. |
| 7,516,307 | B2 * | 4/2009 | Abdallah et al. ............ 712/222 |
| 2001/0016902 | A1 | 8/2001 | Abdallah et al. |
| 2001/0032228 | A1 * | 10/2001 | Fischer et al. ............... 708/622 |
| 2002/0002666 | A1 | 1/2002 | Dulong et al. |
| 2002/0059355 | A1 * | 5/2002 | Peleg et al. ................. 708/603 |
| 2002/0103841 | A1 * | 8/2002 | Parviainen .................. 708/523 |
| 2002/0112147 | A1 | 8/2002 | Chennupaty et al. |
| 2002/0159529 | A1 | 10/2002 | Wang et al. |
| 2002/0172287 | A1 | 11/2002 | Kim |
| 2003/0084082 | A1 | 5/2003 | Debes et al. |
| 2003/0123748 | A1 | 7/2003 | Sebot et al. |
| 2003/0131030 | A1 | 7/2003 | Sebot et al. |
| 2003/0231711 | A1 | 12/2003 | Zhang et al. |
| 2005/0188182 | A1 | 8/2005 | Hoyle et al. |

OTHER PUBLICATIONS

Bierling, M., *Displacement Estimation by Hierarchical Blockmatching*, SPIE, vol. 1001, Visual Communications and Image Processing, May 1998, pp. 942-951.

Chan, Y.L and W.C. Siu, *Adaptive Multiple-Candidate Hierarchical Search for Block Matching Algorithm*, IEE Electronics Letters, vol. 31, No. 19, Sep. 14, 1995, pp. 1637-1639.

Chan, Yui-Lam and Wan-Chi Siu, *New Adaptive Pixel Decimation for Block Motion Vector Estimation*, IEEE Transactions on Circuits and Systems on Video Technology, vol. 6, No. 1, Feb. 1996, pp. 113-118.

Chen, Liang-Gee, Wai-Ting Chen, Yeu-Shen Jehng Tzi-Dar Chuieh, *An Efficient Parallel Motion Estimation Algorithm for Digital Image Processing*, IEEE Transactions on Circuits and Systems on Video Technology, vol. 1, No. 4, Dec. 1991, pp. 378-384.

Cheng, K.W., S.C. Chan, *Fast Block Matching Algorithms for Motion Estimation*, ICASSP96, 1996, pp. 2318ff.

Corbal, Jesus, et al., *DLP+TLP Processors for the Next Generation of Media Workloads*, 0/7695-1019-1/01, IEEE, 2001, pp. 219-228.

Day, Neil, Ed., *Introduction to MPEG-7* (v.3.0), International Organization for Standardization, ISO/IEC JTC1/SC29/WG11, Coding of Moving Pictures and Audio, #N4032, Mar. 2001, pp. 1-10.

Dufaux, Frederic, et al., *Efficient, Robust, and Fast Global Motion Estimation for Video Coding*, 1057-7149/00, IEEE, 2000, pp. 497-501.

Eckart, Stefan, Chad Fogg, *ISO/IEC MPEG-2 Software Video Codec*, SPIE vol. 2419, Digital Video Compression: Algorithms and Technologies, 1995, San Jose, CA., 15 pages.

Edirisinghe, E.A., et al., *Shape Adaptive Padding for MPEG-4*, 0098 3063/00, IEEE, 2000, pp. 514-520.

Feng, J., Lo, K. T. Mehrpour, H. Karbowiak, A.E, *Adaptive Block-Matching Motion Estimation Algorithm for Video Coding*, IEE Electronics Letters, vol. 31, No. 18, 1995, pp. 1542-1543.

Furht, Botho, Joshua Greenberg, Raymond Westwater, *Motion Estimation Algorithm for Video Compression*, Kluwer Academic Publishers, Boston, 1997, pp. cover-vi, 11, 49-95.

Ghanbari, M., *The Cross-Search Algorithm for Motion Estimation*, IEEE Transactions on Communications, vol. 38, No. 7, Jul. 1990, pp. 950-953.

He, Zhongli, M.L. Liou, *A High Performance Fast Search Algorithm for Block Matching Motion Estimation*, IEEE Transactions on Circuits and Systems on Video Technology, vol. 7, No. 5, Oct. 1997, pp. 826-828.

He, Thong-Li, M.L. Liou, *Design of Fast Motion Estimation Algorithm based on Hardware Consideration*, IEEE Transactions on Circuits and Systems on Video Technology, vol. 7, No. 5, Oct. 1997, pp. 819-823.

Heising, G., et al., *MoMuSys: MPEG-4 Version 2 Video Reference Software Package*, AC098/HHI/WP5.1/DS/P/049/81, 1998, Abstract and pp. 1-8.

Intel Corporation, *Block-Matching in Motion Estimation Alforithms Using Streaming SIMD Extensions 2 (SSE2)*, Vers. 2.0 Sep. 22, 2000, Order No. 248605-001, pp. 1-13, A-1, A-2.

International Organisation for Standardisation, *Optimization Model, Version 2.0*, ISO/IEC JTC1/SC29/WG11, Coding of Moving Pictures and Audio, #N3675, Oct. 2000, 12 pp.

International Organisation for Standardisation, *New MPEG-4 Profiles Under Consideration*, ISO/IEC JTC1/SC29/WG11, Coding of Moving Pictures and Audio, #N3932, Jan. 2001, pp. 1-35.

Jain, J., A. Jain, *Displacement Measurement and its Application in Interframe Image Coding*, IEEE Transactions on Communications, vol. 29, No. 12, Dec. 1981, pp. 1799-1808.

Ju, John C.-H., et al., *A Fast Rate-Optimized Motion Estimation Algorithm for Low-Bit-Rate Video Coding*, 1051-8215/99, IEEE, 1999, pp. 994-1002.

Jung, Hae Mook, Duch Dong Hwang Coong Soo Park, Han Soo Kim, *An Annular Search Algorithm for Efficient Motion Estimation*, International Picture Coding Symposium, PCS96, 1996, pp. 171-174.

Kappagantula, S., K.R. Rao, *Motion Compensated Interframe Image Prediction*, IEEE Transactions on Communications, 33(9), Sep. 1985, pp. 1011-1015.

Kim, Joon-Seek, Rae-Hong Park, *A Fast Feature-Based Block Matching Algorithm Using Integral Projections*, IEEE Journal on Selected areas in communications, vol. 10, No. 5, Jun. 1992, pp. 968-971.

Kim, Michelle, Ed., *MPEG4 Systems*, International Organization for Standardization, ISO/IEC JTC1/SC29/WG11, Coding of Moving Pictures and Audio, #N3383, Jun. 2000, pp. 1-19.

Kneip, Johannes, et al., *Applying and Implementing the MPEG-4 Multimedia Standard*, 0272-1732/99, IEEE, 1999, pp. 64-74.

Kneip, J. (Johannes), et al., *The MPEG-4 Video Coding Standard—a VLSI Point of View*, IEEE Workshop on Signal Processing Systems (SIPS98), Oct. 8-10, 1998, pp. 43-52, A-1, A-2.

Koga, J., et al., *Motion Compensated Interframe Coding for Video Conferencing*, Proceedings of the National Telecommunications Conference, 1981, pp. G5.3.1-G5.3.3.

Koenen, Rob, Ed., *Overview of the MPEG-4 Standard*, International Organization for Standardization, ISO/IEC JTC1/SC29/WG11, Coding of Moving Pictures and Audio, #N4030, Mar. 2001, pp. 1-69.

Kuhn, P., *Algorithms, Complexity Analysis and VLSI Architectures for MPEG-4 Motion Estimation*, 1999 Kluwer Academic Publishers, Boston, pp. cover-vi, 15, 17-59, 107-109, 119-121, 147-167, and 189-204.

Kuhn, P., Stechele W., *Complexity Analysis of the Emerging MPEG-4 Standard as a Basis for VLSI Implementation*, vol. SPIE 3309 Visual Communications and Image Processing, San Jose, Jan. 1998, pp. 498-509.

Lee, Liang-Wei, Jhing-Fa Wang, Jau-Yien Lee, Jung-Dar Shie, *Dynamic Search-Window Adjustment and Interlaced Search Block-Matching Algorithm*, IEEE Transactions on circuits and systems for video technology, vol. 3, No. 1, Feb. 1993, pp. 85-87.

Lee, W., Y. Kim, R.J. Gove, C.J. Read, *Media Station 5000: Integrating Video and Audio*, IEEE Multimedia, vol. 1, No. 4, 1994, pp. 50-61.

Lee, Xiaobing, Ya-Qin Zhang, *A Fast Hierarchical Motion-Compensation Scheme for Video Coding Using Block-Feature Matching*, IEEE Transactions on Circuits and Systems for Video Technology, vol. 6, No. 6, Dec. 1996, pp. 627-635.

Lengwehasatit, Krisda, et al., *A Novel Computationally Scalable Algorithm for Motion Estimation*, SPIE 3309 VCIP Visual Communications and Image processing, San Jose, CA, Jan. 1998, pp. 66-79.

Li, R., B. Zeng, M.L. Liu, *A New Three-Step Search Algorithm for Block Motion Estimation*, IEEE Transactions on Circuits and Systems on Video Technology, vol. 4, No. 4, Aug. 1994, pp. 438-442.

Li, W., E. Salari, *Successive Elimination Algorithm for Motion Estimation*, IEEE Trans. Image Processing, vol. 4, Jan. 1995, pp. 105-107.

Liang, Jie, et al., *Region-Based Video Coding with Embedded Zero-Trees*, 1068-0314/97, IEEE, 1997, p. 449.

Liu, B., A. Zaccarin, *New Fast Algorithms for the Estimation of Block Motion Vectors*, IEEE Transactions on Circuits and Systems on Video Technology, vol. 3, No. 2, Apr. 1993, pp. 148-157.

Liu, Lurng-Kuo, Ephraim Feig, *A Block-Based Gradient Descent Search Algorithm for Block-Based Motion Estimation in Video Coding*, IEEE Transactions on Circuits and Systems on Video Technology, vol. 6, No. 4, Aug. 1996, pp. 419-422.

Mo, Hyeon-Cheol, et al., *A High-Speed Pattern Decoder in MPEG-4 Padding Block Hardware Accelerator*, 0-7803-6685-9/01, IEEE, 2001, pp. II-197-II-200.

Moschetti, F., et al., *About Macroblock Subsampling for Motion Estimation on IA-64*, Proc. of 2001 IEEE Int'l. Conf. on Multimedia and Expo ((ICME 2001), Tokyo, Japan, Aug. 2001, 4 pp.

Moschetti, F., et al., *A Fast Block Matching for SIMD Processors Using Subsampling*, IEEE #0-7803-5482-6/99, pp. IV-321-IV-324., 2000.

Nam, Kwon Moon, Joon-Seek Kim, Rae-Hong Park, Young Serk Shim, *A Fast Hierarchical Motion Vector Estimation Algorithm Using Mean Pyramid*, IEEE Transactions on Circuits and Systems on Video Technology, vol. 5, No. 4, Aug. 1995, pp. 344-351.

Netravali, A., B. Haskell, *Digital Pictures Representation and Compression*, New York, Plenum, 1988, pp. cover-xv, 334-340, 537-542, and 354-355.

Pirsch, Peter, Nicolas Demassieux, Winfried Gehrke, *VLSI Architectures for Video Compression—A Survey*, Proceedings of the IEEE, vol. 83, No. 2, Feb. 1995, pp. 220-246.

Po, Lai-Man, Wing-Chung Ma. *A Novel Four-Step Search Algorithm for Fast Blockmatching*, IEEE Transactions on Circuits and Systems on Video Technology, vol. 6, No. 3, Jun. 1996, pp. 313-317.

Puri, A., H.M. Hang, D.L. Schilling, *An Efficient Blockmatching Algorithm for Motion Compensated Coding*, Proc. IEEE ICASSP, 1987, pp. 2.4.1-25.4.4.

Ragsdale, Gary L., et al, *Relationships of Popular Transmission Characteristics to Perceived Quality for Digital Video Over ATM*, National Communications System, Technical Information Bulletin 99-2, Jan. 1999, 64 pp.

Ramkishor, K., et al., *Real Time Implementation of MPEG-4 Video Decoder on ARM7TDMI*, Proc. of 2001 Int'l. Symposium on Intelligent Multimedia, Video and Speech Processing, May 2-4, 2001, pp. 522-526.

Shi, Y.Q., X. Xia, *A Thresholding Multiresolution Block Matching Algorithm*, IEEE Transactions on Circuits and Systems on Video Technology, vol. 7, No. 2, Apr. 1997, pp. 437-440.

Sikora, Thomas, *MPEG Digital Video Coding Standards*, Preprint from Digital Consumer Electronics Handbook, 1$^{st}$ Ed., McGraw-Hill Book Co., Ch. 9, pp. 1-43.

Sikora, Thomas, *MPEG-I and MPEG-2 Digital Video Coding Standards*, Preprint from Digital Consumer Electronics Handbook, 1$^{st}$ Ed., McGraw-Hill Book Co., pp. 1-43.

Sikora, Thomas, *The Structure of the MPEG-4 Video Coding Algorithm*, Preprint from Digital Consumer Electronics Handbook, 1$^{st}$ Ed., McGraw-Hill Book Co., pp. 1-16.

Song, Byung Cheol, Jong Beom Ra, *A Hierarchical Block Matching Algorithm Using Partial Distortion Criteria*, SPIE 3309 VCIP Visual Communications and Image Processing, 1998, San Jose, CA, pp. 88-95.

Srinivasan, Ram and K.R. Rao, *Predictive Coding Based on Efficient Motion Estimation*, IEEE Transactions on Circuits and Systems on Video Technology, vol. Com-33, No. 8, Aug. 1985, pp. 888-896.

Stolberg, H.-J., et al., *The M-Pire MPEG-4 Codec DSP and Its Macroblock Engine*, 0-7803-548206/99, IEEE, 2000, pp. II-192-II-195.

Tham, Jo Yew, et al., *Transactions Letters: A Novel Unrestricted Center-Biased Diamond Search Algorithm for Block Motion Estimation*, IEEE, 1051-8215/98, 1998, pp. 369-377.

van der Schaar, M., et al., *Near-Lossless Complexity-Scalable Embedded Compression Algorithm for Cost Reduction in DTV Receivers*, 0098 3063/00, IEEE, 2000, pp. 923-933.

Wang, Chung-Neng, et al., *Improved MPEG-4 Visual Texture Coding Using Double Transform Coding*, 0-7803-6685-9/01, IEEE, 2001, pp. V-227-V-230.

Westerink, P. H., et al., *Two-Pass MPEG02 Variable-Bit-Rate Encoding*, IBM J. Res. Develop, vol. 43, No. 4, Jul. 1999, pp. 471-488.

Wittenburg, J.P., et al., *HiPAR-DSP: A Parallel VLIW RISC Processor for Real Time Image Processing Applications*, (0-7803-4229-1/97) IEEE, 1997, pp. 155-162.

Xu, Jie-Bin, Lai-man Po, and Chok-Kwan Cheung, *A New Prediction Model Search Algorithm for Fast Block Motion Estimation*, IEEE Int. Conf. Image Processing, ICIP97, Santa Barbara, 1997., pp. 610-613.

Yu, Fengqi and Alan N. Willson, Jr., *A Flexible Hardware-Oriented Fast Algorithm for Motion Estimation*, ICASSP97, 1997, pp. 2681ff.

Zhu, Shan, Kai-Kuang Ma, *A New Diamond Search Algorithm for Fast Block Matching*, IEEE Transactions on Circuits and Systems on Video Technology, vol. 9, No. 2, Feb. 2000, pp. 287-290.

Philips Electronics, "TriMedia TM1000 Preliminary Data Book," 1997, 70 pgs.

"MIPS Digital Media Extension," Set Architecture Specification, Web Site—mips.com/MDMXspec.ps, Oct. 21, 1997. 8 pgs.

Hewlet Packard, "64-bit and Multimedia Extensions in the PA-RISC 2.0 Architecture," Microprocessors Precision Architecture, 1997, 18 pgs.

Kawakami, Y., et al., "A Single-Chip Digital Signal Processor for Voiceband Applications," IEEE, 1980 International Solid-State Circuits Conference, pp. 40-41, 1980.

Sun Microsystems, Inc.,"UltraSPARC Multimedia Capabilities On-Chip Support for Real-lime Video and Advanced Graphics," SPARC Technology Business, Sep. 1994, 8 pgs.

Case, B., "Philips Hopes to Displace DSPs with VLIW, TriMedia Processors Aimed at Future Multimedia Embedded Apps," Microprocessor Report, Dec. 1994, pp. 12-18.

Gwennap, L., "New PA-RISC Processor Decodes MPEG Video, H's PA-7100LC Uses New Instructions to Eliminate Decoder Chip," Microprocessor Report, Jan. 1994, pp. 16-17.

Texas Instruments, "TMS320C2X User's Guide," 1993, pp. 3:2-3:11; 3:28-3:34; 4:1-4:22; 4:41; 4:103; 4:119-J;120; 4:122; 4:150-4:151.

Intel Corporation, "i860 TM Microprocessor Family Programmer's Reference Manual," 1992, Chapters 1, 3, 8 and 11.

Lee, R. B., "Accelerating Multimedia with Enhanced Microprocessors," IEEE Micro, Apr. 1995, pp. 22-32.

Intel Corporation, "Pentium Processor's User's Manual, vol. 3; Architecture and Programming Manual," 1993, Chapters 1, 3, 4, 6, 8, and 18.

Margulis, N., "i860 Microprocessor Architecture," McGraw Hill, Inc., 1990, Chapters 6, 7, 8, 10, and 11.

Intel Corporation, Intel i750, i860 TM, i960 Processors and Related Products, 1993, pp. 1-3.

Motorola, Inc., "Motorola MC88110 Second Generation RISC Microprocessor User's Manual," 1991, 600 pages.

Motorola, Inc., "Errata to MC88110 Second Generation RISC Microprocessor User's Manual," 1992, pp. 1-11.

Motorola, Inc., MC88110 Programmer's Reference Guide, 1992, pp. 1-4.

Shipnes, J., "Graphics Processing with the 88110 RISC Microprocessor," Motorola, Inc. IEEE, No. 0-8186-26455-0/92, 1992, pp. 169-174.

Advanced Micro Devices, Inc., "AMD-3D Technology Manual," Feb. 1998, pp. 1-58.

Hansen, C., "Architecture of a Broadband Mediaprocessor," Proceeedings of Compcon, IEEE, 1996, pp. 334-340.

Levinthal, et al., "Chap—A SIMD Graphics Processor," Computer Graphics Project, ACM, vol. 18, No. 3, Jul. 1984, pp. 77-81.

Levinthal, et al., "Parallel Computers for Graphics Applications," Proceedings: Second International Conference on Architectural Support for Programming Languages and Operating Systems, (ASPLOS II), IEEE, 1987, pp. 193-198.

Wang, et al., "A Processor Architecture for 3D Graphics Calculations," Computer Motion, Inc., Goleta, CA, 23 pgs.

* cited by examiner

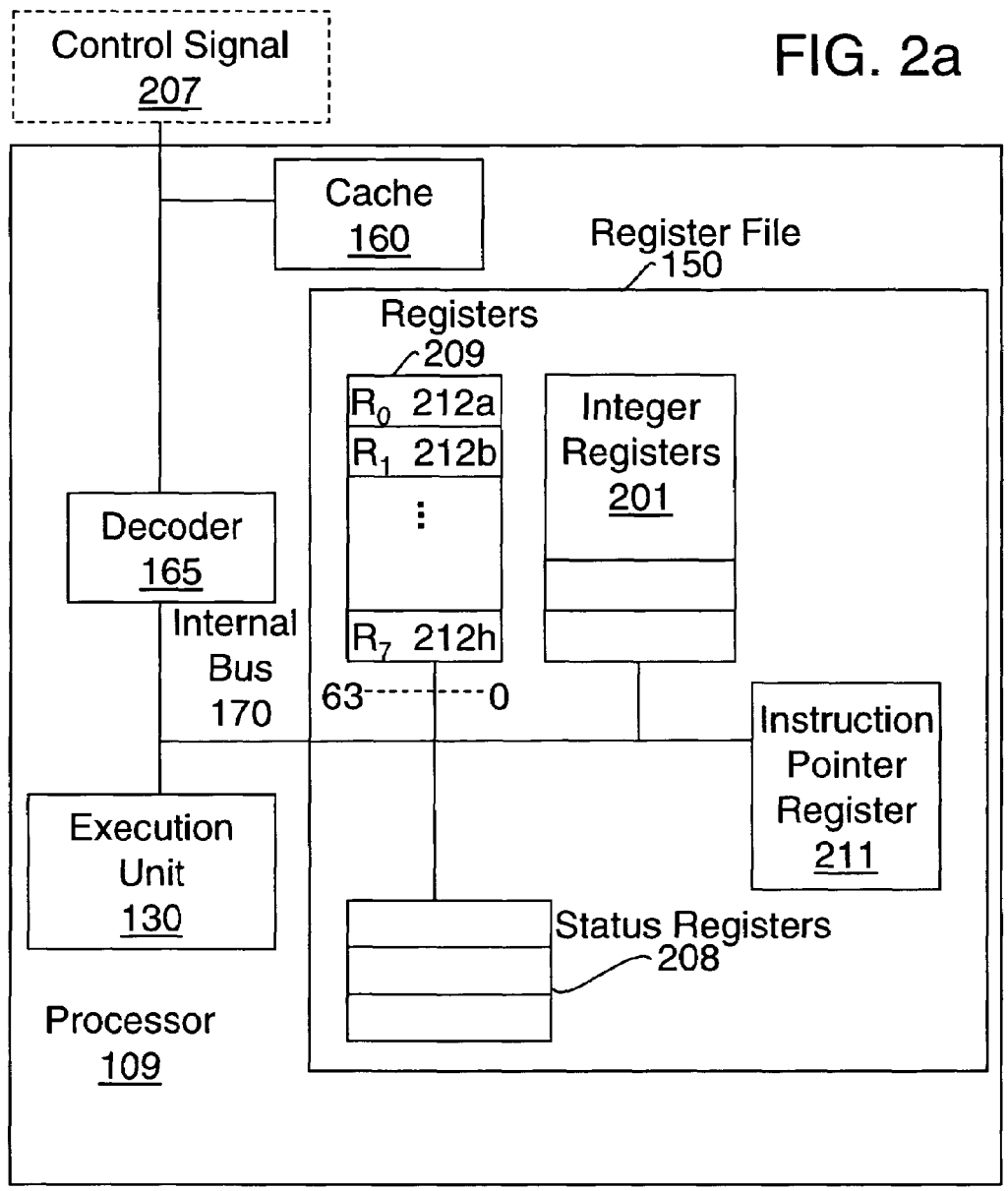

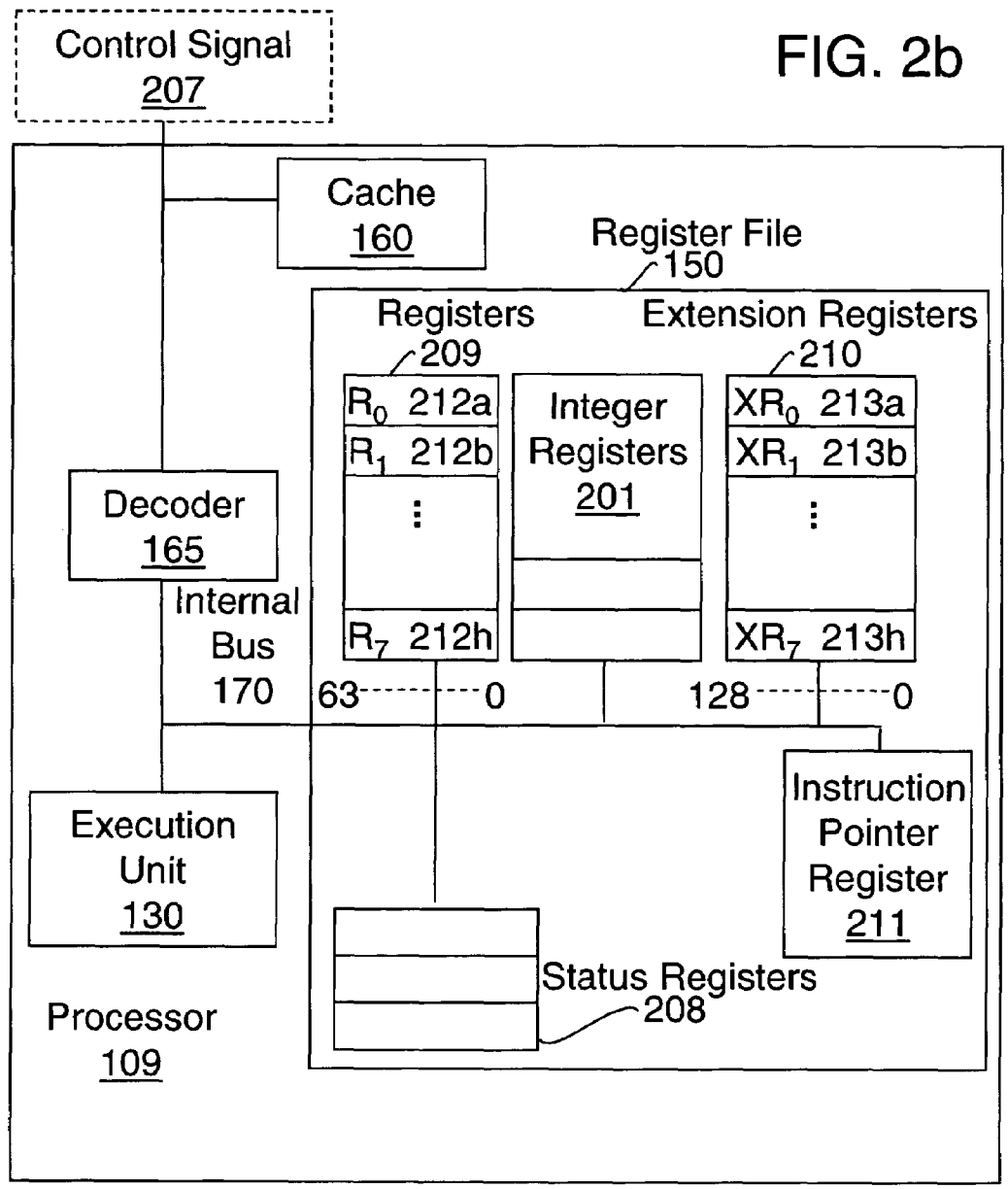

| 63 | 56 55 | 48 47 | 40 39 | 32 31 | 24 23 | 16 15 | 8 7 | 0 |
|---|---|---|---|---|---|---|---|---|
| Byte 7 | Byte 6 | Byte 5 | Byte 4 | Byte 3 | Byte 2 | Byte 1 | Byte 0 | |

Packed Byte 411

| 63 | | 48 47 | | 32 31 | | 16 15 | | 0 |
|---|---|---|---|---|---|---|---|---|
| Word 3 | | Word 2 | | Word 1 | | Word 0 | | |

Packed Word 412

| 63 | | | | 32 31 | | | | 0 |
|---|---|---|---|---|---|---|---|---|
| Doubleword 1 | | | | Doubleword 0 | | | | |

Packed Doubleword 413

| 63 | | | | | | | | 0 |
|---|---|---|---|---|---|---|---|---|
| Quadword 0 | | | | | | | | |

Quadword 414

Packed Byte 421

```
127  112 111    96 95    80 79    64 63    48 47    32 31    16 15     0
   Half 7  Half 6  Half 5  Half 4  Half 3  Half 2  Half 1  Half 0
```

Packed Half 422

```
127            96 95           64 63           32 31            0
    Single 3       Single 2       Single 1        Single 0
```

Packed Single 423

```
127                            64 63                             0
          Double 1                        Double 0
```

Packed Double 424

FIG. 4b

| 63 | 56 55 | 48 47 | 40 39 | 32 31 | 24 23 | 16 15 | 8 7 | 0 |
|---|---|---|---|---|---|---|---|---|
| bbbb bbbb | bbbb bbbb | bbbb bbbb | bbbb bbbb | bbbb bbbb | bbbb bbbb | bbbb bbbb | bbbb bbbb | |

Unsigned packed byte in-register representation 510

| 63 | 56 55 | 48 47 | 40 39 | 32 31 | 24 23 | 16 15 | 8 7 | 0 |
|---|---|---|---|---|---|---|---|---|
| sbbb bbbb | sbbb bbbb | sbbb bbbb | sbbb bbbb | sbbb bbbb | sbbb bbbb | sbbb bbbb | sbbb bbbb | |

Signed packed byte in-register representation 511

FIG. 5a

| 63 | 48 47 | 32 31 | 16 15 | 0 |
|---|---|---|---|---|
| bbbb bbbb bbbb bbbb | bbbb bbbb bbbb bbbb | bbbb bbbb bbbb bbbb | bbbb bbbb bbbb bbbb | |

Unsigned packed word in-register representation 512

| 63 | 48 47 | 32 31 | 16 15 | 0 |
|---|---|---|---|---|
| sbbb bbbb bbbb bbbb | sbbb bbbb bbbb bbbb | sbbb bbbb bbbb bbbb | sbbb bbbb bbbb bbbb | |

Signed packed word in-register representation 513

FIG. 5b

| 63 | 32 31 | 0 |
|---|---|---|
| bbbb bbbb bbbb bbbb bbbb bbbb bbbb bbbb | | bbbb bbbb bbbb bbbb bbbb bbbb bbbb bbbb |

Unsigned packed doubleword in-register representation 514

| 63 | 32 31 | 0 |
|---|---|---|
| sbbb bbbb bbbb bbbb bbbb bbbb bbbb bbbb | | sbbb bbbb bbbb bbbb bbbb bbbb bbbb bbbb |

Signed packed doubleword in-register representation 515

FIG. 5c

| 127 | 64 63 | 0 |
|---|---|---|
| bbbb ... bbbb bbbb bbbb | | bbbb ... bbbb bbbb bbbb |

Unsigned packed quadword in-register representation 516

| 127 | 64 63 | 0 |
|---|---|---|
| sbbb ... bbbb bbbb bbbb | | sbbb ... bbbb bbbb bbbb |

Signed packed quadword in-register representation 517

FIG. 5d

Multiply-add 1201　　　　　　1210　　　　　　　src1

| s | t | u | v | s | t | u | v | s | t | u | v | s | t | u | v |

1220　　　　　　　src2

| g | g | g | g | e | f | -f | -e | g | -g | -g | g | f | -e | e | -f |

1241　　　　　　　dest

| gs+gt | gu+gv | es+ft | -fu-ev | gs-gt | -gu+gv | fs-et | eu-fv |

Multiply-add 1202　　　　　　1250　　　　　　　src1

| w | x | y | z | w | x | y | z | w | x | y | z | w | x | y | z |

1260　　　　　　　src2

| g | g | g | g | e | f | -f | -e | g | -g | -g | g | b | -e | e | -f |

1242　　　　　　　dest

| gw+gx | gy+gz | ew+fx | -fy-ez | gw-gx | -gy+gz | fw-ex | ey-fz |

Horizontal-add 1203　　　　1241　　　　　　　src1

| gs+gt | gu+gv | es+ft | -fu-ev | gs-gt | -gu+gv | fs-et | eu-fv |

1242　　　　　　　src2

| gw+gx | gy+gz | ew+fx | -fy-ez | gw-gx | -gy+gz | fw-ex | ey-fz |

1290　　　　　　　dest

| S' | T' | U' | V' | W' | X' | Y' | Z' |

FIG. 12

$$\begin{bmatrix} g & g & g & g \\ e & f & -f & -e \\ g & -g & -g & g \\ f & -e & e & -f \end{bmatrix} \begin{bmatrix} k & l & m & n \\ o & p & q & r \\ s & t & u & v \\ w & x & y & z \end{bmatrix} \begin{bmatrix} g & e & g & f \\ g & f & -g & -e \\ g & -f & -g & e \\ g & -e & g & -f \end{bmatrix}_{1310}$$

$$= \begin{bmatrix} g & g & g & g \\ e & f & -f & -e \\ g & -g & -g & g \\ f & -e & e & -f \end{bmatrix} \begin{bmatrix} K' & L' & M' & N' \\ O' & P' & Q' & R' \\ S' & T' & U' & V' \\ W' & X' & Y' & Z' \end{bmatrix}_{1320}$$

$$= \begin{bmatrix} K & L & M & N \\ O & P & Q & R \\ S & T & U & V \\ W & X & Y & Z \end{bmatrix}_{1340} \quad {}^{1321} \quad 1330$$

Multiply-add 1401 src1 (1421): k | l | m | n | o | p | q | r | s | t | u | v | w | x | y | z src2 (1431): g | g | g | g | g | g | g | g | g | g | g | g | g | g | g | g dest (1441): gk+gl | gm+gn | go+gp | gq+gr | gs+gt | gu+gv | gw+gx | gy+gz

Multiply-add 1402 src1 (1451): k | l | m | n | o | p | q | r | s | t | u | v | w | x | y | z src2 (1461): e | f | -f | -e | e | f | -f | -e | e | f | -f | -e | e | f | -f | -e dest (1442): ek+fl | -fm-en | eo+fp | -fq-er | es+ft | -fu-ev | ew+fx | -fy-ez

Horizontal-add 1403 src1 (1441): gk+gl | gm+gn | go+gp | gq+gr | gs+gt | gu+gv | gw+gx | gy+gz src2 (1442): ek+fl | -fm-en | eo+fp | -fq-er | es+ft | -fu-ev | ew+fx | -fy-ez dest (1491): K' | O' | S' | W' | L' | P' | T' | X'

METHOD AND APPARATUS FOR EFFICIENT INTEGER TRANSFORM

RELATED APPLICATIONS

The present application is a continuation of U.S. patent application Ser. No. 10/749,738, filed on Dec. 30, 2003, entitled "Method and Apparatus for Efficient Integer Transform", now U.S. Pat. No. 7,624,138, which is a continuation-in-part application claiming, under 35 U.S.C. §120, the benefit of the filing date of U.S. application Ser. No. 09/952,891, filed Oct. 29, 2001, now U.S. Pat. No. 7,085,795.

FIELD OF THE DISCLOSURE

This disclosure relates generally to transform coding techniques for compression and decompression of audio, images and video. In particular, the disclosure relates to performing integer transforms using Single-Instruction-Multiple-Data (SIMD) operations.

BACKGROUND OF THE DISCLOSURE

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing (PC) experience will be even richer in audio-visual effects, as well as being easier to use, and more importantly, computing will merge with communications.

Accordingly, the display of images, as well as playback of audio and video data, which is collectively referred to herein as content, have become increasingly popular applications for current computing devices. Transform coding is a popular technique for compression and decompression of audio, images and video. Discrete transforms such as the discrete cosine transform (DCT) used in prior compression techniques have made use of floating-point or fixed-point number representations to approximate real irrational coefficients. However imperfections in these representations may contribute to an inverse transform mismatch when performed in the integer domain.

More recently integer transforms have been proposed, which have integer basis components and permit coefficients to be accurately represented by integers. By choosing coefficients which are integer approximations of DCT coefficients, the near optimum decorrelation properties of DCTs are preserved. More over, small integer coefficients may be selected to permit transforms to be implemented with shifts, additions and subtractions rather than multiplications, and some adverse effects of rounding may be avoided.

In some computer systems, processors are implemented to operate on values represented by a large number of bits (e.g., 32 or 64) using instructions that produce one result. For example, the execution of an add instruction will add together a first 64-bit value and a second 64-bit value and store the result as a third 64-bit value. However, media applications require the manipulation of large amounts of data which may be represented in a small number of bits. For example, image data typically requires 8 or 16 bits and sound data typically requires 8 or 16 bits. To improve efficiency of media applications, some prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data and a second packed data. Thus, if a multimedia algorithm requires a loop containing five operations that must be performed on a large number of data elements, it is desirable to pack the data and perform these operations in parallel using packed data instructions. In this manner, these processors can more efficiently process content of media applications.

Unfortunately, current methods and instructions target the general needs of transforms and are not comprehensive. In fact, many architectures do not support a means for efficient integer transform calculations over a range of coefficient sizes and data types. In addition, data ordering within data storage devices such as SIMD registers, as well as a capability of adding adjacent values in a register, are generally not supported. As a result, current architectures require unnecessary data type changes which minimizes the number of operations per instruction and significantly increases the number of clock cycles required to order data for arithmetic operations.

Therefore, there remains a need to overcome one or more of the limitations existing in the techniques above-described.

BRIEF DESCRIPTION OF THE DRAWINGS

The present invention is illustrated by way of example and not limitation in the figures of the accompanying drawings.

FIGS. 2a-2b illustrate register files of processors according to various alternative embodiments of the invention.

FIGS. 4a-4b illustrate packed data-types according to various alternative embodiments of the invention.

FIGS. 5a-5d illustrate in-register packed data representations according to various alternative embodiments of the invention.

FIG. 12 illustrates a flow diagram of an alternative embodiment of a process for efficient integer transform processing of content data.

FIG. 13 illustrates one exemplary embodiment of an integer transform for processing of content data.

FIGS. 14a-14f illustrate flow diagrams of another alternative embodiment of a process for efficient integer transform processing of content data.

DETAILED DESCRIPTION

Figure 1A:
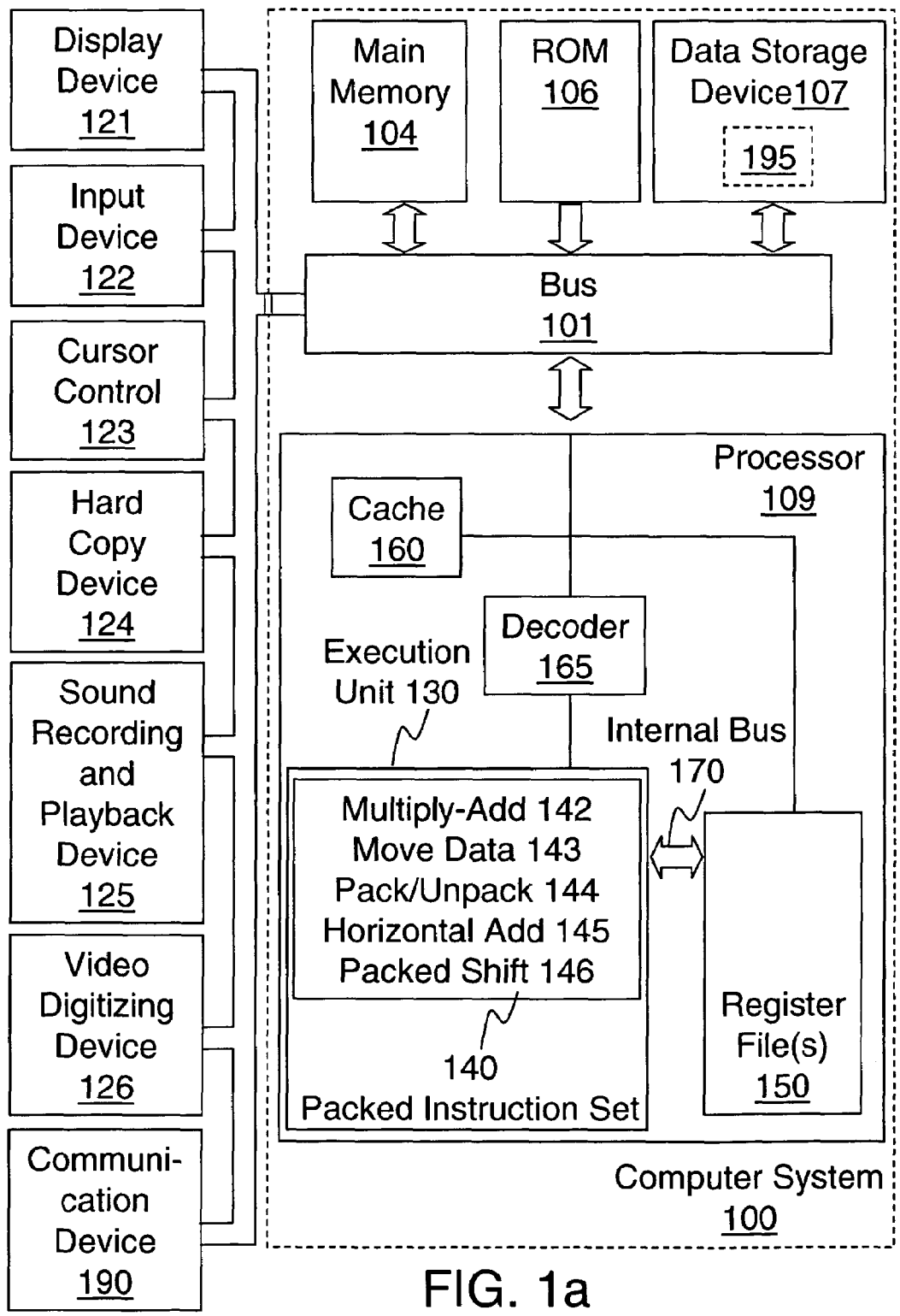
FIGS. 1a-1c illustrate exemplary computer systems according to various alternative embodiments of the invention.

A method and apparatus for efficient integer transforms of content data are described. The method includes generating, in response to executing a multiply-add instruction, a plurality of sums of product pairs within a destination data storage device. The plurality of product pairs are formed by multiplying data within the destination data storage device and coefficients within a co-efficient data storage device. In response to executing a second multiply-add instruction, a second plurality of sums of product pairs may be generated within another destination data storage device. Once generated, adjacent summed-product pairs may be added in response to executing a horizontal-add instruction. The adjacent summed-product pairs are added and results are stored within the destination data storage device. Once formed, the results may also be stored within a memory device.

Further disclosed herein is a method and apparatus for including in a processor, instructions for performing multiply-add operations and horizontal-add operations on pairs of adjacent packed data. In one embodiment, a processor is coupled to a memory that stores a first packed byte data and a second packed byte data. The processor performs operations on said first packed byte data and said second packed byte data to generate a third packed data in response to receiving a multiply-add instruction. A plurality of the 16-bit data elements in this third packed data store the result of performing multiply-add operations on data elements in the first and second packed byte data. The processor adds together adjacent pairs of 16-bit data elements of at least the third packed data in response to receiving a horizontal-add instruction to generate, as one of a plurality of data elements of a fourth packed data, a 16-bit result.

In one embodiment, the methods of the present invention are embodied in machine-executable instructions. The instructions can be used to cause a general-purpose or special-purpose processor that is programmed with the instructions to perform the processing blocks of the present invention. Alternatively, the steps of the present invention might be performed by specific hardware components that contain hardwired logic for performing the processing blocks, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. In some instances, well-known structures and devices may be omitted in order to avoid obscuring the details of the present invention. These examples and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Integer Transform Overview

This application describes a method and apparatus for including in a processor instructions for performing integer transforms on packed data. A separable integer transform approximates real transform coefficients, for example of an 8×8 DCT, as follows:

$$T_8 = \begin{bmatrix} g & g & g & g & g & g & g & g \\ a & b & c & d & -d & -c & -b & -a \\ e & f & -f & -e & -e & -f & f & e \\ b & -d & -a & -c & c & a & d & -b \\ g & -g & -g & g & g & -g & -g & g \\ c & -a & d & b & -b & -d & a & -c \\ f & -e & e & -f & -f & e & -e & -f \\ d & -c & b & -a & a & -b & c & -d \end{bmatrix}$$

where ab=ac+bd+cd, when a≧b≧c≧d and e≧f. The coefficients are applied to the data in both the horizontal and the vertical directions.

A 4×4 integer transform may be written as follows:

$$T_4 = \begin{bmatrix} g & g & g & g \\ e & f & -f & -e \\ g & -g & -g & g \\ f & -e & e & -f \end{bmatrix}$$

For example, if a=3, b=2, c=1, d=1, e=2 and f=1, then since 3·2=3·1+2·1+1·1=6, and 3≧2≧1≧1, and 2≧1, the following 8×8 integer transform may be generated:

$$T_8 = \begin{bmatrix} 1 & 1 & 1 & 1 & 1 & 1 & 1 & 1 \\ 3 & 2 & 1 & 1 & -1 & -1 & -2 & -3 \\ 2 & 1 & -1 & -2 & -2 & -1 & 1 & 2 \\ 2 & -1 & -3 & -1 & 1 & 3 & 1 & -2 \\ 1 & -1 & -1 & 1 & 1 & -1 & -1 & 1 \\ 1 & -3 & 1 & 2 & -2 & -1 & 3 & -1 \\ 1 & -2 & 2 & -1 & -1 & 2 & -2 & -1 \\ 1 & -1 & 2 & -3 & 3 & -2 & 1 & -1 \end{bmatrix}$$

Therefore, a 4×4 integer transform corresponding to the example given above may be generated as follows:

$$T_4 = \begin{bmatrix} 1 & 1 & 1 & 1 \\ 2 & 1 & -1 & -2 \\ 1 & -1 & -1 & 1 \\ 1 & -2 & 2 & -1 \end{bmatrix}$$

To provide another example of an integer transform, when a=10, b=9, c=6, d=2, e=17 and f=7, then 10·9=10·6+9·2+6·2=90, and 10≧9≧6≧2, and 17≧7. Therefore the following 8×8 integer transform may be generated:

$$T_8 = \begin{bmatrix} 13 & 13 & 13 & 13 & 13 & 13 & 13 & 13 \\ 10 & 9 & 6 & 2 & -2 & -6 & -9 & -10 \\ 17 & 7 & -7 & -17 & -17 & -7 & 7 & 17 \\ 9 & -2 & -10 & -6 & 6 & 10 & 2 & -9 \\ 13 & -13 & -13 & 13 & 13 & -13 & -13 & 13 \\ 6 & -10 & 2 & 9 & -9 & -2 & 10 & -6 \\ 7 & -17 & 17 & -7 & -7 & 17 & -17 & -7 \\ 2 & -6 & 9 & -10 & 10 & -9 & 6 & -2 \end{bmatrix}$$

A corresponding 4×4 integer transform may be generated as follows:

$$T_4 = \begin{bmatrix} 13 & 13 & 13 & 13 \\ 17 & 7 & -7 & -17 \\ 13 & -13 & -13 & 13 \\ 7 & -17 & 17 & -7 \end{bmatrix}$$

As discussed below especially with regard to FIGS. 11a-11b, FIG. 12 and FIGS. 14a-14d, efficient 4×4 and/or 8×8 integer transforms of content data may be performed by multiply-add instructions and horizontal-add instructions.

In accordance with one embodiment of an efficient integer transform of content data, a plurality of sums of product pairs is generated within a first data storage device in response to executing a multiply-add instruction. The plurality of product pairs are formed by multiplying data within the first data storage device and coefficients within a coefficient data storage device. One embodiment of the multiply-add instruction multiplies individual unsigned bytes within the first data storage device by the corresponding signed bytes within the co-efficient data storage device, producing temporary signed 16-bit results. Adjacent temporary 16-bit results are then summed and optionally saturated, the result of which is stored in the first data storage device. In response to executing a second multiply-add instruction, a second plurality of sums of product pairs may be generated within a second data storage device.

Once generated, adjacent summed-product pairs from the first and second storage devices may be added in response to executing a horizontal-add instruction. One embodiment of a horizontal-add instruction adds adjacent signed 16-bit summed-product pairs from the first storage device and from the second storage device, writing signed (and optionally saturated) 16-bit results to a destination storage device. Once the adjacent summed-product pairs are added and the results stored in a destination storage device, the results may also be stored in a memory device.

Computer System

FIG. 1a illustrates an exemplary computer system 100 according to one embodiment of the invention. Computer system 100 includes a bus 101, or other communications hardware and software, for communicating information, and a processor 109 coupled with bus 101 for processing information. Processor 109 represents a central processing unit of any type of architecture, including a CISC or RISC type architecture. Computer system 100 further includes a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also includes a read only memory (ROM) 106, and/or other static storage device, coupled to bus 101 for storing static information and instructions for processor 109. Data storage device 107 is coupled to bus 101 for storing information and instructions.

FIG. 1a also illustrates that processor 109 includes an execution unit 130, a register file 150, a cache 160, a decoder 165, and an internal bus 170. Of course, processor 109 contains additional circuitry which is not necessary to understanding the invention.

Execution unit 130 is used for executing instructions received by processor 109. In addition to recognizing instructions typically implemented in general purpose processors, execution unit 130 recognizes instructions in packed instruction set 140 for performing operations on packed data formats. Packed instruction set 140 includes instructions for supporting multiply-add and/or multiply-subtract operations. In addition, packed instruction set 140 may also include instructions for supporting a pack operation, an unpack operation, a packed add operation, a packed subtract operation, a packed multiply operation, a packed shift operation, a packed compare operation, a population count operation, and a set of packed logical operations (including packed AND, packed ANDNOT, packed OR, and packed XOR) as described in "A Set of Instructions for Operating on Packed Data," filed on Aug. 31, 1995, application number 521,360. Packed instruction set 140 may also include one or more instructions for supporting: a move data operation; a data shuffle operation for organizing data within a data storage device; a horizontal-add instruction for adding adjacent bytes, words and doublewords, two word values, two words to produce a 16-bit result, two quadwords to produce a quadword result; and a register merger operation as are described in "An Apparatus and Method for Efficient Filtering and Convolution of Content Data," filed on Oct. 29, 2001, application Ser. No. 09/952,891.

Execution unit 130 is coupled to register file 150 by internal bus 170. Register file 150 represents a storage area on processor 109 for storing information, including data. It is understood that one aspect of the invention is the described instruction set for operating on packed data. According to this aspect of the invention, the storage area used for storing the packed data is not critical. However, embodiments of the register file 150 are later described with reference to FIGS. 2a-2b. Execution unit 130 is coupled to cache 160 and decoder 165. Cache 160 is used to cache data and/or control signals from, for example, main memory 104. Decoder 165 is used for decoding instructions received by processor 109 into control signals and/or microcode entry points. In response to these control signals and/or microcode entry points, execution unit 130 performs the appropriate operations. For example, if an add instruction is received, decoder 165 causes execution unit 130 to perform the required addition; if a subtract instruction is received, decoder 165 causes execution unit 130 to perform the required subtraction; etc. Decoder 165 may be implemented using any number of different mechanisms (e.g., a look-up table, a hardware implementation, a PLA, etc.). Thus, while the execution of the various instructions by the decoder and execution unit is represented by a series of if/then statements, it is understood that the execution of an instruction does not require a serial processing of these if/then statements. Rather, any mechanism for logically performing this if/then processing is considered to be within the scope of the invention.

FIG. 1a additionally shows a data storage device 107 (e.g., a magnetic disk, optical disk, and/or other machine readable media) can be coupled to computer system 100. In addition, the data storage device 107 is shown including code 195 for execution by the processor 109. The code 195 can be written to cause the processor 109 to perform transformations, filters or convolutions with the multiply-add/subtract instruction(s) for any number of purposes (e.g., motion video compression/decompression, image filtering, audio signal compression, filtering or synthesis, modulation/demodulation, etc.). Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109. Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer network. Computer system 100 optionally includes video digitizing device 126 and/or a communications device 190 (e.g., a serial communications chip, a wireless interface, an ethernet chip or a modem, which provides communications with an external device or network). Video digitizing device 126 can be used to capture video images that can be transmitted to others on the computer network.

In one embodiment, the processor 109 additionally supports an instruction set which is compatible with the x86 instruction set used by existing processors (such as the Pentium® processor) manufactured by Intel Corporation of Santa Clara, Calif. Thus, in one embodiment, processor 109 supports all the operations supported in the IA™—Intel Architecture, as defined by Intel Corporation of Santa Clara, Calif. (see "IA-32 Intel® Architecture Software Developers Manual Volume 2: Instruction Set Reference," Order Number 245471, available from Intel of Santa Clara, Calif. on the world wide web at developer.intel.com). As a result, processor 109 can support existing x86 operations in addition to the operations of the invention. Processor 109 may also be suitable for manufacture in one or more process technologies and by being represented on a machine readable media in sufficient detail, may be suitable to facilitate said manufacture. While the invention is described as being incorporated into an x86 based instruction set, alternative embodiments could incorporate the invention into other instruction sets. For example, the invention could be incorporated into a 64-bit processor using a new instruction set.

Figure 1B:
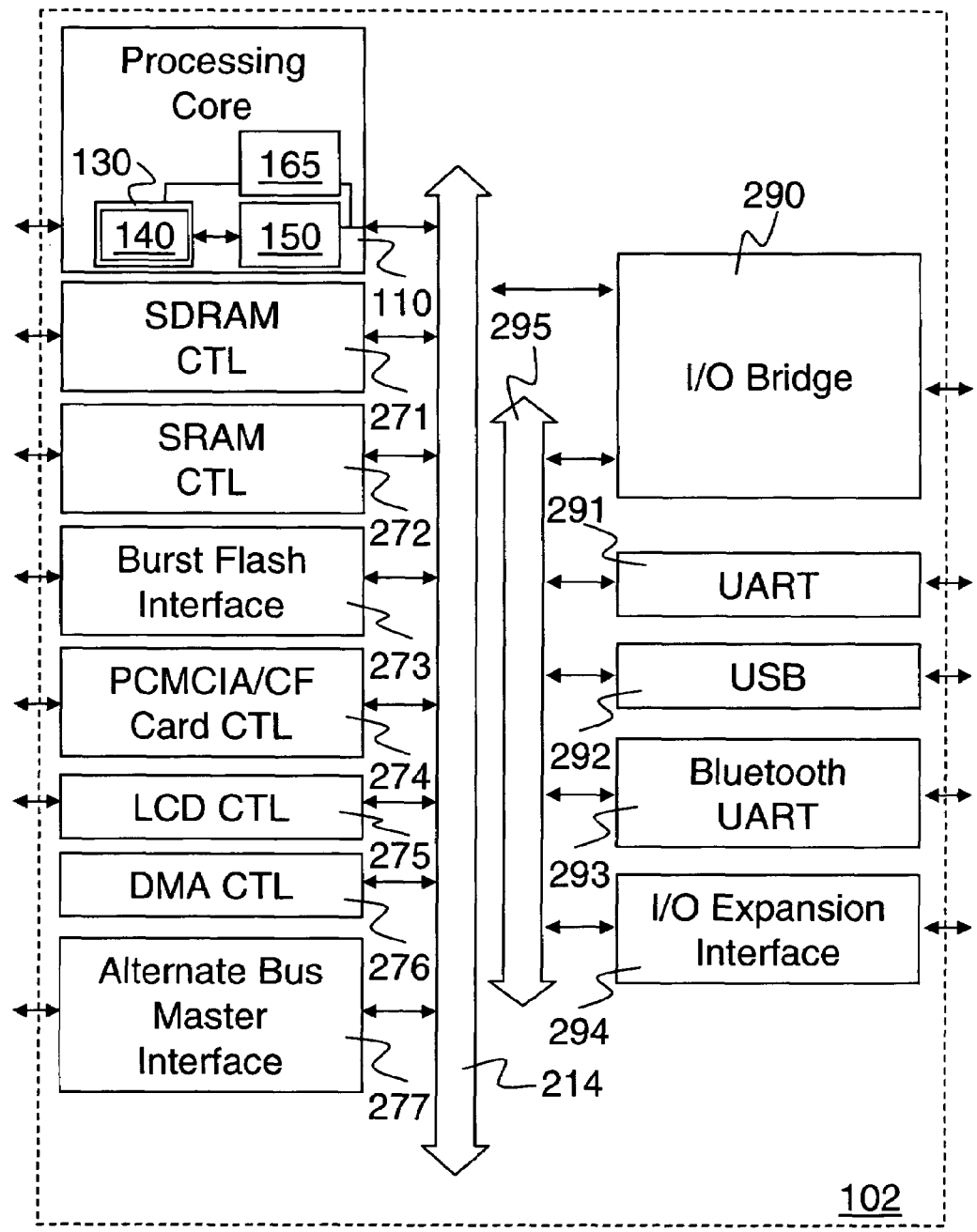

FIG. 1b illustrates an alternative embodiment of a data processing system 102 which implements the principles of the present invention. One embodiment of data processing system 102 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 102 comprises a processing core 110 capable of performing SIMD operations including multiplications and horizontal additions and/or subtractions. For one embodiment, processing core 110 represents a processing unit of any type of architecture, including but not limited to a CISC, a RISC or a VLIW type architecture. Processing core 110 may also be suitable for manufacture in one or more process technologies and by being represented on a machine readable media in sufficient detail, may be suitable to facilitate said manufacture.

Processing core 110 comprises an execution unit 130, a set of register file(s) 150, and a decoder 165. Processing core 110 also includes additional circuitry (not shown) which is not necessary to the understanding of the present invention.

Execution unit 130 is used for executing instructions received by processing core 110. In addition to recognizing typical processor instructions, execution unit 220 recognizes instructions in packed instruction set 140 for performing operations on packed data formats. Packed instruction set 140 includes instructions for supporting multiply-add/subtract operations, horizontal-add operations, and may also include other packed instructions.

Execution unit 130 is coupled to register file 150 by an internal bus. Register file 150 represents a storage area on processing core 110 for storing information, including data. As previously mentioned, it is understood that the storage area used for storing the packed data is not critical. Execution unit 130 is coupled to decoder 165. Decoder 165 is used for decoding instructions received by processing core 110 into control signals and/or microcode entry points. In response to these control signals and/or microcode entry points, execution unit 130 performs the appropriate operations.

Processing core 110 is coupled with bus 214 for communicating with various other system devices, which may include but are not limited to, for example, synchronous dynamic random access memory (SDRAM) control 271, static random access memory (SRAM) control 272, burst flash memory interface 273, personal computer memory card international association (PCMCIA)/compact flash (CF) card control 274, liquid crystal display (LCD) control 275, direct memory access (DMA) controller 276, and alternative bus master interface 277.

In one embodiment, data processing system 102 may also comprise an I/O bridge 290 for communicating with various I/O devices via an I/O bus 295. Such I/O devices may include but are not limited to, for example, universal asynchronous receiver/transmitter (UART) 291, universal serial bus (USB) 292, Bluetooth wireless UART 293 and I/O expansion interface 294.

One embodiment of data processing system 102 provides for mobile, network and/or wireless communications and a processing core 110 capable of performing SIMD operations including multiply add and/or subtract operations, horizontal-addition and/or subtraction, pack and unpack operations, shuffle operations, packed shift operations, and packed arithmetic and logical operations. Processing core 110 may be programmed with various audio, video, imaging and communications algorithms including discrete transformations, filters or convolutions; compression/decompression techniques such as color space transformation, video encode motion estimation or video decode motion compensation; and modulation/demodulation (MODEM) functions such as pulse coded modulation (PCM).

Figure 1C:
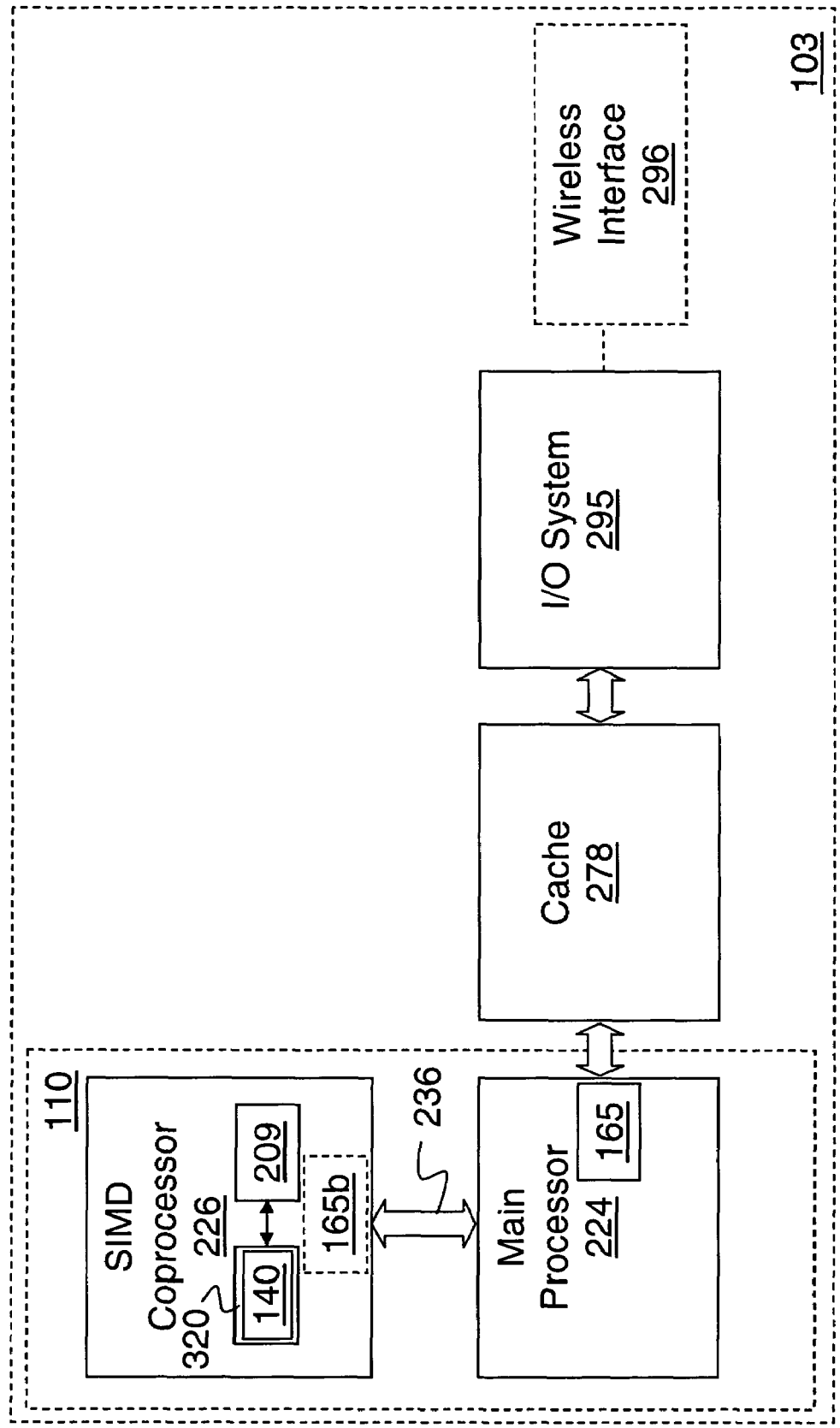

FIG. 1c illustrates alternative embodiments of a data processing system 103 capable of performing SIMD multiply-add/subtract and horizontal-add/subtract operations. In accordance with one alternative embodiment, data processing system 103 may include a main processor 224, a SIMD coprocessor 226, a cache memory 278 and an input/output system 265. The input/output system 295 may optionally be coupled to a wireless interface 296. SIMD coprocessor 226 is capable of performing SIMD operations including multiply-add/subtract operations, horizontal-add/subtract operations, pack and unpack operations, shuffle operations, packed shift operations, and packed arithmetic and logical operations. Processing core 110 may be suitable for manufacture in one or more process technologies and by being represented on a machine readable media in sufficient detail, may be suitable to facilitate the manufacture of all or part of data processing system 103 including processing core 110.

For one embodiment, SIMD coprocessor 226 comprises an execution unit 130 and register file(s) 209. One embodiment of main processor 224 comprises a decoder 165 to recognize instructions of instruction set 140 including SIMD multiply-add/subtract instructions, horizontal-add/subtract instructions, pack and unpack instructions, shuffle instructions, packed shift instructions, and packed arithmetic and logical instructions for execution by execution unit 130. For alternative embodiments, SIMD coprocessor 226 also comprises at least part of decoder 165b to decode instructions of instruction set 140. Processing core 110 also includes additional circuitry (not shown) which is not necessary to the understanding of the present invention.

In operation, the main processor 224 executes a stream of data processing instructions that control data processing operations of a general type including interactions with the cache memory 278, and the input/output system 295. Embedded within the stream of data processing instructions are SIMD coprocessor instructions. The decoder 165 of main processor 224 recognizes these SIMD coprocessor instructions as being of a type that should be executed by an attached SIMD coprocessor 226. Accordingly, the main processor 224 issues these SIMD coprocessor instructions (or control signals representing SIMD coprocessor instructions) on the coprocessor bus 236 where from they are received by any attached SIMD coprocessors. In this case, the SIMD coprocessor 226 will accept and execute any received SIMD coprocessor instructions intended for it.

Data may be received via wireless interface 296 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames.

For one embodiment of processing core 110, main processor 224 and a SIMD coprocessor 226 are integrated into a single processing core 110 comprising an execution unit 130, register file(s) 209, and a decoder 165 to recognize instructions of instruction set 140 including SIMD multiply-add/subtract instructions, horizontal-add/subtract instructions, pack and unpack instructions, shuffle instructions, packed shift instructions, and packed arithmetic and logical instructions for execution by execution unit 130.

FIG. 2a illustrates the register file of the processor according to one embodiment of the invention. The register file 150 may be used for storing information, including control/status information, integer data, floating point data, and packed data. In the embodiment shown in FIG. 2a, the register file 150 includes integer registers 201, registers 209, status registers 208, and instruction pointer register 211. Status registers 208 indicate the status of processor 109. Instruction pointer register 211 stores the address of the next instruction to be executed. Integer registers 201, registers 209, status registers 208, instruction pointer register 211 are all coupled to internal bus 170. Additional registers may also be coupled to internal bus 170.

In one embodiment, the registers 209 are used for both packed data and floating point data. In one such embodiment, the processor 109, at any given time, must treat the registers 209 as being either stack referenced floating point registers or non-stack referenced packed data registers. In this embodiment, a mechanism is included to allow the processor 109 to switch between operating on registers 209 as stack referenced floating point registers and non-stack referenced packed data registers. In another such embodiment, the processor 109 may simultaneously operate on registers 209 as non-stack referenced floating point and packed data registers. As another example, in another embodiment, these same registers may be used for storing integer data.

Of course, alternative embodiments may be implemented to contain more or less sets of registers. For example, an alternative embodiment may include a separate set of floating point registers for storing floating point data. As another example, an alternative embodiment may including a first set of registers, each for storing control/status information, and a second set of registers, each capable of storing integer, floating point, and packed data. As a matter of clarity, the registers of an embodiment should not be limited in meaning to a particular type of circuit. Rather, a register of an embodiment need only be capable of storing and providing data, and performing the functions described herein.

The various sets of registers (e.g., the integer registers 201, the registers 209) may be implemented to include different numbers of registers and/or to different size registers. For example, in one embodiment, the integer registers 201 are implemented to store thirty-two bits, while the registers 209 are implemented to store eighty bits (all eighty bits are used for storing floating point data, while only sixty-four are used for packed data). In addition, registers 209 contains eight registers, $R_0$ 212a through $R_7$ 212h. $R_1$ 212a, $R_2$ 212b and $R_3$ 212c are examples of individual registers in registers 209. Thirty-two bits of a register in registers 209 can be moved into an integer register in integer registers 201. Similarly, a value in an integer register can be moved into thirty-two bits of a register in registers 209. In another embodiment, the integer registers 201 each contain 64 bits, and 64 bits of data may be moved between the integer register 201 and the registers 209. In another alternative embodiment, the registers 209 each contain 64 bits and registers 209 contains sixteen registers. In yet another alternative embodiment, registers 209 contains thirty-two registers.

FIG. 2b illustrates the register file of the processor according to one alternative embodiment of the invention. The register file 150 may be used for storing information, including control/status information, integer data, floating point data, and packed data. In the embodiment shown in FIG. 2b, the register file 150 includes integer registers 201, registers 209, status registers 208, extension registers 210, and instruction pointer register 211. Status registers 208, instruction pointer register 211, integer registers 201, registers 209, are all coupled to internal bus 170. Additionally, extension registers 210 are also coupled to internal bus 170.

In one embodiment, the extension registers 210 are used for both packed integer data and packed floating point data. In alternative embodiments, the extension registers 210 may be used for scalar data, packed Boolean data, packed integer data and/or packed floating point data. Of course, alternative embodiments may be implemented to contain more or less sets of registers, more or less registers in each set or more or less data in each register without departing from the broader scope of the invention.

In one embodiment, the integer registers 201 are implemented to store thirty-two bits, the registers 209 are implemented to store eighty bits (all eighty bits are used for storing floating point data, while only sixty-four are used for packed data) and the extension registers 210 are implemented to store 128 bits. In addition, extension registers 210 may contain eight registers, $XR_0$ 213a through $XR_7$ 213h. $XR_1$ 213a, $XR_2$ 213b and $R_3$ 213c are examples of individual registers in registers 210. In another embodiment, the integer registers 201 each contain 64 bits, the registers 210 each contain 64 bits and registers 210 contains sixteen registers. In one embodiment two registers of registers 210 may be operated upon as a pair. In yet another alternative embodiment, registers 210 contains thirty-two registers.

Figure 3:
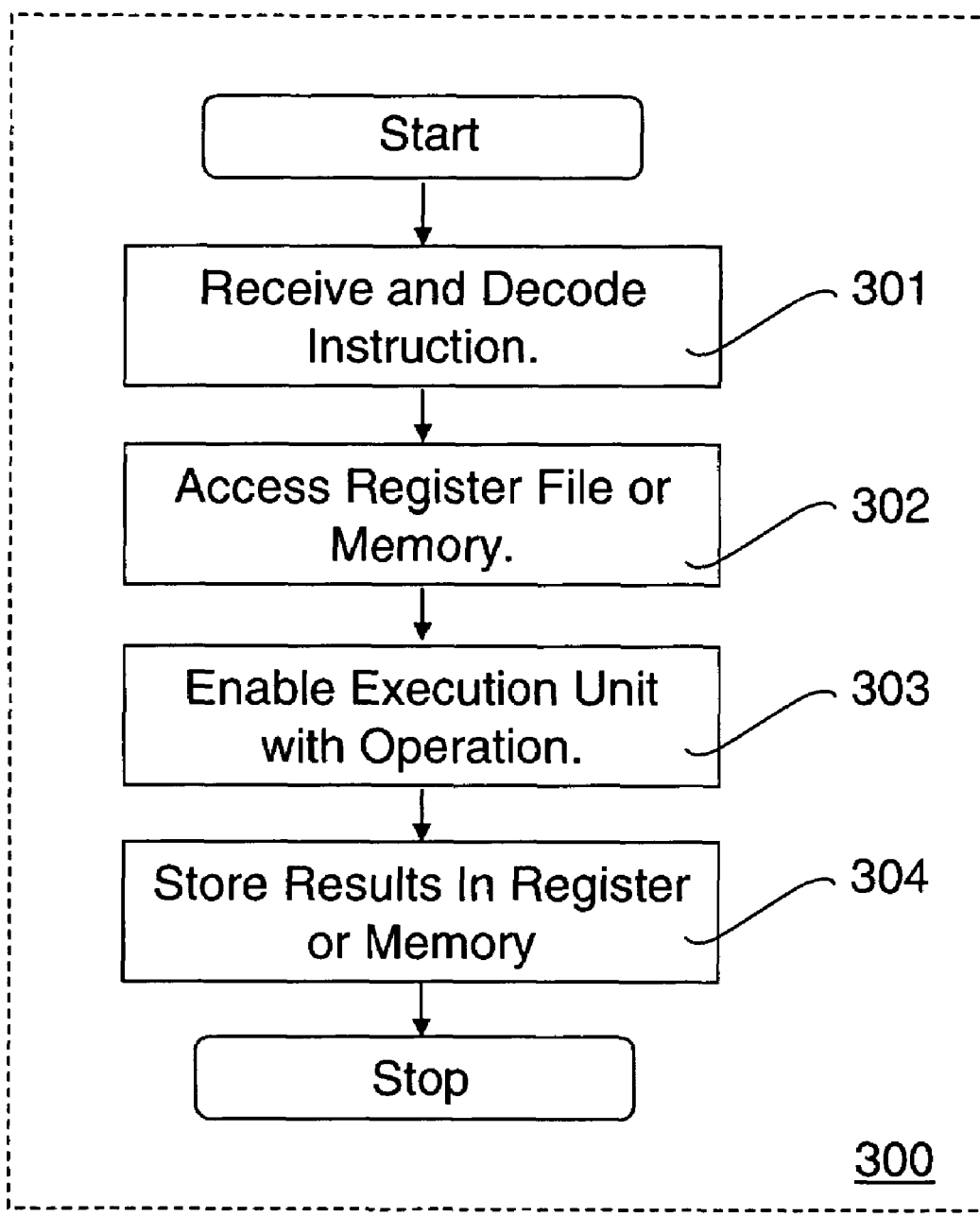
FIG. 3 illustrates a flow diagram for one embodiment of a process used by the processor to manipulate data.

FIG. 3 illustrates a flow diagram for one embodiment of a process 300 to manipulate data according to one embodiment of the invention. That is, FIG. 3 illustrates the a process followed, for example, by processor 109 while performing an operation on packed data, performing an operation on unpacked data, or performing some other operation. Process 300 and other processes herein disclosed are performed by processing blocks that may comprise dedicated hardware or software or firmware operation codes executable by general purpose machines or by special purpose machines or by a combination of both.

In processing block 301, the decoder 165 receives a control signal from either the cache 160 or bus 101. Decoder 165 decodes the control signal to determine the operations to be performed.

In processing block 302, Decoder 165 accesses the register file 150, or a location in memory. Registers in the register file 150, or memory locations in the memory, are accessed depending on the register address specified in the control signal. For example, for an operation on packed data, the control signal can include SRC1, SRC2 and DEST register addresses. SRC1 is the address of the first source register. SRC2 is the address of the second source register. In some cases, the SRC2 address is optional as not all operations require two source addresses. If the SRC2 address is not required for an operation, then only the SRC1 address is used. DEST is the address of the destination register where the result data is stored. In one embodiment, SRC1 or SRC2 is also used as DEST. SRC1, SRC2 and DEST are described more fully in relation to FIGS. 6a-6d. The data stored in the corresponding registers is referred to as Source1, Source2, and Result respectively. In one embodiment, each of these data may be sixty-four bits in length. In an alternative embodiment, these data may be sixty-four or one hundred twenty-eight bits in length.

In another embodiment of the invention, any one, or all, of SRC1, SRC2 and DEST, can define a memory location in the addressable memory space of processor 109 or processing core 110. For example, SRC1 may identify a memory location in main memory 104, while SRC2 identifies a first register in integer registers 201 and DEST identifies a second register in registers 209. For simplicity of the description herein, the invention will be described in relation to accessing the register file 150. However, these accesses could be made to memory instead.

In processing block 303, execution unit 130 is enabled to perform the operation on the accessed data. In processing block 304, the result is stored back into register file 150 according to requirements of the control signal.

Data Storage Formats

FIG. 4a illustrates packed data-types according to one embodiment of the invention. Three packed data formats are illustrated; packed byte 411, packed word 412, and packed doubleword 413. Packed byte, in one embodiment of the invention, is sixty-four bits long containing eight data elements. In an alternative embodiment, packed byte may be sixty-four or one hundred twenty-eight bits long containing eight or sixteen data elements. Each data element is one byte long. Generally, a data element is an individual piece of data that is stored in a single register (or memory location) with other data elements of the same length. In one embodiment of the invention, the number of data elements stored in a register is sixty-four bits or one hundred twenty-eight bits divided by the length in bits of a data element.

Packed word 412 may be sixty-four or one hundred twenty-eight bits long and contains four or eight word 412 data elements. Each word 412 data element contains sixteen bits of information.

Packed doubleword 413 may be sixty-four or one hundred twenty-eight bits long and contains two or four doubleword 413 data elements. Each doubleword 413 data element contains thirty-two bits of information.

FIG. 4a also illustrates a quadword 414 data-type according to one embodiment of the invention. Each quadword 414 data element contains sixty-four bits of information.

FIG. 4b illustrates packed data-types according to one alternative embodiment of the invention. Four packed data formats are illustrated; packed byte 421, packed half 422, packed single 423 and packed double 424. Packed byte, in one embodiment of the invention, is one hundred twenty-eight bits long containing sixteen data elements. In an alternative embodiment, packed byte may be sixty-four or one hundred twenty-eight bits long containing eight or sixteen data elements. Each data element is one byte long.

Packed half 422 may be sixty-four or one hundred twenty-eight bits long and contains four or eight half 422 data elements. Each half 422 data element contains sixteen bits of information.

Packed single 423 may be sixty-four or one hundred twenty-eight bits long and contains two or four single 423 data elements. Each single 423 data element contains thirty-two bits of information.

Packed double 424 may be sixty-four or one hundred twenty-eight bits long and contains one or two double 424 data elements. Each double 424 data element contains sixty-four bits of information.

In one embodiment of the invention, packed single 423 and packed double 424 may be packed floating point data elements. In an alternative embodiment of the invention, packed single 423 and packed double 424 may be packed integer, packed Boolean or packed floating point data elements. In another alternative embodiment of the invention, packed byte 421, packed half 422, packed single 423 and packed double 424 may be packed integer or packed Boolean data elements. In alternative embodiments of the invention, not all of the packed byte 421, packed half 422, packed single 423 and packed double 424 data formats may be permitted.

FIGS. 5a-5d illustrate the in-register packed data storage representation according to one embodiment of the invention. Unsigned packed byte in-register representation 510 illustrates the storage of an unsigned packed byte, for example in one of the registers $R_0$ 212a through $R_7$ 212h or in half of one of the registers $XR_0$ 213a through $XR_7$ 213h. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight data elements accessed, one operation can now be performed on eight data elements simultaneously. Signed packed byte in-register representation 511 illustrates the storage of a signed packed byte. Note that the eighth bit of every byte data element is the sign indicator.

Unsigned packed word in-register representation 512 illustrates how word three through word zero are stored in one register of registers 209 or in half of a register of registers 210. Bit fifteen through bit zero contain the data element information for word zero, bit thirty-one through bit sixteen contain the information for data element word one, bit forty-seven through bit thirty-two contain the information for data element word two and bit sixty-three through bit forty-eight contain the information for data element word three. Signed packed word in-register representation 513 is similar to the unsigned packed word in-register representation 512. Note that the sixteenth bit of each word data element is the sign indicator.

Unsigned packed doubleword in-register representation 514 shows how registers 209 or registers 210, for example, store two doubleword data elements. Doubleword zero is stored in bit thirty-one through bit zero of the register. Doubleword one is stored in bit sixty-three through bit thirty-two of the register. Signed packed doubleword in-register representation 515 is similar to unsigned packed doubleword in-register representation 514. Note that the necessary sign bit is the thirty-second bit of the doubleword data element.

Unsigned packed quadword in-register representation 516 shows how registers 210 store two quadword data elements. Quadword zero is stored in bit sixty-three through bit zero of the register. Quadword one is stored in bit one hundred twenty-seven through bit sixty-four of the register. Signed packed quadword in-register representation 517 is similar to unsigned packed quadword in-register representation 516. Note that the necessary sign bit is the sixty-fourth bit of the quadword data element.

As mentioned previously, registers 209 may be used for both packed data and floating point data. In this embodiment of the invention, the individual programming processor 109 may be required to track whether an addressed register, $R_0$ 212a for example, is storing packed data or floating point data. In an alternative embodiment, processor 109 could track the type of data stored in individual registers of registers 209. This alternative embodiment could then generate errors if, for example, a packed addition operation were attempted on floating point data.

Operation Encoding Formats

Figure 6A:
FIGS. 6a-6d illustrate operation encoding (opcode) formats for indicating the use of packed data according to various alternative embodiments of the invention.

Turning next to FIG. 6a, in some alternative embodiments, 64 bit single instruction multiple data (SIMD) arithmetic operations may be performed through a coprocessor data processing (CDP) instruction. Operation encoding (opcode) format 601 depicts one such CDP instruction having CDP opcode fields 611 and 618. The type of CDP instruction, for alternative embodiments of multiply-add/subtract operations, may be encoded by one or more of fields 612, 613, 616 and 617. Up to three operand locations per instruction may be identified, including up to two source operand identifiers SRC1 602 and SRC2 603 and one destination operand identifier DEST 605. One embodiment of the coprocessor can operate on 8, 16, 32, and 64 bit values. For one embodiment, the multiply-addition/subtraction is performed on fixed-point or integer data values. For alternative embodiments, multiply-addition/subtraction may be performed on floating-point data values. In some embodiments, the multiply-add/subtract instructions may be executed conditionally, using condition field 610. For some multiply-add/subtract instructions source data sizes may be encoded by field 612.

In some embodiments of the multiply-add/subtract instructions, Zero (Z), negative (N), carry (C), and overflow (V) detection can be done on SIMD fields. Also, signed saturation and/or unsigned saturation to the SIMD field width may be performed for some embodiments of multiply-add/subtract operations and horizontal-add/subtract operations. In some embodiments of the multiply-add/subtract instructions and horizontal-add/subtract operations in which saturation is enabled, saturation detection may also be done on SIMD fields. For some instructions, the type of saturation may be encoded by field 613. For other instructions, the type of saturation may be fixed.

Figure 6B:

FIG. 6b is a depiction of an alternative operation encoding (opcode) format 621, having twenty-four or more bits, and register/memory operand addressing modes corresponding with a type of opcode format described in the "IA-32 Intel Architecture Software Developer's Manual Volume 2: Instruction Set Reference," (Order number 245471) which is available from Intel Corporation, Santa Clara, Calif. on the world-wide-web (www) at developer.intel.com. The type of operation may be encoded by one or more of fields 622 and 624. Up to two operand locations per instruction may be identified, including up to two source operand identifiers SRC1 602 and SRC2 603. For one embodiment of the multiply-add/subtract instruction and the horizontal-add/subtract instruction, destination operand identifier DEST 605 is the same as source operand identifier SRC1 602. For an alternative embodiment, destination operand identifier DEST 605 is the same as source operand identifier SRC2 603. Therefore, for embodiments of the multiply-add/subtract operations and horizontal add/subtract operations, one of the source operands identified by source operand identifiers SRC1 602 and SRC2 603 is overwritten by the results of the multiply-add/subtract operations and horizontal add/subtract operations. For one embodiment of the multiply-add/subtract instruction and horizontal add/subtract instruction, operand identifiers SRC1 602 and SRC2 603 may be used to identify 64-bit source and destination operands.

Figure 6C:

FIG. 6c is a depiction of an alternative operation encoding (opcode) format 631, having thirty-two or more bits, and register/memory operand addressing modes. The type of operation may be encoded by one or more of fields 632 and 634 and up to two operand locations per instruction may be identified, including up to two source operand identifiers SRC1 602 and SRC2 603. For example, in one embodiment of the multiply-add instruction, field 632 may be set to a hexadecimal value of 0F38 and field 634 may be set to a hexadecimal value of 04 to indicate that data associated with source operand identifier SRC1 602 is to be treated as unsigned packed bytes, data associated with source operand identifier SRC2 603 is to be treated as signed packed bytes and result data associated with destination operand identifier DEST 605 is to be treated as signed packed words.

For one embodiment, destination operand identifier DEST 605 is the same as source operand identifier SRC1 602. For an alternative embodiment, destination operand identifier DEST 605 is the same as source operand identifier SRC2 603. For one embodiment of the multiply-add/subtract instruction, operand identifiers SRC1 602 and SRC2 603 of opcode format 631 may be used to identify 64-bit source and destination operands. For an alternative embodiment of the multiply-add/subtract instruction, operand identifiers SRC1 602 and SRC2 603 may be used to identify 128-bit source and destination operands.

In one embodiment of the horizontal-add instruction, field 632 may be set to a hexadecimal value of 0F38 and field 634 may be set to a hexadecimal value of 01 to indicate that data associated with source operand identifiers 602 and 603 are to be treated as signed packed words and result data associated with destination operand identifier 605 are to be treated as signed packed words. For an alternative embodiment of the horizontal-add instruction, field 614 may be set to a hexadecimal value of 03 to indicate that result data associated with destination operand identifier 605 are to be saturated to signed word values. For another alternative embodiment of the horizontal-add instruction, field 614 may be set to a hexadecimal value of 02 to indicate that data associated with source operand identifiers 602 and 603 are to be treated as signed packed doublewords and result data associated with destination operand identifier 605 are to be treated as signed packed doublewords.

For one embodiment of the horizontal-subtract instruction, field 614 may be set to a hexadecimal value of 05 to indicate that data associated with source operand identifiers 602 and 603 are to be treated as signed packed words and result data associated with destination operand identifier 605 are to be treated as signed packed words. For an alternative embodiment of the horizontal-subtract instruction, field 614 may be set to a hexadecimal value of 07 to indicate that result data associated with destination operand identifier 605 are to be saturated to signed word values. For another alternative embodiment of the horizontal-subtract instruction, field 614 may be set to a hexadecimal value of 06 to indicate that data associated with source operand identifiers 602 and 603 are to be treated as signed packed doublewords and result data associated with destination operand identifier 605 are to be treated as signed packed doublewords.

For one embodiment of the horizontal-add/subtract instruction, prefix byte 610 may be used to identify 128-bit source and destination operands. For example, in one embodiment of the horizontal-add/subtract instruction, field 610 may be set to a hexadecimal value of 66 to indicate that 128 bits of data are associated with source operand identifiers 602 and 603 and 128 bits of result data are associated with destination operand identifier 605. For one embodiment of the horizontal-add/subtract instruction, destination operand identifier 605 is the same as source operand identifier 602. For an alternative embodiment, destination operand identifier 605 is the same as source operand identifier 603. Therefore, for embodiments of the horizontal-add/subtract operations, one of the source operands identified by source operand identifiers 602 and 603 is overwritten by the results of the horizontal-add/subtract operations.

For one embodiment, opcode format 621, opcode format 631 and other opcode formats described in the "IA-32 Intel Architecture Software Developer's Manual Volume 2: Instruction Set Reference," (available from Intel Corporation, Santa Clara, Calif. on the world-wide-web at developer.intel.com) are each supported by decoder 165. In alternative embodiments of decoder 165, a plurality of instructions, each potentially having a different opcode format, may be decoded concurrently or in parallel. It will be appreciated that the decoding of opcode formats in a timely manner may be of critical importance to the performance of a processor such as processor 109. One of the unique requirements of decoding multiple opcode formats of variable lengths is determining precisely where each instruction begins. In order to accomplish this requirement, the lengths of each of the plurality of opcode formats must be determined.

For example, in one embodiment of opcode format 621, determining the length of an instruction requires examination of up to 27 bits from fields 622, 624, 626, 602, 603 and potentially from a 3-bit base field of an optional scale-index-base (SIB) byte (not shown), which is described in the "IA-32 Intel Architecture Software Developer's Manual Volume 2: Instruction Set Reference." It will be appreciated that, if determining the length of an instruction using opcode format 631 requires examination of more bits than determining the length of an instruction using opcode format 621, additional complexity and/or delays may be incurred.

For one embodiment of the multiply-add instruction and the horizontal-add instruction, field 632 may be set to a hexadecimal value of 0F38, which may be used in a manner substantially similar to that of fields 622 in determining the length of an instruction. Further, when field 632 is set to the hexadecimal value of 0F38, field 634 may be ignored by decoder 165 in determining the length of the instruction, thereby requiring examination of no more than 27 bits from fields 632, 626, 602, 603 and potentially from the 3-bit base field of an optional SIB byte. Thus opcode format 631 may be implemented in such a way as to provide additional flexibility and diversity of instruction encodings and avoid introduction of unnecessary complexity and/or delays in decoder 165.

Figure 6D:

FIG. 6d is a depiction of another alternative operation encoding (opcode) format 641, having forty or more bits. Opcode format 641 corresponds with opcode format 631 and comprises an optional prefix byte 640. The type of multiply-add/subtract operation and/or horizontal-add/subtract operation, may be encoded by one or more of fields 640, 632 and 634. Up to two operand locations per instruction may be identified by source operand identifiers SRC1 602 and SRC2 603 and by prefix byte 640. For one embodiment of the multiply-add/subtract instruction and/or horizontal-add/subtract instruction, prefix byte 640 may be used to identify 128-bit source and destination operands. For example, in one embodiment of the multiply-add instruction and/or horizontal-add/subtract instruction, prefix byte 640 may be set to a hexadecimal value of 66, to indicate that 128 bits of data from one of the extension registers 210 are associated with source operand identifiers SRC1 602 and SRC2 603 and 128 bits of result data from one of the extension registers 210 are associated with destination operand identifier DEST 605.

For one embodiment of the multiply-add/subtract instruction and/or horizontal-add/subtract instruction, destination operand identifier DEST 605 is the same as source operand identifier SRC1 602. For an alternative embodiment, destination operand identifier DEST 605 is the same as source operand identifier SRC2 603. Therefore, for embodiments of the multiply-add/subtract operations and/or horizontal-add/subtract operations, one of the source operands identified by source operand identifiers SRC1 602 and SRC2 603 of opcode format 631 or opcode format 641 is overwritten by the results of the multiply-add/subtract operations or horizontal-add/subtract operations. Opcode formats 621, 631 and 641 allow register to register, memory to register, register by memory, register by register, register by immediate, register to memory addressing specified in part by MOD fields 626 and by optional scale-index-base and displacement bytes.

Description of Saturate/Unsaturate

As mentioned previously, in some embodiments multiply-add/subtract opcodes may indicate whether operations optionally saturate. In some alternative embodiments saturation may not be optional for a given multiply-add/subtract instruction or horizontal-add/subtract instruction. Where the result of an operation, with saturate enabled, overflows or underflows the range of the data, the result will be clamped. Clamping means setting the result to a maximum or minimum value should a result exceed the range's maximum or minimum value. In the case of underflow, saturation clamps the result to the lowest value in the range and in the case of overflow, to the highest value. The allowable range for each data format is shown in Table 5.

TABLE 5

| Data Format | Minimum Value | Maximum Value |
| --- | --- | --- |
| Unsigned Byte | 0 | 255 |
| Signed Byte | −128 | 127 |
| Unsigned word | 0 | 65535 |
| Signed word | −32768 | 32767 |
| Unsigned Doubleword | 0 | $2^{32}-1$ |
| Signed Doubleword | $-2^{31}$ | $2^{31}-1$ |
| Unsigned Quadword | 0 | $2^{64}-1$ |
| Signed Quadword | $-2^{63}$ | $2^{63}-1$ |

Therefore, using the unsigned byte data format, if an operation's result=258 and saturation was enabled, then the result would be clamped to 255 before being stored into the operation's destination register. Similarly, if an operation's result=−32999 and processor 109 used signed word data format with saturation enabled, then the result would be clamped to −32768 before being stored into the operation's destination register.

Multiply-Add/Subtract Operation(s)

In one embodiment of the invention, the SRC1 register contains packed data (Source1), the SRC2 register contains packed data (Source2), and the DEST register will contain the result (Result) of performing the multiply-add or multiply-subtract instruction on Source1 and Source2. In the first step of the multiply-add and multiply-subtract instruction, Source1 will have each data element independently multiplied by the respective data element of Source2 to generate a set of respective intermediate results. These intermediate results are summed by pairs to generate the Result for the multiply-add instruction. In contrast, these intermediate results are subtracted by pairs to generate the Result for the multiply-subtract instruction.

In some current processors, the multiply-add and multiply-subtract instructions operate on signed packed data and truncate the results to avoid any overflows. In addition, these instructions operate on packed word data and the Result is a packed double word. However, alternative embodiments could support these instructions for other packed data types. For example, an alternative embodiment may support the multiply-add or the multiply-subtract instructions on packed byte data wherein the Result is a packed word.

Figure 7A:
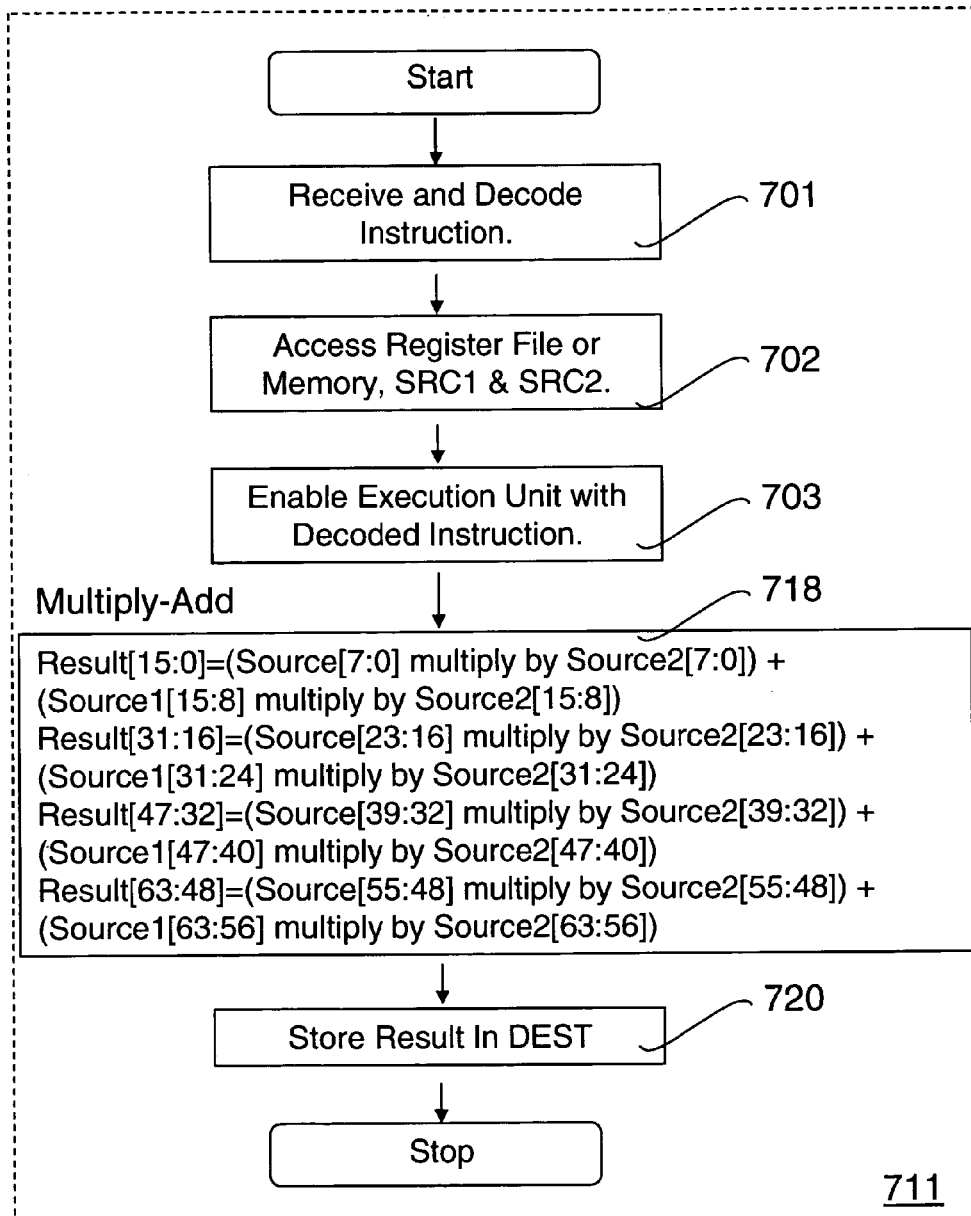
FIGS. 7a-7b illustrate flow diagrams for various alternative embodiments of processes for performing multiply-add and multiply-subtract operations on packed data.

FIG. 7a is illustrates a flow diagram for one embodiment of a process 700 for performing multiply-add and multiply-subtract operations on packed data according to one embodiment of the invention. Process 700 and other processes herein disclosed are performed by processing blocks that may comprise dedicated hardware or software or firmware operation codes executable by general purpose machines or by special purpose machines or by a combination of both.

In processing block 701, decoder 165 decodes the control signal received by processor 109. Thus, decoder 165 decodes the operation code for a multiply-add instruction.

In processing block 702, via internal bus 170, decoder 165 accesses registers 209 in register file 150 given the SRC1 602 and SRC2 603 addresses. Registers 209 provide execution unit 130 with the packed data stored in the SRC1 602 register (Source1), and the packed data stored in SRC2 603 register (Source2). That is, registers 209 (or extension registers 210) communicate the packed data to execution unit 130 via internal bus 170. As noted above, Source1 data and Source2 data may be accessed from memory as well as from registers 209 (or extension registers 210) and the term "register" as used in these examples is not intended to limit the access to any particular kind of storage device. Rather, various embodiments, for example opcode formats 621, 631 and 641, allow register to register, memory to register, register by memory, register by register, register by immediate, register to memory addressing. Therefore, a register of an embodiment need only be capable of storing and providing data, and performing the functions described herein.

In processing block 703, decoder 165 enables execution unit 130 to perform the instruction. If the instruction is a multiply-add instruction for processing byte data, flow passes to processing block 718.

In processing block 718, the following is performed. Source1 bits seven through zero are multiplied by Source2 bits seven through zero generating a first 16-bit intermediate result (Intermediate Result 1). Source1 bits fifteen through eight are multiplied by Source2 bits fifteen through eight generating a second 16-bit intermediate result (Intermediate Result 2). Source1 bits twenty-three through sixteen are multiplied by Source2 bits twenty-three through sixteen generating a third 16-bit intermediate result (Intermediate Result 3). Source1 bits thirty-one through twenty-four are multiplied by Source2 bits thirty-one through twenty-four generating a fourth 16-bit intermediate result (Intermediate Result 4). Source1 bits thirty-nine through thirty-two are multiplied by Source2 bits thirty-nine through thirty-two generating a fifth 16-bit intermediate result (Intermediate Result 5). Source1 bits forty-seven through forty are multiplied by Source2 bits forty-seven through forty generating a sixth 16-bit intermediate result (Intermediate Result 6). Source1 bits fifty-five through forty-eight are multiplied by Source2 bits fifty-five through forty-eight generating a seventh 16-bit intermediate result (Intermediate Result 7). Source1 bits sixty-three through fifty-six are multiplied by Source2 bits sixty-three through fifty-six generating an eighth 16-bit intermediate result (Intermediate Result 8). Intermediate Result 1 is added to Intermediate Result 2 generating Result bits fifteen through zero, Intermediate Result 3 is added to Intermediate Result 4 generating Result bits thirty-one through sixteen, Intermediate Result 5 is added to Intermediate Result 6 generating Result bits forty-seven through thirty-two, and Intermediate Result 7 is added to Intermediate Result 8 generating Result bits sixty-three through forty-eight.

Processing of a multiply-subtract instruction on byte data is substantially the same as processing block 718, with the exception that Intermediate Result 1 and Intermediate Result 2 are subtracted to generate Result bits fifteen through zero, Intermediate Result 3 and Intermediate Result 4 are subtracted to generate Result bits thirty-one through sixteen, Intermediate Result 5 and Intermediate Result 6 are subtracted to generate Result bits forty-seven through thirty-two, and Intermediate Result 7 and Intermediate Result 8 are subtracted to generate Result bits sixty-three through forty-eight. Different embodiments may perform the multiplies and adds/subtracts serially, in parallel, or in some combination of serial and parallel operations.

In processing block 720, the Result is stored in the DEST register.

In one embodiment of processing block 718, byte elements of Source1 are treated as unsigned values and byte elements of Source2 are treated as signed values during multiplication. In another embodiment of processing block 718, Intermediate Results 1-8 are added/subtracted using signed saturation. It will be appreciated that alternative embodiments of process 711 may implement additional processing blocks to support additional variations of the multiply-add or multiply-subtract instructions.

Figure 7B:
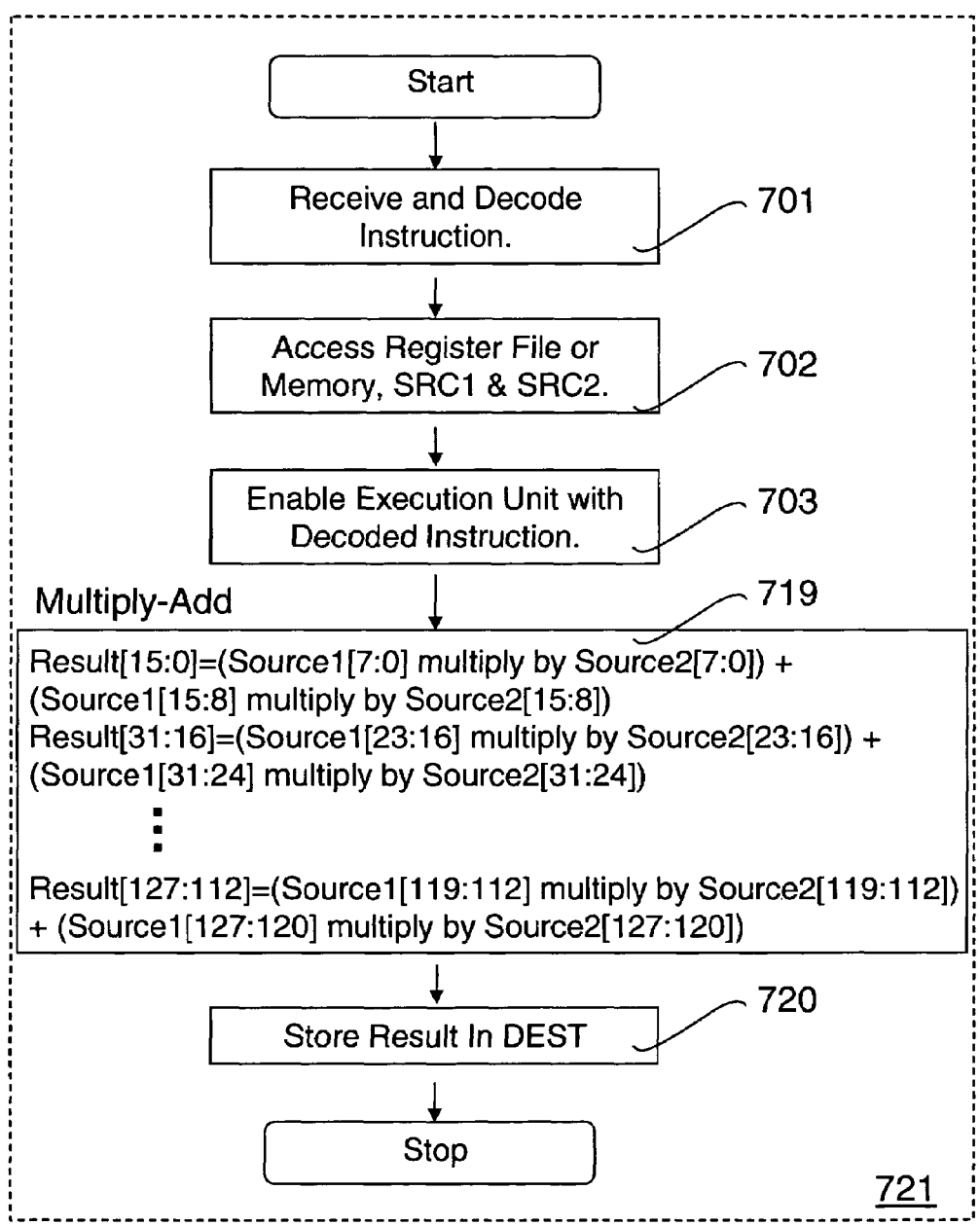

FIG. 7*b* illustrates a flow diagram for an alternative embodiment of a process 721 for performing multiply-add operation on packed data. Processing blocks 701 through 703 are essentially the same as in process block 711, with the exception that in processing block 703, the instruction is a multiply-add instruction for performing byte multiplications on 128-bit packed data, and so flow passes to processing block 719.

In processing block 719, the multiplication operations are substantially the same as processing block 718, with the exception that in similarity to Source1 bits seven through zero being multiplied by Source2 bits seven through zero to generate a first 16-bit intermediate result (Intermediate Result 1) and so forth through Source1 bits sixty-three through fifty-six being multiplied by Source2 bits sixty-three through fifty-six to generate an eighth 16-bit intermediate result (Intermediate Result 8), Source1 bits seventy-one through sixty-four are also multiplied by Source2 bits seventy-one through sixty-four to generate a ninth 16-bit intermediate result (Intermediate Result 9) and so forth through Source1 bits one hundred twenty-seven through one hundred and twenty which are multiplied by Source2 bits one hundred twenty-seven through one hundred and twenty to generate a sixteenth 16-bit intermediate result (Intermediate Result 16). Then Intermediate Results 1 and 2 are added generating Result bits fifteen through zero, and so forth with pairs of Intermediate Results 3 and 4, Intermediate Results 5 and 6, . . . through Intermediate Results 15 and 16 which are added together respectively generating Result bits thirty-one through sixteen, Result bits forty-seven through thirty-two, . . . through Result bits one hundred and twenty-seven through one hundred and twelve.

Again, in processing block 720, the Result is stored in the DEST register.

It will be appreciated that alternative embodiments of processing blocks 718 or 719 may perform multiplication operations on signed or unsigned data elements or on a combination of both. It will also be appreciated that alternative embodiments of processing blocks 718 or 719 may perform addition and/or subtraction operations with or without saturation on signed or unsigned intermediate results or on a combination of both.

Packed Data Multiply-Add/Subtract Circuits

In one embodiment, the multiply-add and multiply-subtract instructions can execute on multiple data elements in the same number of clock cycles as a single multiply on unpacked data. To achieve execution in the same number of clock cycles, parallelism may be used. That is, registers may be simultaneously instructed to perform the multiply-add/subtract operations on the data elements. This is discussed in more detail below.

Figure 8A:
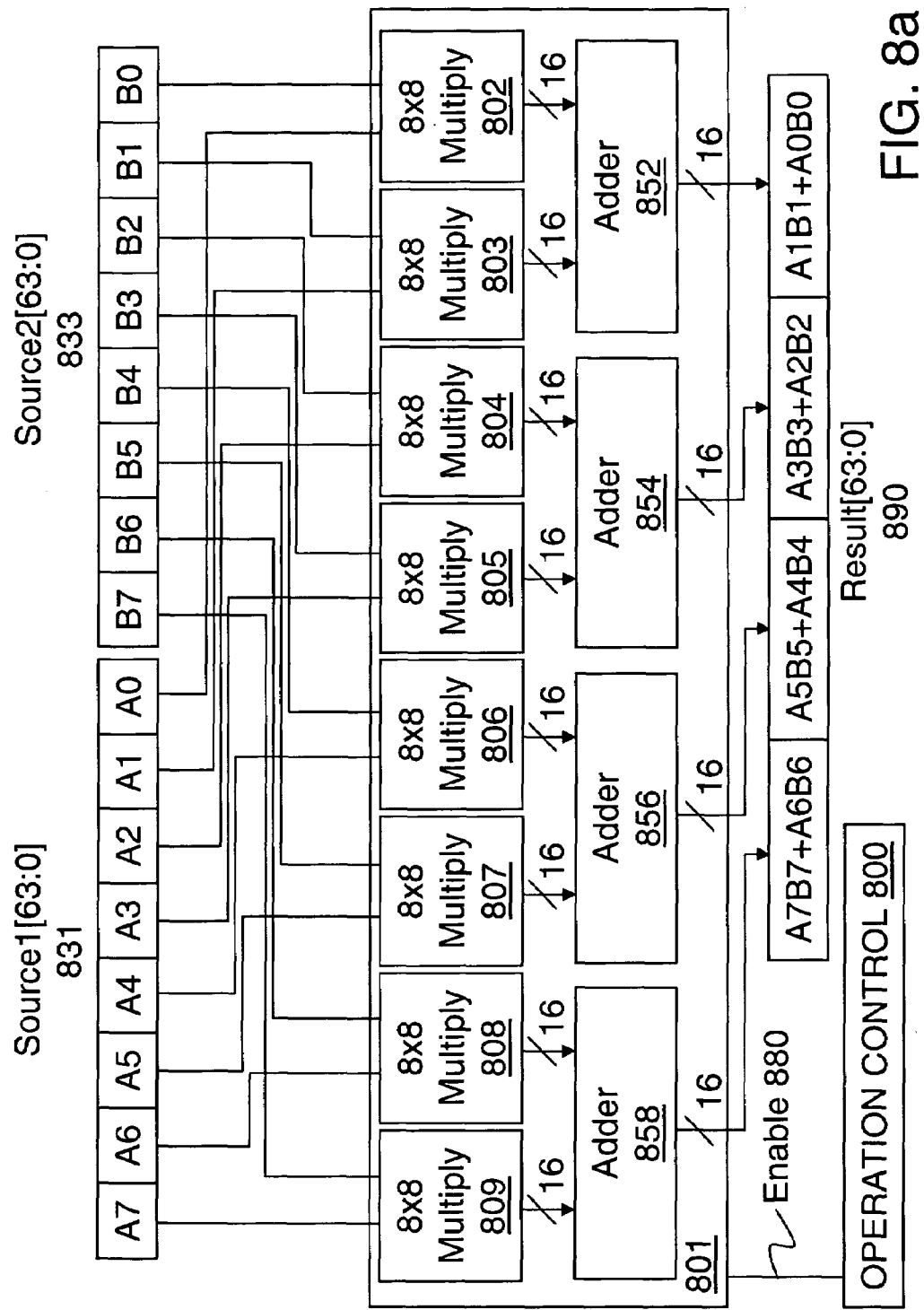
FIGS. 8a-8d illustrate alternative embodiments of circuits for performing multiply-add and multiply-subtract operations on packed data.

FIG. 8*a* illustrates a circuit for performing multiply-add and/or multiply-subtract operations on packed data according to one embodiment of the invention. FIG. 8*a* depicts a first source, Source1[63:0] 831, and a second source, Source2[63:0] 831. In one embodiment, the first and second sources are stored in N-bit long SIMD registers, such as for example 128-bit Intel® SSE2 XMM registers, or for example 64-bit MMX™ registers. For two pixel vectors 831 and 833, the multiply-add instruction implemented on such registers would give the following results, Result[63:0] 891, which are stored to the destination. Accordingly, the example shows an 8-bit byte to 16-bit word embodiment of a multiply-add instruction 142 (FIG. 1). For one alternative embodiment of the multiply-add instruction, bytes in one of the sources may be signed and in the other they may be unsigned. While in some specific examples, packed data sources and destinations may be represented as having 64-bits, it will be appreciated that the principals disclosed herein may be extended to other conveniently selected lengths, such as 80-bits, 128-bits or 256-bits.

For one alternative embodiment, a source register with unsigned data is also the destination register with the 16-bit multiply-accumulate results. One reason for such a choice is that in many implementations, pixel data may be unsigned and coefficients may be signed. Accordingly, it may preferable to overwrite the pixel data because the pixel data is less likely to be needed in future calculations.

Operation control 800 outputs signals on Enable 880 to control operations performed by packed multiply-adder/subtracter 801. One embodiment of operation control 800 may comprise, for example, a decoder 165 and an instruction pointer register 211. Of course, operation control 800 may also comprise additional circuitry which is not necessary to understanding the invention. Packed multiply-adder/subtracter 801 includes: 8×8 multiply 802 through 8×8 multiply 809. 8×8 multiply 802 has 8-bit inputs A0 of Source1 831 and B0 of Source2 833. 8×8 multiply 803 has 8-bit inputs A1 and B1. 8×8 multiply 804 has 8-bit inputs A2 and B2. 8×8 multiply 805 has 8-bit inputs A3 and B3. 8×8 multiply 806 has 8-bit inputs A4 and B4. 8×8 multiply 807 has 8-bit inputs A5 and B5. 8×8 multiply 808 has 8-bit inputs A6 and B6. 8×8 multiply 809 has 8-bit inputs A7 and B7. The 16-bit intermediate results generated by 8×8 multiply 802 and 8×8 multiply 803 are received by adder 852, the 16-bit intermediate results generated by 8×8 multiply 804 and 8×8 multiply 805 are received by adder 854, the 16-bit intermediate results generated by 8×8 multiply 806 and 8×8 multiply 806 are received by adder 856 and the 16-bit intermediate results generated by 8×8 multiply 808 and 8×8 multiply 809 are received by adder 858.

Based on whether the current instruction is a multiply/add or multiply/subtract instruction, adder 852 through adder 858 add or subtract their respective 16-bit inputs. The output of adder 852 (i.e., bits 15 through 0 of the Result), the output of adder 854 (i.e., bits 31 through 16 of the Result), the output of adder 856 (i.e., bits 47 through 32 of the Result) and the output of adder 858 (i.e., bits 63 through 48 of the Result) are combined into a 64-bit packed result and communicated to Result[63:0] 890.

Alternative embodiments of byte multiply-add/subtract instructions may include but are not limited to operations for unsigned packed bytes in both sources and operations for signed packed bytes in both sources. Some embodiments of multiply-add/subtract instructions may include operations that apply to pairs of 16-bit signed words to produce 32-bit signed product. Some embodiments of multiply-add/subtract instructions may saturate results while some alternative embodiments may truncate results.

Figure 8B:
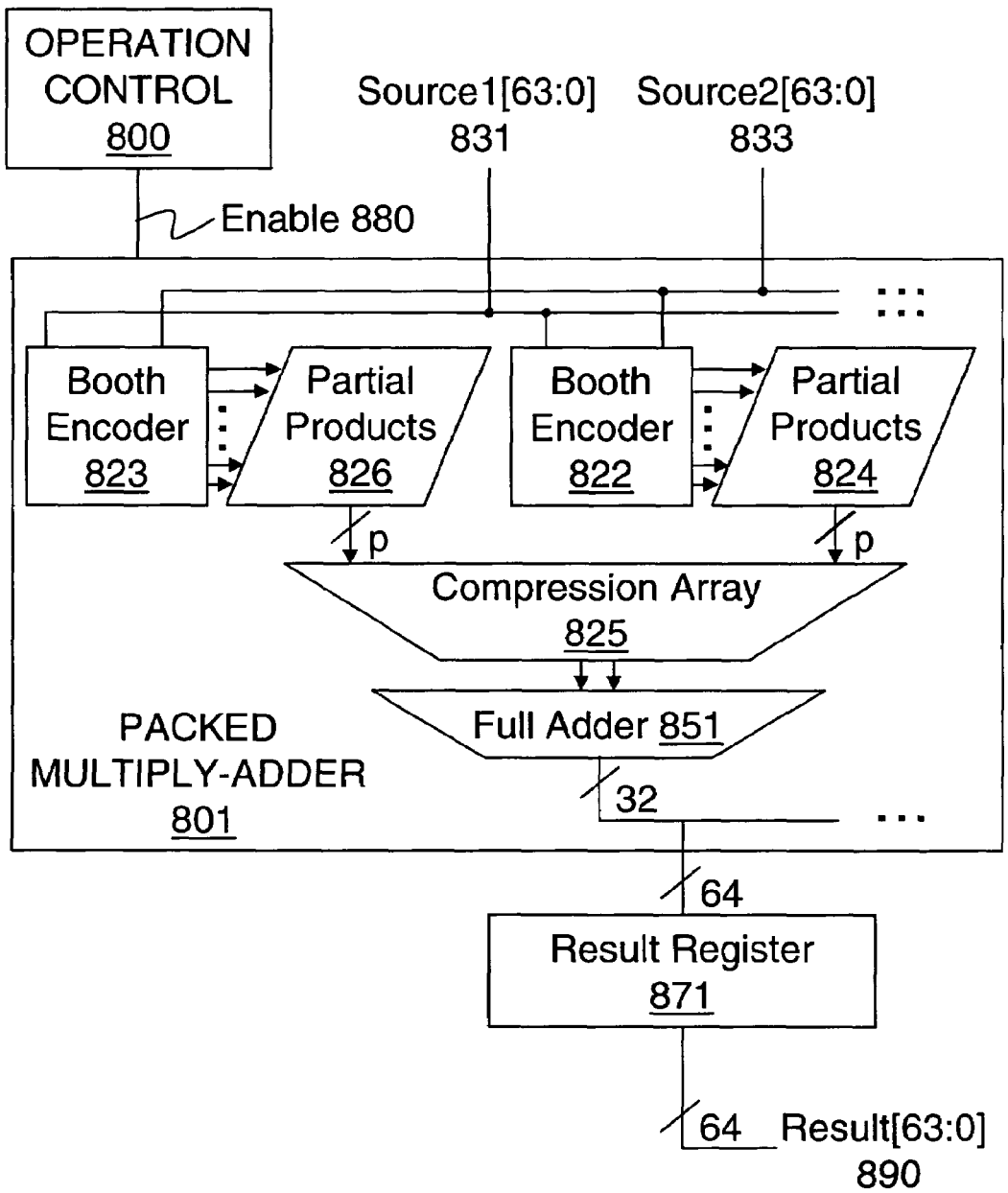

FIG. 8b illustrates a circuit for performing multiply-add and/or multiply-subtract operations on packed word data according to another alternative embodiment of the invention. Operation control 800 outputs signals on Enable 880 to control Packed multiply-adder/subtracter 801. Packed multiply-adder/subtracter 801 has inputs: Source1[63:0] 831, Source2[63:0] 831, and Enable 880. Packed multiply-adder/subtracter 801 includes 16×16 multiplier circuits and 32-bit adders. A first 16×16 multiplier comprises booth encoder 823, which has as inputs Source1[63:48] and Source2[63:48]. Booth encoder 823 selects partial products 826 based on the values of its inputs Source1[63:48] and Source2[63:48]. A second 16×16 multiplier comprises booth encoder 822, which has as inputs Source1[47:32] and Source2[47:32]. Booth encoder 822 selects partial products 824 based on the values of its inputs Source1[47:32] and Source2[47:32]. For example, in one embodiment of Booth encoder 822, the three bits, Source1[47:45], may be used to select a partial product of zero (if Source1[47:45] are 000 or 111); Source2[47:32] (if Source1[47:45] are 001 or 010); 2 times Source2[47:32] (if Source1[47:45] are 011); negative 2 times Source2[47:32] (if Source1[47:45] are 100); or negative 1 times Source2[47:32] (if Source1[47:45] are 101 or 110). Similarly, Source1[45:43], Source1[43:41], Source1[41:39], etc. may be used to select their respective partial products 824.

Partial products 824 and partial products 826 are provided as inputs to compression array 825, each group of partial products being aligned in accordance with the respective bits from Source1 used to generation them. For one embodiment compression array 825 may be implemented as a Wallace tree structure of carry-save adders. For alternative embodiments compression array 825 may be implemented as a sign-digit adder structure. The intermediate results from compression array 825 are received by adder 851.

Based on whether the current instruction is a multiply-add or multiply-subtract instruction, compression array 825 and adder 851 add or subtract the products. The outputs of the adders including adder 851 (i.e., bits 63 through 32 of the Result) are combined into the 64-bit Result and communicated to Result Register 871. It will be appreciated that alternative embodiments of packed multiplier-adder/subtracter may accept source inputs of various sizes, 128 bits for example.

Figure 8C:
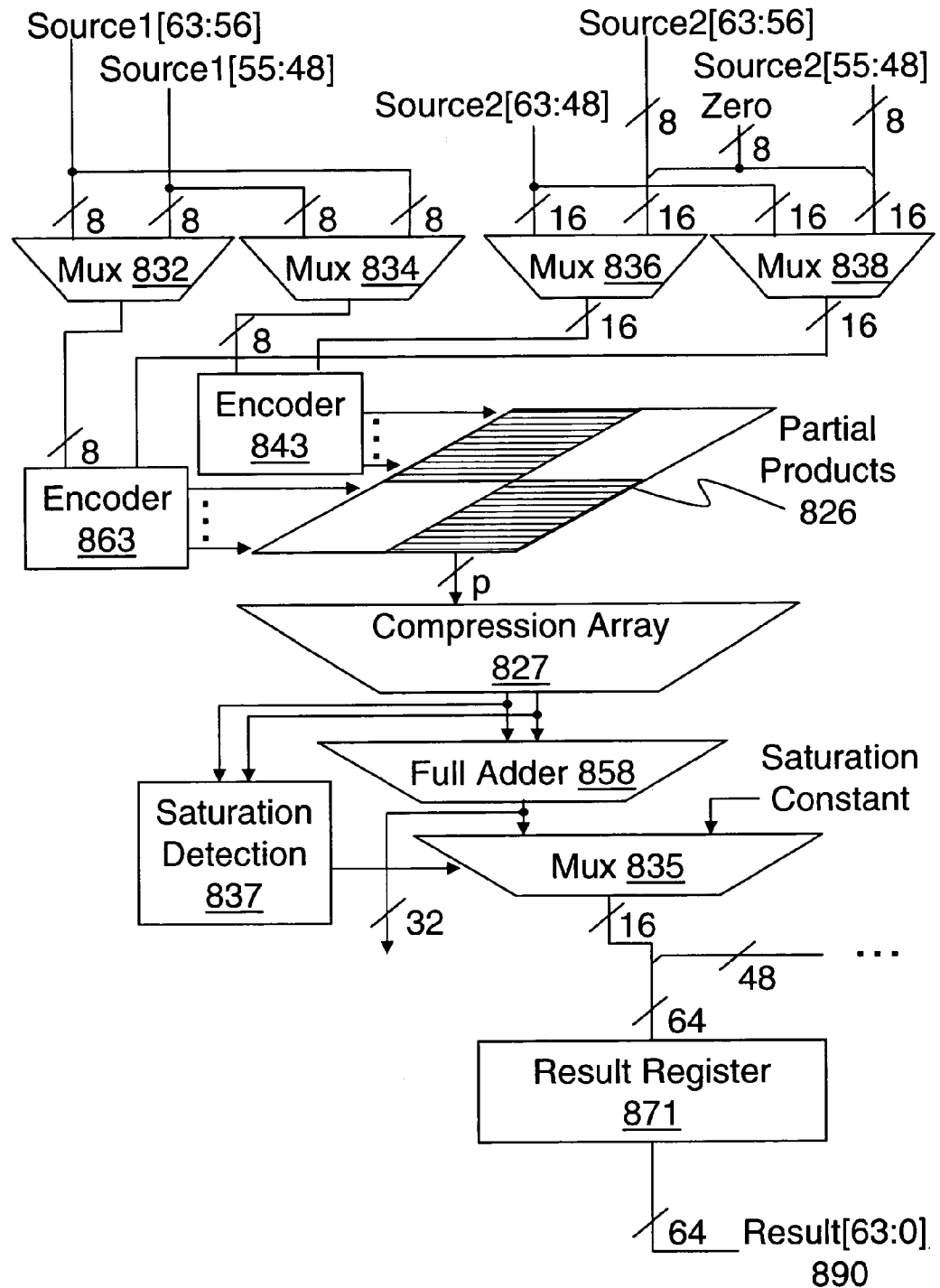

FIG. 8c illustrates a circuit for performing multiply-add and/or multiply-subtract operations on packed byte data or packed word data according to another alternative embodiment of the invention. The packed multiply-add/subtract circuit of FIG. 8d has inputs: Source1[63:48], Source2[63:48]. For one embodiment, when multiplexer (MUX) 832 selects Source1[63:56], MUX 834 selects Source1[55:48], and when MUX 836 and MUX 838 select Source2[63:48], a 16×16 multiplication may be performed substantially as described with reference to FIG. 8c. On the other hand, when MUX 832 selects Source1[55:48], MUX 834 selects Source1[63:56], MUX 836 selects Source2[63:56] and MUX 838 select Source2[55:48], two 8×8 multiplications may be performed as described below.

A 16×16 multiplier comprises encoder 863, which has as inputs Source1[55:48] from MUX 832 and Source2[55:48] from MUX 838. Encoder 863 selects partial products for the lower portion of partial products 826. Source2[55:48] from MUX 838 has eight upper bits padded with zeroes, and so the lower right quadrant of partial products 826 corresponds to partial products for the byte multiplication of Source1[55:48] and Source2[55:48], while the lower left quadrant of partial products 826 contains zeroes. The 16×16 multiplier further comprises encoder 843, which has as inputs Source1[63:56] from MUX 834 and Source2[63:56] from MUX 836. Encoder 843 selects partial products for the upper portion of partial products 826. Source2[63:56] from MUX 836 has eight lower bits padded with zeroes so the upper left quadrant of partial products 826 corresponds to partial products for the byte multiplication of Source1[63:56] and Source2[63:56], while the upper right quadrant of partial products 826 contains zeroes. It will be appreciated that by aligning the partial products as described, addition of the two 16-bit products is facilitated through addition of the partial products.

Partial products 826 are provided as inputs to compression array 827, which provides inputs to full adder 858. Partial products 826 may be aligned to also facilitate generation of a 32-bit result. Therefore, in such cases, the outputs of full adder 858 corresponding to bits twenty-three through eight contain the 16-bit sum that may be provided to MUX 835, while the full 32-bit output of full adder 858 may be provided, for example, to full adder 851 when performing multiply-add/subtract operations on packed word data. For one embodiment, the outputs of the adders including adder 858 are optionally saturated to signed 16-bit values (i.e., bits 63 through 48 of the Result) are and are then combined into the 64-bit Result and communicated to Result Register 871.

For one embodiment of saturation detection logic 837, all of the bits corresponding to the result may be examined in order to determine when to saturate. It will be appreciated that alternative embodiments of multiply-add/subtract operations, saturation detection logic 837 may examine less than all of the bits corresponding to the result.

From the inputs it is possible to determine the direction of the potential saturation and select a saturation constant to provide to MUX 851. A signed result has the potential to saturate to a negative hexadecimal value of 8000, only if both products are negative. For example, when one packed byte source has unsigned data elements and the other packed byte source has signed data elements, the negative hexadecimal saturation value of 8000 may be provided as the saturation constant to MUX 851 when both signed data elements, Source2[63:56] and Source2[55:48] for example, are negative. Similarly, since a signed result has the potential to saturate to a positive value, only if both products are positive, the positive hexadecimal saturation value of 7FFF may be provided as the saturation constant to MUX 851 when both signed data elements, Source2[63:56] and Source2[55:48] for example, are positive.

For one embodiment of the multiply-add/subtract only particular bit patterns may occur in signed results. Therefore it may be possible for saturation detection logic to identify the particular bit patterns which saturate. For example, using the sum bits, at bit positions 15 and 16 of a 17-bit adder prior to carry propagation and also using the carry-out of bit position 14, saturation detection logic may signal MUX 835 to saturate when sum[16:15] are 01, when sum[16:15] are 00 and Coutl4 is 1, or when sum[16:15] are 10 and Coutl4 is 0. Therefore saturation detection logic 837 may detect saturation before a final result is available from full adder 851.

Figure 8D:
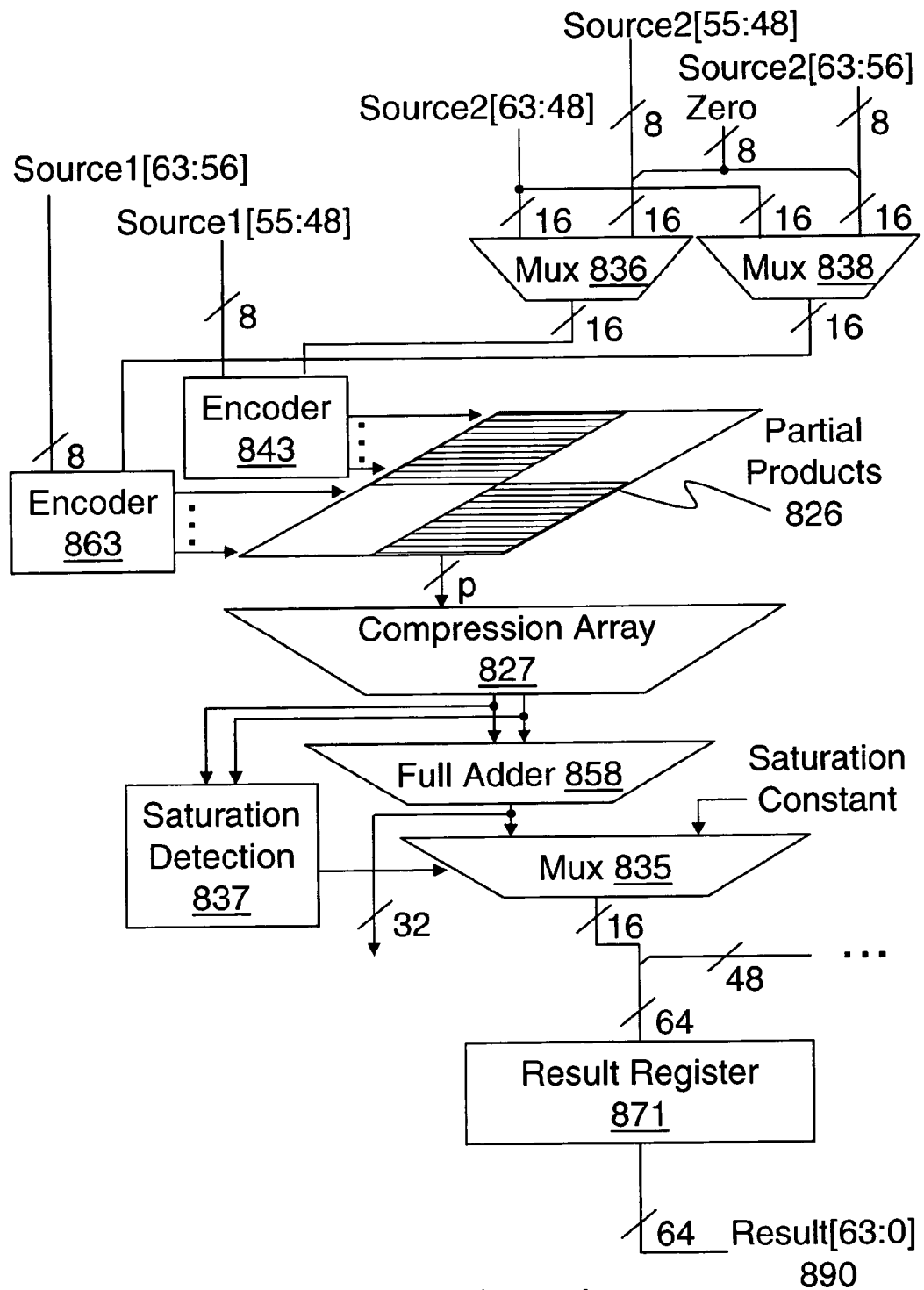

FIG. 8d illustrates another circuit for performing multiply-add and/or multiply-subtract operations on packed byte data or packed word data according to another alternative embodiment of the invention. The packed multiply-add/subtract circuit of FIG. 8e has inputs: Source1[63:48], Source2[63:48]. For one embodiment, when MUX 836 and MUX 838 select Source2[63:48], a 16×16 multiplication may be performed substantially as described with reference to FIG. 8c. On the other hand, when MUX 836 selects Source2[55:48] and MUX 838 select Source2[63:56], two 8×8 multiplications may be performed as described below.

A 16×16 multiplier comprises encoder 863, which has as inputs Source1[63:56] and Source2[63:56] from MUX 838. Encoder 863 selects partial products for the lower portion of partial products 826. Source2[63:56] from MUX 838 has eight upper bits padded with zeroes, and so the lower right quadrant of partial products 826 corresponds to partial products for the byte multiplication of Source1[63:56] and Source2[63:56], while the lower left quadrant of partial products 826 contains zeroes. The 16×16 multiplier further comprises encoder 843, which has as inputs Source1[55:48] and Source2[55:48] from MUX 836. Encoder 843 selects partial products for the upper portion of partial products 826. Source2[55:48] from MUX 836 has eight lower bits padded with zeroes so the upper left quadrant of partial products 826 corresponds to partial products for the byte multiplication of Source1[55:48] and Source2[55:48], while the upper right quadrant of partial products 826 contains zeroes. It will be appreciated that by aligning the partial products as described, addition of the two 16-bit products is facilitated through addition of the partial products.

Partial products 826 are provided as inputs to compression array 827, which provides inputs to full adder 858. Full adder 858 output bits twenty-three through eight contain the 16-bit sum that may be provided to MUX 835, while the full 32-bit output of full adder 858 may be provided, for example, to full adder 851 when performing multiply-add/subtract operations on packed word data. From the inputs it is possible to determine the direction of the potential saturation and select a saturation constant to provide to MUX 851. Saturation detection logic 837 may detect saturation before a final result is available from full adder 851. For one embodiment, the outputs of the adders including adder 858 are optionally saturated to signed 16-bit values (i.e., bits 63 through 48 of the Result) are and are then combined into the 64-bit Result and communicated to Result Register 871.

Figure 9A:
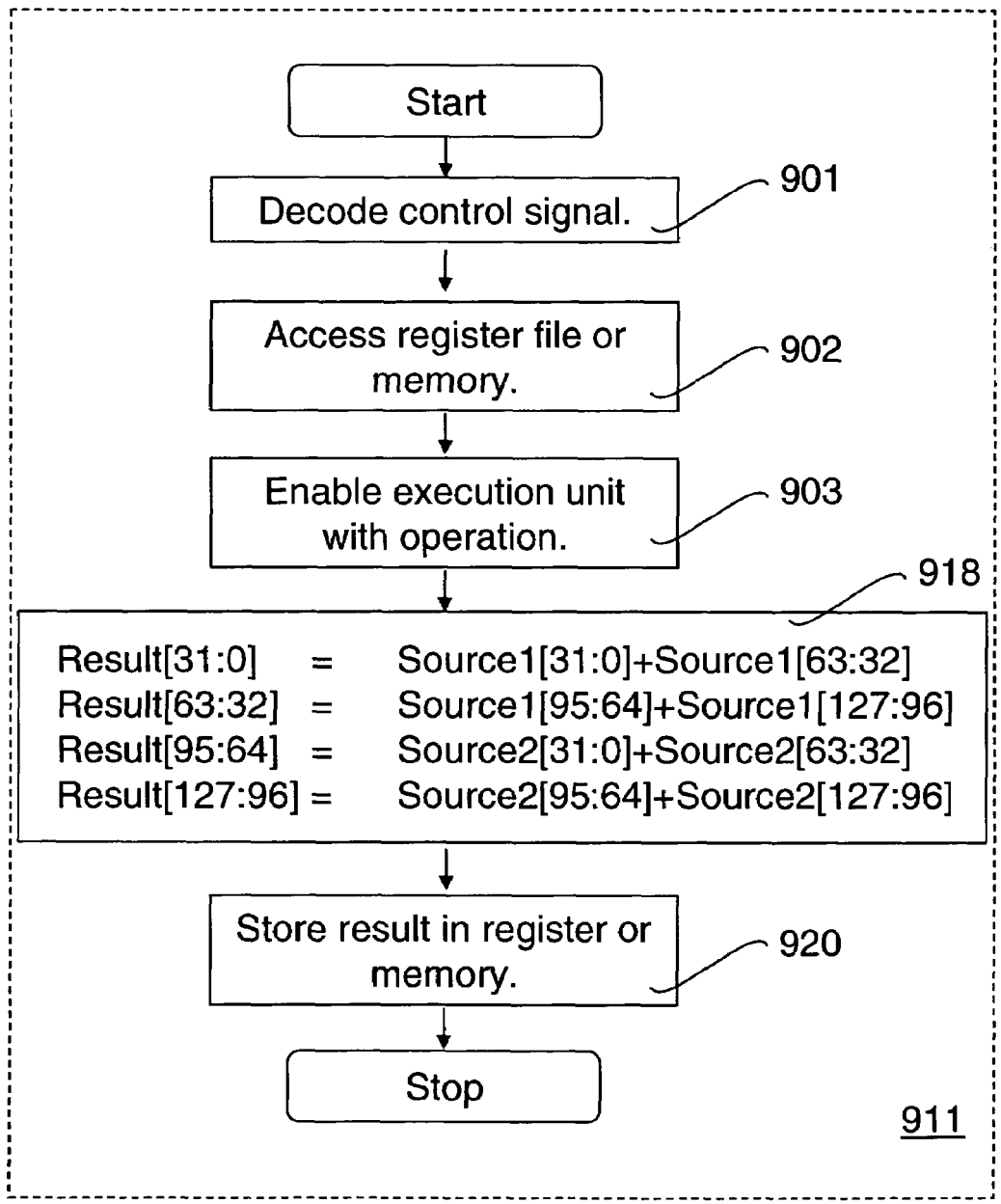
FIGS. 9a-9h illustrate flow diagrams for alternative embodiments of processes for performing horizontal-add and horizontal-subtract operations on packed data.

FIG. 9a is a flow diagram illustrating one embodiment of a process 911 for performing the horizontal-add operation (which may also be referred to as adjacent-add or intra-add). Process 911 begins from a start state and proceeds to processing block 901 where a control signal is decoded. In particular, the control signal identifies an operation code of a horizontal add or horizontal-add instruction. The process 911 then advances to processing block 902, where the registers in a register file or a memory are accessed at locations specified by the SRC1 and SRC2 addresses. The register file or memory provides an execution unit with the packed data (Source1) stored in at the SRC1 address, and the packed data (Source2) stored at the SRC2 address.

Process 911 proceeds to processing block 903, where the execution unit is enabled to perform the horizontal-add operation. Next, process 911 advances to processing block 918, where the horizontal-add operation is performed. Source1 bits thirty-one through zero are added to Source1 bits sixty-three through thirty-two, generating a first 32-bit result (Result[31:0]). Source1 bits ninety-five through sixty-four are added to Source1 bits one hundred-and-twenty-seven through ninety-six, generating a second 32-bit result (Result[63:32]). Source2 bits thirty-one through zero are added to Source2 bits sixty-three through thirty-two, generating a third 32-bit result (Result[95:64]). Source2 bits ninety-five through sixty-four are added to Source1 bits one hundred-and-twenty-seven through ninety-six, generating a fourth 32-bit result (Result[127:96]).

The process 911 advances to processing block 920, where the results of the horizontal-add instruction are stored in a register in a register file or a memory at the DEST address. The process 911 then terminates. Of course, the process of FIG. 9a can be easily altered to describe the horizontal addition of other packed data formats.

Figure 9B:
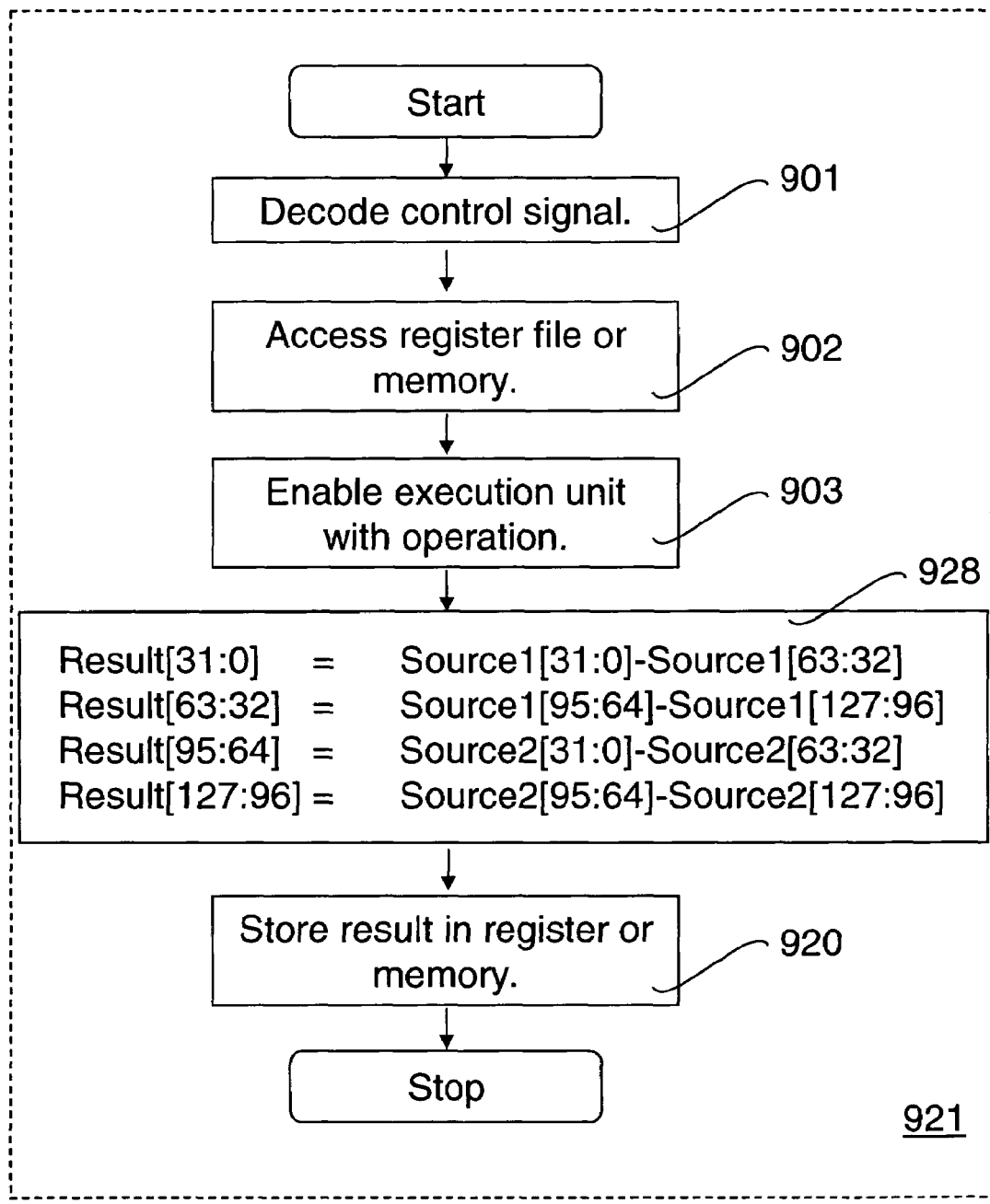

FIG. 9b is a flow diagram illustrating one embodiment of a process 921 for performing the horizontal-subtract operation. Process 921 begins from a start state and proceeds to processing block 901 where, again, a control signal is decoded. In particular, the control signal identifies an operation code of a horizontal subtract or horizontal-subtract instruction. The process 921 then advances to processing block 902, where the registers in a register file or a memory are accessed at locations specified by the SRC1 and SRC2 addresses. The register file or memory provides an execution unit with the packed data (Source1) stored in at the SRC1 address, and the packed data (Source2) stored at the SRC2 address.

Process 921 proceeds to processing block 903, where the execution unit, in accordance with the instruction decoded, is enabled to perform the horizontal-subtract operation. Next, process 921 advances to processing block 928, where the horizontal-subtract operation of is performed. Source1 bits sixty-three through thirty-two are subtracted from Source1 bits thirty-one through zero, generating a first 32-bit result (Result[31:0]). Source1 bits one hundred-and-twenty-seven through ninety-six are subtracted from Source1 bits ninety-five through sixty-four, generating a second 32-bit result (Result[63:32]). Source2 bits sixty-three through thirty-two are subtracted from Source2 bits thirty-one through zero, generating a third 32-bit result (Result[95:64]). Source2 bits one hundred-and-twenty-seven through ninety-six are subtracted from Source2 bits ninety-five through sixty-four, generating a fourth 32-bit result (Result[127:96]).

The process 921 advances to processing block 920, where the results of the horizontal-subtract instruction are stored in a register in a register file or a memory at the DEST address. The process 921 then terminates.

Figure 9C:
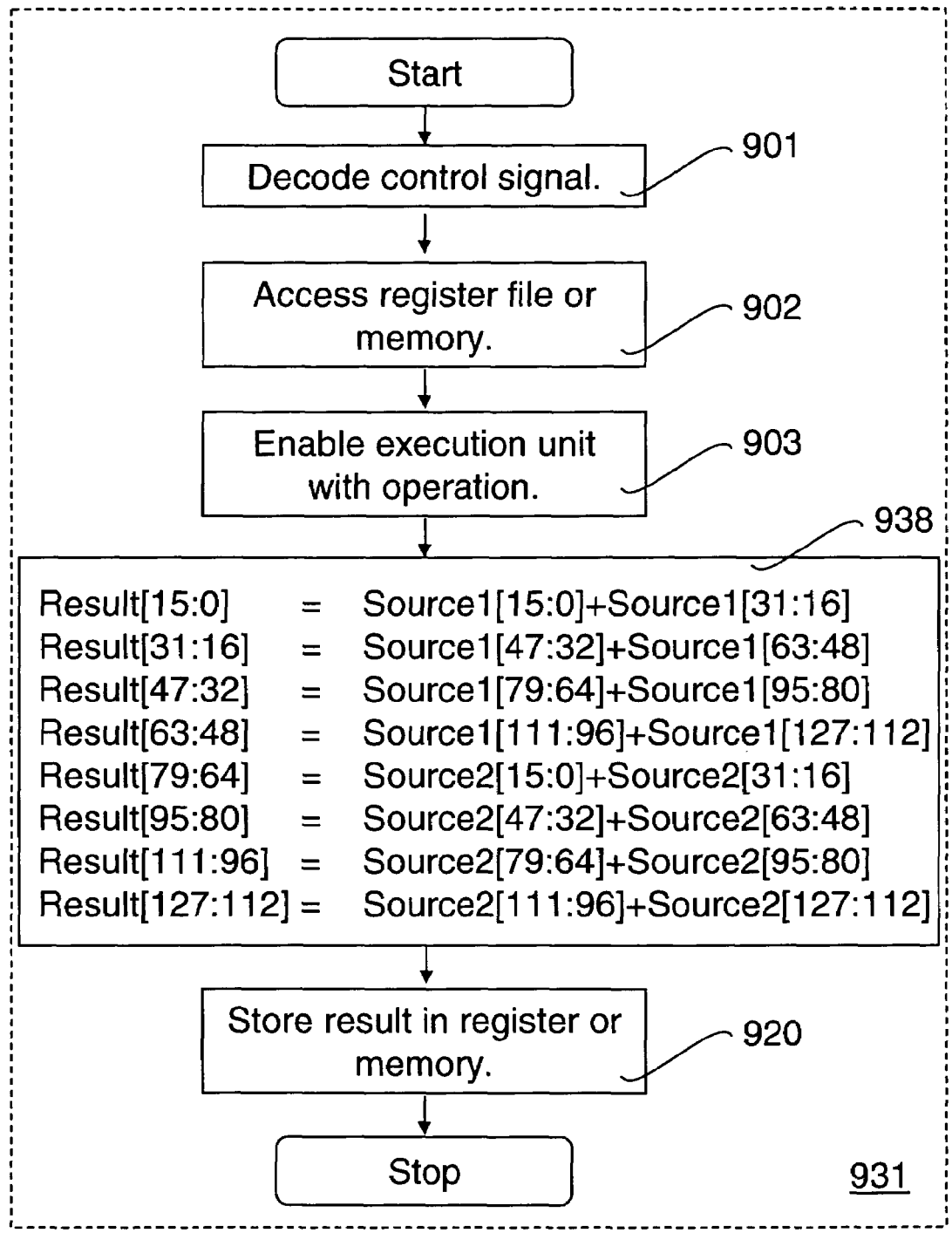

FIG. 9c is a flow diagram illustrating an alternative embodiment of a process 931 for performing the horizontal-add operation. Process 931 begins from a start state and proceeds to processing block 901 where a control signal is decoded. In particular, the control signal identifies an operation code of an horizontal-add instruction. In processing block 902 the registers in a register file or a memory are accessed according to the SRC1 SRC2 addresses. The register file or memory provides the execution unit with Source1 stored in at the SRC1 address, and Source2 stored at the SRC2 address.

In processing block 903, the execution unit is enabled to perform the horizontal-add operation. Next, in processing block 938, Source1 bits thirty-one through sixteen are added to Source1 bits fifteen through zero, generating a first 16-bit result (Result[15:0]). Source1 bits sixty-three through forty-eight are added to Source1 bits one forty-seven through thirty-two, generating a second 16-bit result (Result[31:16]). Source1 bits ninety-five through eighty are added to Source1 bits seventy-nine through sixty-four, generating a third 16-bit result (Result[47:32]). Source1 bits one hundred-and-twenty-seven through one hundred-and-twelve are added to Source1 bits one hundred-and-eleven through ninety-six, generating a fourth 16-bit result (Result[63:48]). Source2 bits thirty-one through sixteen are added to Source2 bits fifteen through zero, generating a fifth 16-bit result (Result[79:64]). Source2 bits sixty-three through forty-eight are added to Source2 bits one forty-seven through thirty-two, generating a sixth 16-bit result (Result[95:80]). Source2 bits ninety-five through eighty are added to Source2 bits seventy-nine through sixty-four, generating a seventh 16-bit result (Result[111:96]). Source2 bits one hundred-and-twenty-seven through one hundred-and-twelve are added to Source2 bits one hundred-and-eleven through ninety-six, generating an eighth 16-bit result (Result[127:112]).

The process 931 advances to processing block 920, where the results of the horizontal-add instruction are stored in a register in a register file or a memory at the DEST address. The process 931 then terminates.

Figure 9D:
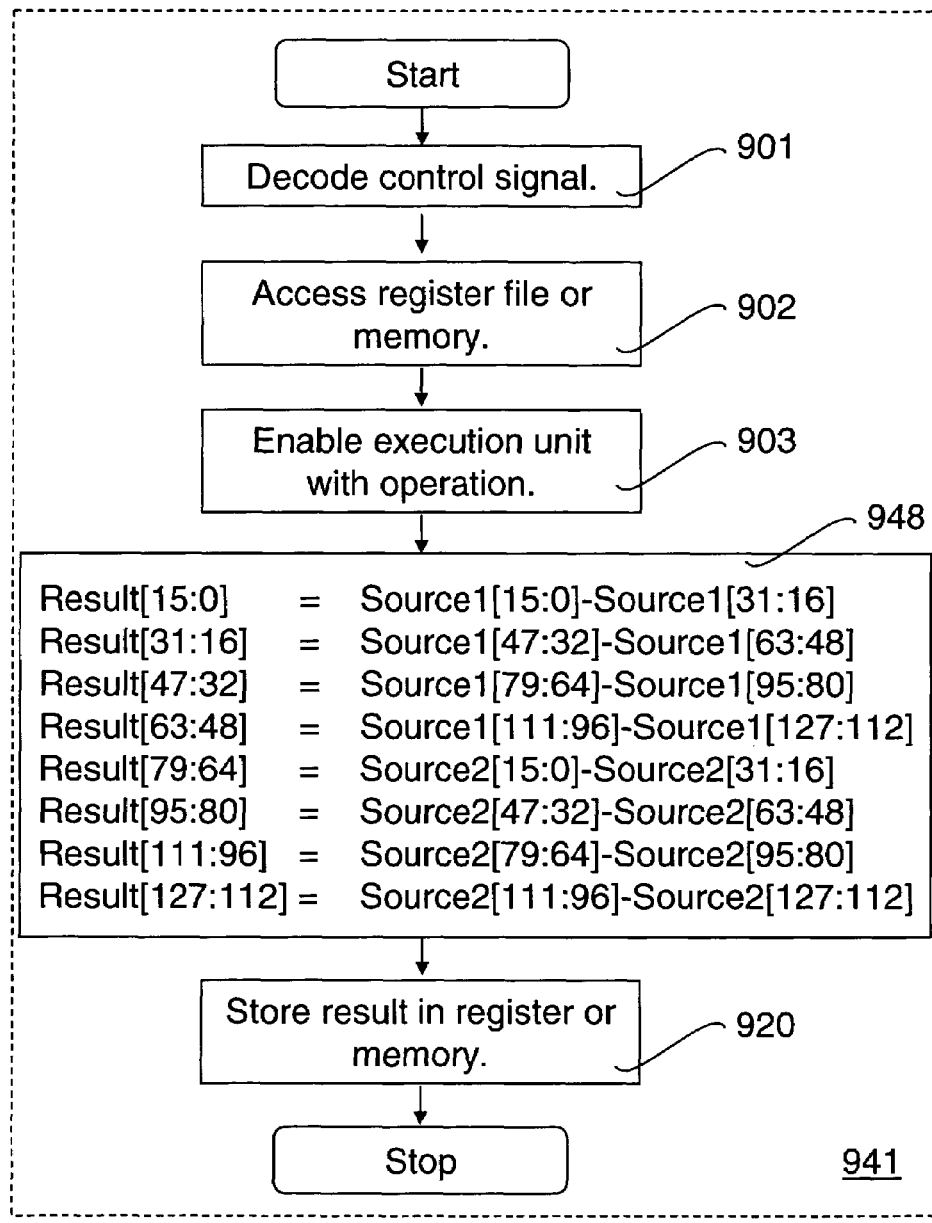

FIG. 9d is a flow diagram illustrating an alternative embodiment of a process 941 for performing the horizontal-subtract operation. Process 941 begins from a start state and proceeds to processing block 901 where a control signal is decoded. In particular, the control signal identifies an operation code of an horizontal-subtract instruction. In processing block 902 the registers in a register file or a memory are accessed according to the SRC1 and SRC2 addresses. The register file or memory provides the execution unit with Source1 stored in at the SRC1 address, and Source2 stored at the SRC2 address.

In processing block 903, the execution unit is enabled to perform the horizontal-subtract operation. Next, in processing block 948, Source1 bits thirty-one through sixteen are subtracted from Source1 bits fifteen through zero, generating a first 16-bit result (Result[15:0]). Source1 bits sixty-three through forty-eight are subtracted from Source1 bits one forty-seven through thirty-two, generating a second 16-bit result (Result[31:16]). Source1 bits ninety-five through eighty are subtracted from Source1 bits seventy-nine through sixty-four, generating a third 16-bit result (Result[47:32]). Source1 bits one hundred-and-twenty-seven through one hundred-and-twelve are subtracted from Source1 bits one hundred-and-eleven through ninety-six, generating a fourth 16-bit result (Result[63:48]). Source2 bits thirty-one through sixteen are subtracted from Source2 bits fifteen through zero, generating a fifth 16-bit result (Result[79:64]). Source2 bits sixty-three through forty-eight are subtracted from Source2 bits one forty-seven through thirty-two, generating a sixth 16-bit result (Result[95:80]). Source2 bits ninety-five through eighty are subtracted from Source2 bits seventy-nine through sixty-four, generating a seventh 16-bit result (Result[111:96]). Source2 bits one hundred-and-twenty-seven through one hundred-and-twelve are subtracted from Source2 bits one hundred-and-eleven through ninety-six, generating an eighth 16-bit result (Result[127:112]).

The process 941 advances to processing block 920, where the results of the horizontal-add instruction are stored in a register in a register file or a memory at the DEST address. The process 941 then terminates.

Figure 9E:
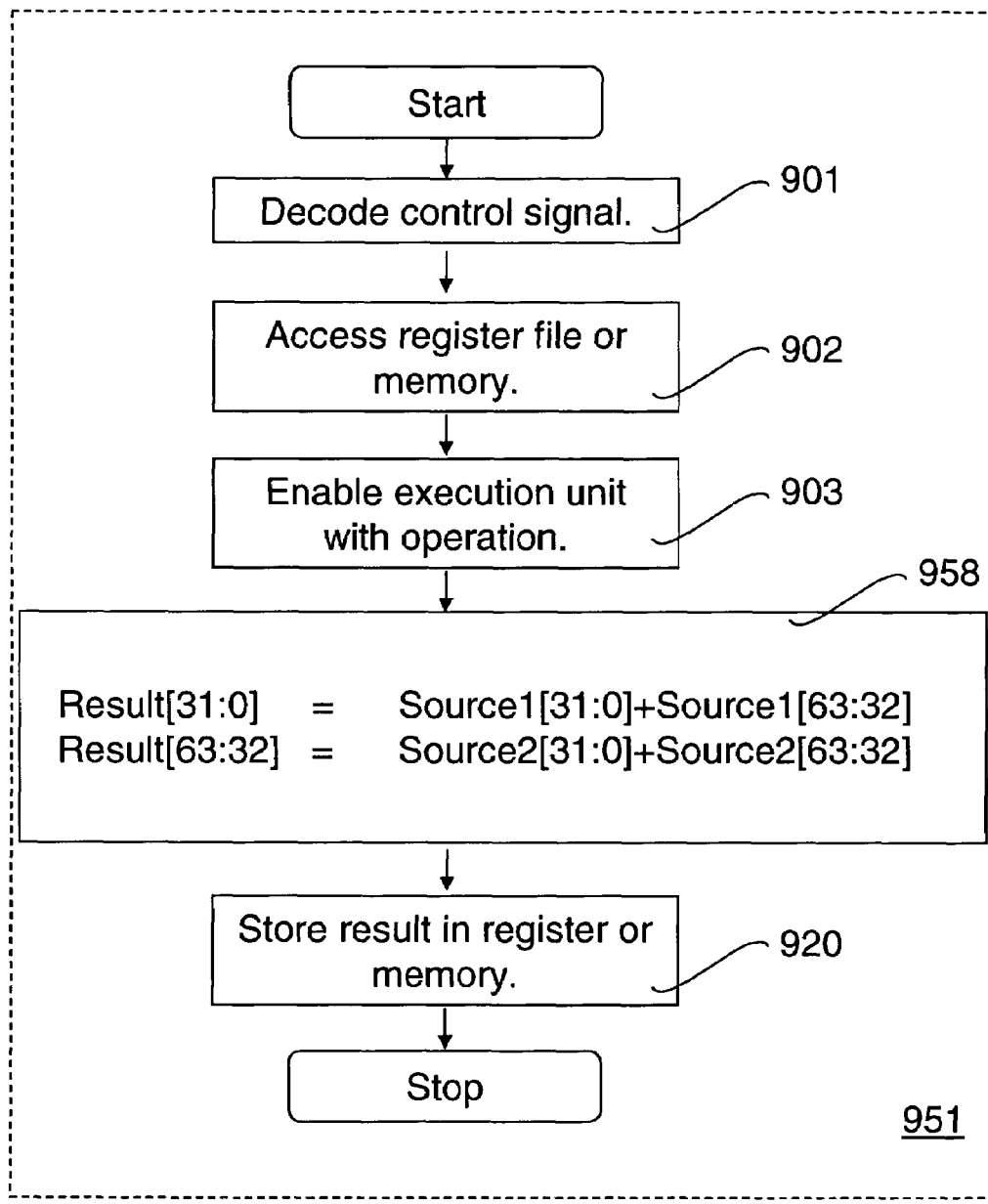

FIG. 9e is a flow diagram illustrating one embodiment of a process 951 for performing the horizontal-add operation. Process 951 begins from a start state and proceeds to processing block 901 where a control signal that identifies an operation code of an horizontal-add instruction is decoded. The process 951 then advances to processing block 902, where the registers in a register file or a memory are accessed and the execution unit is supplied with the packed data (Source1) stored in at the SRC1 address, and the packed data (Source2) stored at the SRC2 address.

Process 951 proceeds to processing block 903, where the execution unit is enabled to perform the horizontal-add operation. Next, in processing block 958, the horizontal-add operation is performed. Source1 bits thirty-one through zero are added to Source1 bits sixty-three through thirty-two, generating a first 32-bit result (Result[31:0]). Source2 bits thirty-one through zero are added to Source2 bits sixty-three through thirty-two, generating a second 32-bit result (Result[63:32]).

The process 951 advances to processing block 920, where the results of the horizontal-add instruction are stored in a register in a register file or a memory at the DEST address. The process 951 then terminates.

Figure 9F:
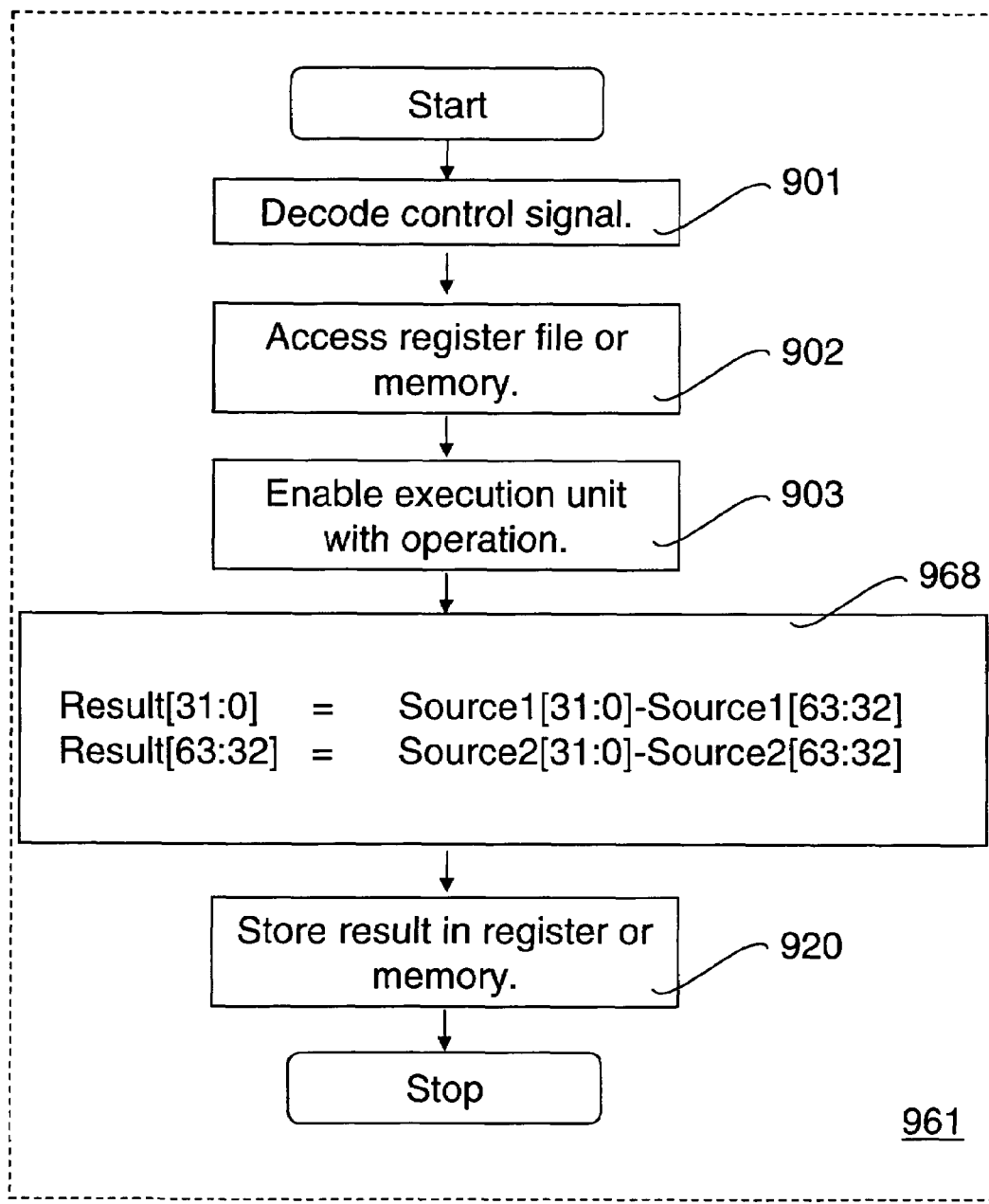

FIG. 9f is a flow diagram illustrating another alternative embodiment of a process 961 for performing the horizontal-subtract operation. Process 961 begins from a start state and proceeds to processing block 901 where, a control signal that identifies an operation code of an horizontal-subtract instruction is decoded. The process 961 then advances to processing block 902, where the registers in a register file or a memory are accessed and the execution unit is supplied with the packed data (Source1) stored in at the SRC1 address, and the packed data (Source2) stored at the SRC2 address.

Process 961 proceeds to processing block 903, where the execution unit, in accordance with the instruction decoded, is enabled to perform the horizontal-subtract operation. Next, in processing block 968, Source1 bits sixty-three through thirty-two are subtracted from Source1 bits thirty-one through zero, generating a first 32-bit result (Result[31:0]). Source2 bits sixty-three through thirty-two are subtracted from Source2 bits thirty-one through zero, generating a second 32-bit result (Result[63:32]).

The process 961 advances to processing block 920, where the results of the horizontal-subtract instruction are stored in a register in a register file or a memory at the DEST address. The process 961 then terminates.

Figure 9G:
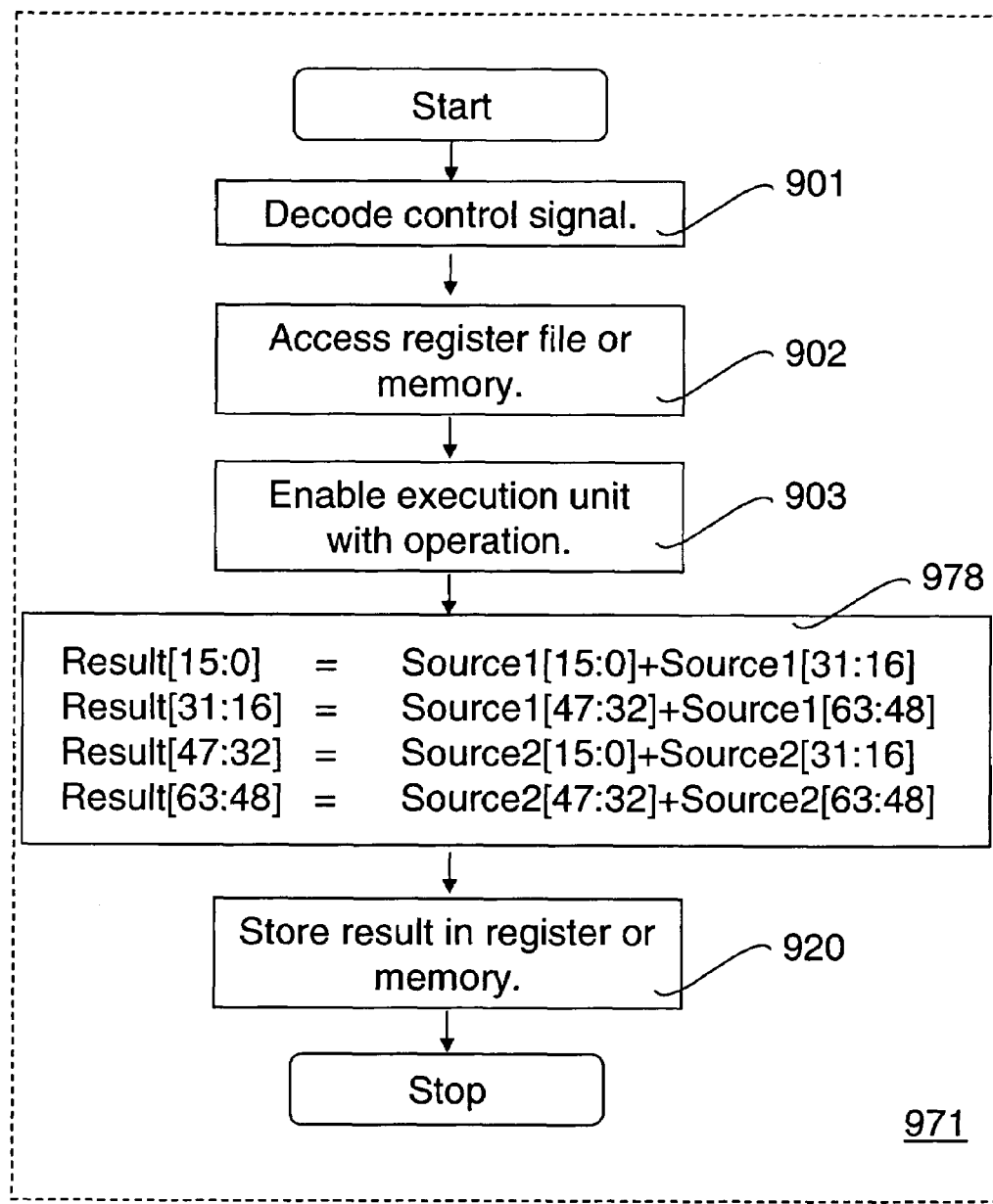

FIG. 9g is a flow diagram illustrating an alternative embodiment of a process 971 for performing the horizontal-add operation. Process 971 begins from a start state and proceeds to processing block 901 where a control signal that identifies an operation code of an horizontal-add instruction is decoded. The process 971 then advances to processing block 902, where the registers in a register file or a memory are accessed and the execution unit is supplied with the packed data (Source1) stored in at the SRC1 address, and the packed data (Source2) stored at the SRC2 address.

In processing block 903, the execution unit is enabled to perform the horizontal-add operation. Next, in processing block 978, Source1 bits thirty-one through sixteen are added to Source1 bits fifteen through zero, generating a first 16-bit result (Result[15:0]). Source1 bits sixty-three through forty-eight are added to Source1 bits one forty-seven through thirty-two, generating a second 16-bit result (Result[31:16]). Source2 bits thirty-one through sixteen are added to Source2 bits fifteen through zero, generating a third 16-bit result (Result[47:32]). Source2 bits sixty-three through forty-eight are added to Source2 bits one forty-seven through thirty-two, generating a fourth 16-bit result (Result[63:48]).

The process 971 advances to processing block 920, where the results of the horizontal-add instruction are stored in a register in a register file or a memory at the DEST address. The process 971 then terminates.

Figure 9H:
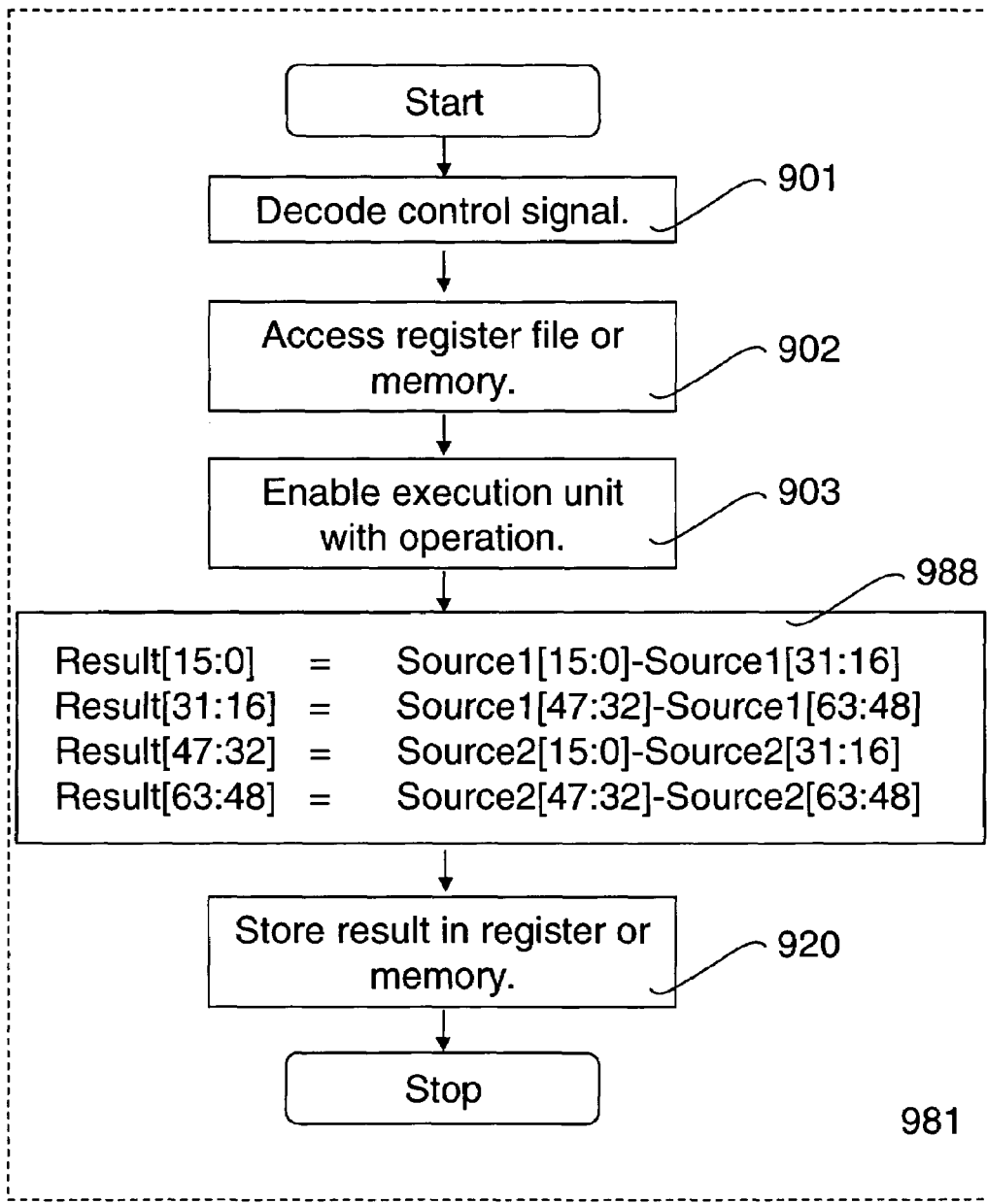

FIG. 9h is a flow diagram illustrating an alternative embodiment of a process 981 for performing the horizontal-subtract operation. Process 981 begins from a start state and proceeds to processing block 901 where a control signal that identifies an operation code of an horizontal-subtract instruction is decoded. The process 981 then advances to processing block 902, where the registers in a register file or a memory are accessed and the execution unit is supplied with the packed data (Source1) stored in at the SRC1 address, and the packed data (Source2) stored at the SRC2 address.

In processing block 903, the execution unit is enabled to perform the horizontal-add operation. Next, in processing block 988, Source1 bits thirty-one through sixteen are subtracted from Source1 bits fifteen through zero, generating a first 16-bit result (Result[15:0]). Source1 bits sixty-three through forty-eight are subtracted from Source1 bits one forty-seven through thirty-two, generating a second 16-bit result (Result[31:16]). Source2 bits thirty-one through sixteen are subtracted from Source2 bits fifteen through zero, generating a third 16-bit result (Result[47:32]). Source2 bits sixty-three through forty-eight are subtracted from Source2 bits one forty-seven through thirty-two, generating a fourth 16-bit result (Result[63:48]).

The process 981 advances to processing block 920, where the results of the horizontal-add instruction are stored in a register in a register file or a memory at the DEST address. The process 981 then terminates. It will be appreciated that any of the processes of FIGS. 9a-9h may be performed with signed saturation, with unsigned saturation or without saturation.

Packed Data Horizontal Add/Subtract Circuits

In one embodiment, the horizontal-add/subtract instructions can execute on multiple data elements in the same number of clock cycles as an horizontal-add operation on unpacked data. To achieve execution in the same number of clock cycles, parallelism is used.

Figure 10A:
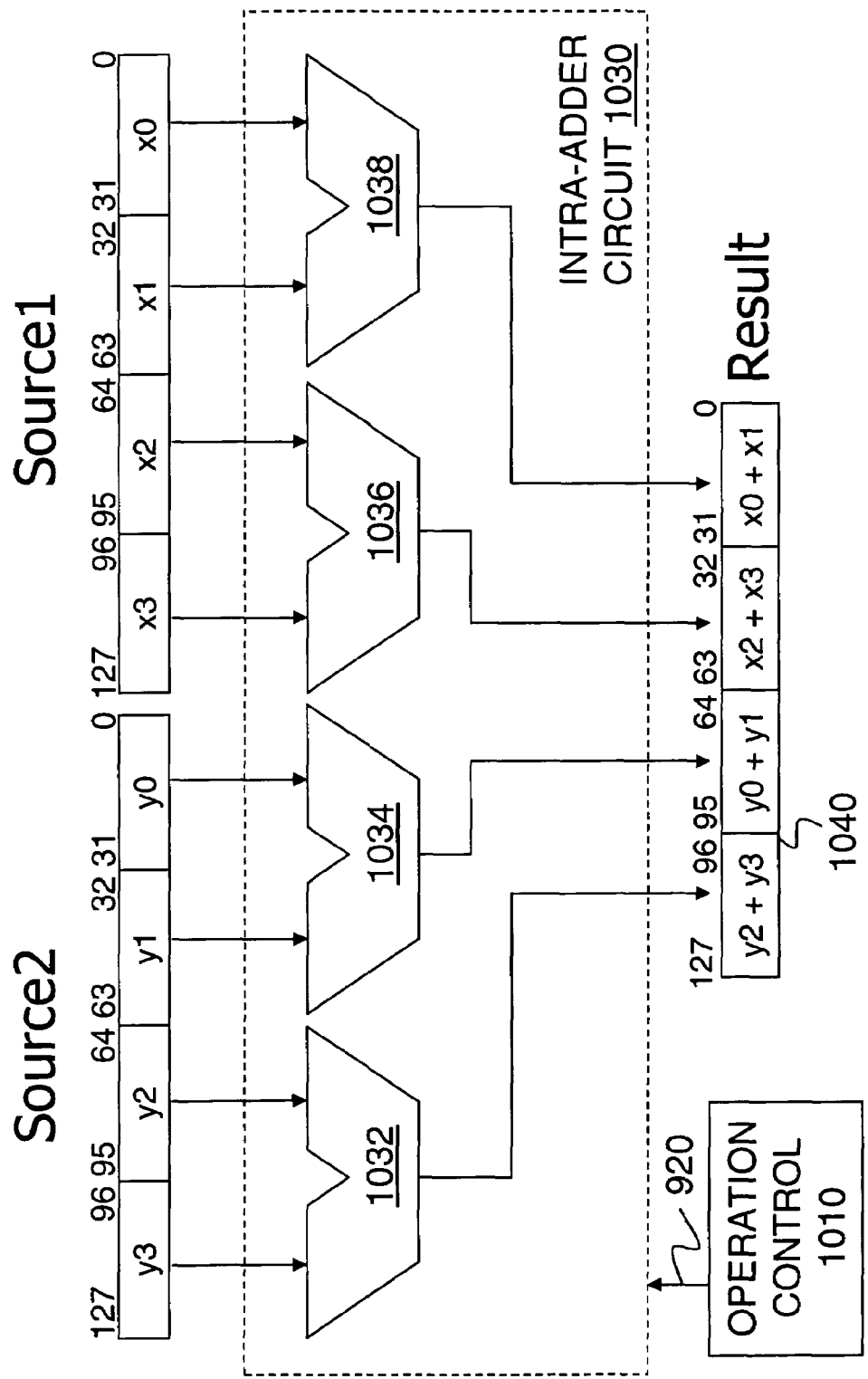
FIGS. 10a-10b illustrate alternative embodiments of circuits for performing horizontal-add and horizontal-subtract operations on packed data.

FIG. 10a illustrates one embodiment of a circuit for performing horizontal or horizontal-add/subtract operations. Operation control 1010 processes the control signal for the horizontal-add operations. Operation control 1010 outputs signals via signal line(s) 1020 to control horizontal-adder 1030.

The horizontal-adder 1030 receives inputs from Source1 [127:0], Source2[127:0], and Enable 1020. The horizontal-adder 1030 includes four adder circuits 1032, 1034, 1036 and 1038. Adder 1032 receives inputs from Source2[127:64], adder 1034 receives inputs from Source2[63:0], adder 1036 receives inputs from Source1[127:64], while adder 1038 receives inputs from Source1[63:0]. When enabled, the adders 1032, 1034, 1036 and 1038 sum their respective inputs, and each generates a 32-bit output. The results of the addition by adder 1032 (i.e., Result[127:96]), adder 1034 (i.e., Result[95:64], by adder 1036 (i.e., Result[63:32]), and by adder 1038 (i.e., Result[31:0]) are combined into the 128-bit Result and communicated to the Result Register 1040.

Figure 10B:
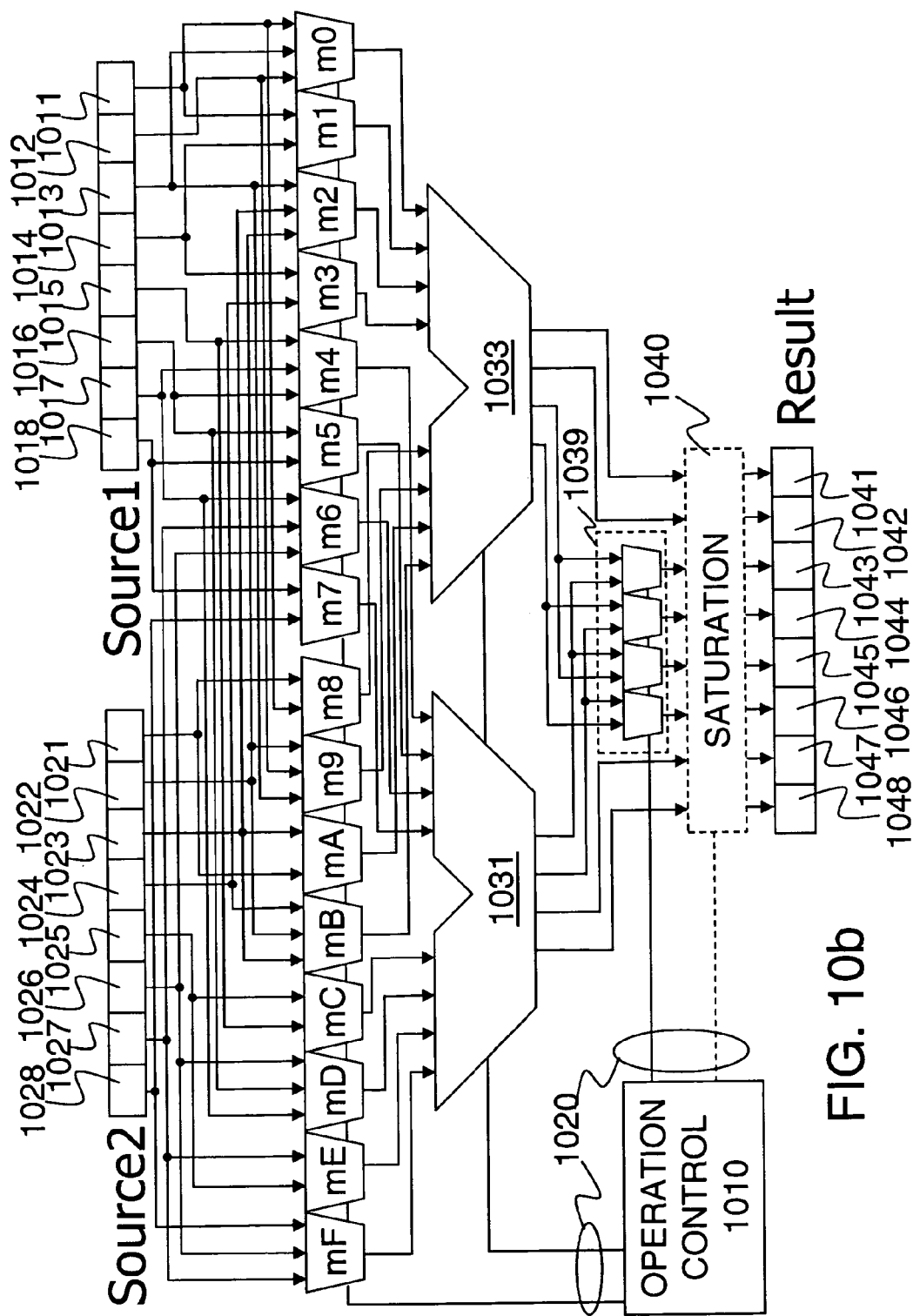

FIG. 10b illustrates an alternative embodiment of a circuit for performing horizontal or horizontal-add/subtract operations. Operation control 1010 processes the control signal for the horizontal-add/subtract operations. Operation control 1010 outputs signals via signal line(s) 1020 to control adders 1031 and 1033, multiplexers m0-mF, multiplexers 1039 and saturation circuitry 1040. Through the use of multiplexers m0-mF, operand data elements from Source1 and Source2 may be aligned to positions at the inputs of adders 1031 and 1033 to facilitate horizontal or horizontal-addition/subtraction as well as to facilitate vertical or inter-addition/subtraction. Through the use of multiplexers 1039, the results form adders 1031 and 1033 may be aligned to facilitate horizontal-addition/subtraction of different width operands, Source1 and Source2. It will be appreciated that various sizes of operand data elements and of operands Source1 and Source2 may be supported through such an approach.

For example, one embodiment of horizontal-add/subtract operations as illustrated in FIGS. 3a and 3b and as described in FIGS. 8g and 8h, respectively, uses 16-bit data elements 1014-1011 of Source1 and 1024-1021 of Source2. To accomplish such an operation through the use of adder 1033, operation control 1010 signals for the outputs of multiplexers m3-m0 to be elements 1024, 1022, 1014 and 1012 respectively. Operation control 1010 signals for the outputs of multiplexers mB-m8 to be elements 1023, 1021, 1013 and 1011 respectively. In this way adder 1033 can perform a 16-bit horizontal-addition/subtraction in substantially the same manner as a 16-bit inter-addition/subtraction, producing element 1023 plus/minus element 1024, element 1021 plus/minus element 1022, element 1013 plus/minus element 1014, and element 1011 plus/minus element 1012. Operation control 1010 also signals for the multiplexers 1039 to pass through results from the adders without realigning them and so the results may be optionally saturated and stored as elements 1044-1041 respectively.

An alternative embodiment of horizontal-add/subtract operations as illustrated in FIG. 3c and as described in FIGS. 8e and 8f, respectively, uses 32-bit data elements 1014-1013, and 1012-1011 of Source1 and 1024-1023, and 1022-1021 of Source2. To accomplish such an operation through the use of adder 1033, operation control 1010 signals for the outputs of multiplexers m3-m0 to be elements 1024, 1023, 1014 and 1013 respectively. Operation control 1010 signals for the outputs of multiplexers mB-m8 to be elements 1022, 1021, 1012 and 1011 respectively. In this way adder 1033 can perform a 32-bit horizontal-addition/subtraction in substantially the same manner as a 32-bit inter-addition/subtraction, producing element 1022-1021 plus/minus element 1024-1023, and element 1012-1011 plus/minus element 1014-1013. Once again operation control 1010 signals for the multiplexers 1039 to pass through results from the adders without realigning them and so the results may be optionally saturated and stored as two 32-bit elements 1044-1043 and 1042-1041 respectively.

Another alternative embodiment of horizontal-add/subtract operations as illustrated in FIGS. 3a and 3b and as described in FIGS. 8a and 8b, respectively, uses four 32-bit elements 1018-1017, 1016-1015, 1014-1013, and 1012-1011 of Source1 and 1028-1027, 1026-1025, 1024-1023, and 1022-1021 of Source2. To accomplish such an operation through the use of adders 1031 and 1033, operation control 1010 signals for the outputs of multiplexers m7-m0 to be elements 1028, 1027, 1018, 1017, 1024, 1023, 1014 and 1013 respectively. Operation control 1010 signals for the outputs of multiplexers mF-m8 to be elements 1026, 1025, 1016, 1015, 1022, 1021, 1012 and 1011 respectively. In this way adders 1031 and 1033 can perform 32-bit horizontal-additions/subtractions in substantially the same manner as 32-bit inter-additions/subtractions, producing element 1026-1025 plus/minus element 1028-1027, element 1016-1015 plus/minus element 1018-1017, element 1022-1021 plus/minus element 1024-1023, and element 1012-1011 plus/minus element 1014-1013. For the 128-bit operands, operation control 1010 signals for the multiplexers 1039 to realign the two middle results from the adders by swapping a result from adder 1031 (bits 95-64) with a result from adder 1033 (bits 63-32) to produce element 1026-1025 plus/minus element 1028-1027, element 1022-1021 plus/minus element 1024-1023, element 1016-1015 plus/minus element 1018-1017, and element 1012-1011 plus/minus element 1014-1013. These results may be optionally saturated and stored as four 32-bit elements 1048-1047 and 1046-1045 1044-1043 and 1042-1041 respectively.

It will be appreciated that multiplexers 1039 may provide timing advantages by reducing some of the wiring delay associated with 128-bit operands and reducing multiplexer complexity before the adder. It will also be appreciated that techniques such as those illustrated by FIG. 10b may be modified in arrangement or detail without departing from the broader spirit of the invention.

Another embodiment of horizontal-add/subtract operations as described in FIGS. 8c and 8d, respectively, uses 16-bit data elements 1018-1011 of Source1 and 1028-1021 of Source2. To accomplish such an operation through the use of adders 1031 and 1033, operation control 1010 signals for the outputs of multiplexers m7-m0 to be elements 1028, 1026, 1018, 1016, 1024, 1022, 1014 and 1012 respectively. Operation control 1010 signals for the outputs of multiplexers mF-m8 to be elements 1027, 1025, 1017, 1015, 1023, 1021, 1013 and 1011 respectively. In this way adders 1031 and 1033 can perform 16-bit horizontal-additions/subtractions in substantially the same manner as 16-bit inter-additions/subtractions, producing element 1027 plus/minus element 1028, element 1025 plus/minus element 1026, element 1017 plus/minus element 1018, element 1015 plus/minus element 1016, 1023 plus/minus element 1024, element 1021 plus/minus element 1022, element 1013 plus/minus element 1014, and element 1011 plus/minus element 1012. For the 128-bit operands, operation control 1010 signals for the multiplexers 1039 to realign the four middle results from the adders by swapping two results from adder 1031 (bits 95-64) with two results from adder 1033 (bits 63-32) to produce element 1027 plus/minus element 1028, element 1025 plus/minus element 1026, 1023 plus/minus element 1024, element 1021 plus/minus element 1022, element 1017 plus/minus element 1018, element 1015 plus/minus element 1016, element 1013 plus/minus element 1014, and element 1011 plus/minus element 1012. These results may be optionally saturated and stored as 16-bit elements 1048-1041 respectively.

For performing vertical or inter-addition/subtraction operations, operation control 1010 signals for the outputs of multiplexers m7-m0 to be elements 1018-1011 respectively and for the outputs of multiplexers mF-m8 to be elements 1028-1021 respectively. Operation control 1010 signals for the multiplexers 1039 to pass through results from the adders without realigning them and so the results may be optionally saturated according to the operation and stored as 1048-1041 respectively.

Figure 11A:
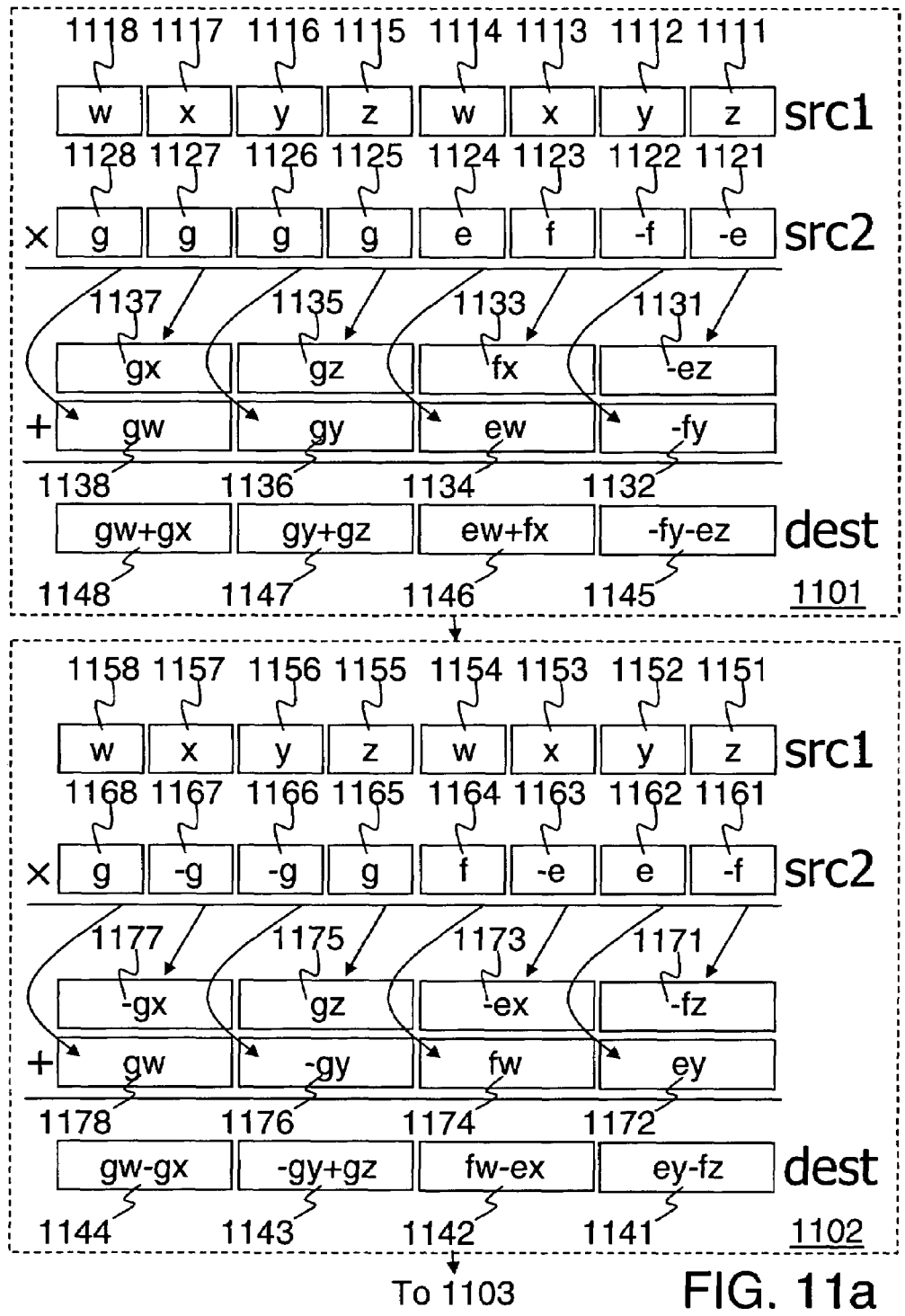
FIGS. 11a-11b illustrate flow diagrams of one embodiment of a process for efficient integer transform processing of content data.
Figure 11B:
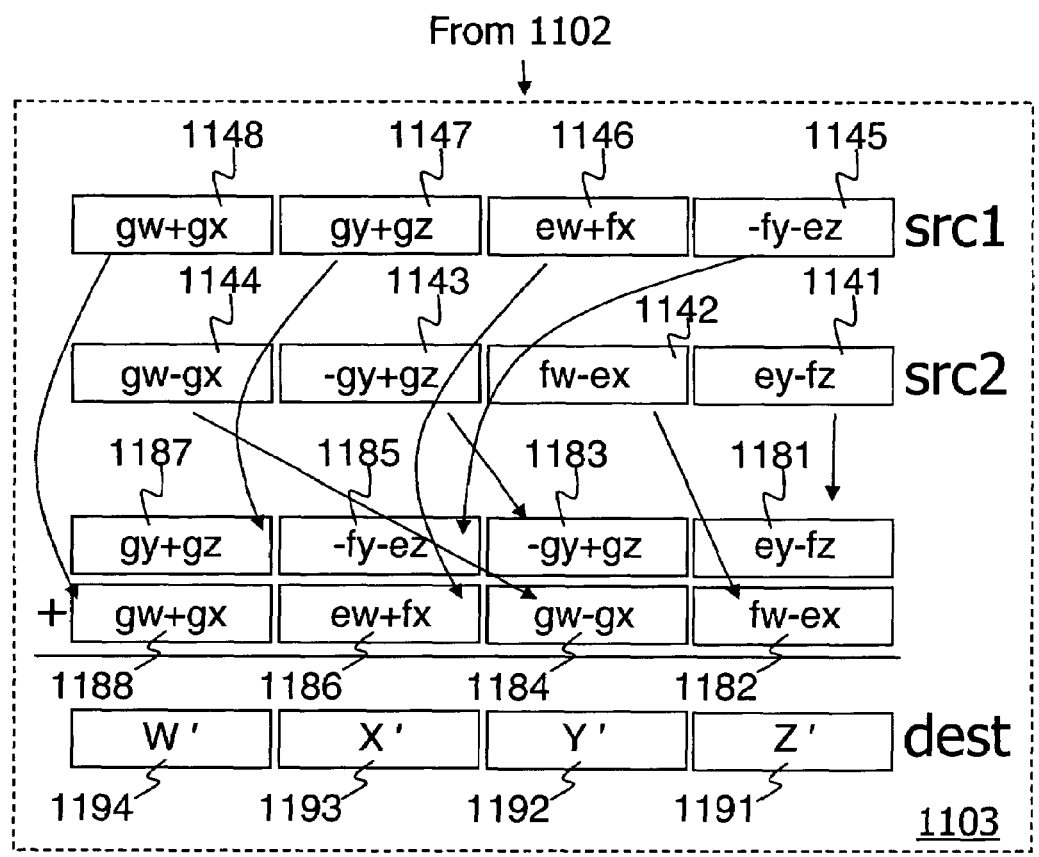

FIGS. 11a-11b illustrate flow diagrams of one embodiment of a process for efficient integer transform processing of content data. For the sake of clarity, examples illustrated in FIGS. 11a-11b, FIG. 12, FIG. 13, and FIGS. 14a-14f show a line of data ordered from left to right consistent with a memory ordering of the content data or the coefficient data. It will be appreciated that some register orderings (for example, little-endian) reverse the in-register ordering of elements (addresses increasing from right to left) with respect to their memory ordering (addresses increasing left to right). Never the less, operations illustrated may be carried out in substantially the same manner. In addition, a register storing one or more lines of packed data may be storing data representing one or more rows and/or one or more columns of data.

In processing block 1101, a multiply-add operation is performed on a line of packed byte data 1111-1118 stored in SRC1 and one or more lines of coefficients 1121-1128 stored in SRC2 to generated 16-bit products 1131-1138 which are summed by pairs to generate 16-bit sums of products 1145-1148 in DEST. In processing block 1102, a second multiply-add operation is performed on the second packed byte data 1151-1158 stored in SRC1 of the second multiply-add, and on coefficients 1161-1168 stored in SRC2 to generated 16-bit products 1171-1178 which are summed by pairs to generate 16-bit sums of products 1141-1144 in DEST. Processing proceeds to processing block 1103 where in one embodiment, a horizontal-add operation is performed to sum the packed 16-bit sums of products 1145-1148 in SRC1 and the packed 16-bit sums of products 1141-1144 in SRC2 by pairs to generate 16-bit sums of products 1191-1194 in DEST of the horizontal-add, in similarity to the process of FIG. 9g, 16-bit sums of products 1191-1194 representing the results of applying a separable 4×4 integer transform to 4 bytes of content data in one dimension. It will be appreciated that multiply-add operations and horizontal-add operations may be applied as shown to 4 bytes of packed content data or may be applied to 8 or 16 or more bytes of packed content data. It will also be appreciated that while the examples illustrated process packed bytes of packed content data, alternative embodiments may process packed 16-bit words of content data some other conveniently chosen quantity of data.

FIG. 12 illustrates a flow diagram of an alternative embodiment of a process for efficient integer transform processing of 8 bytes of packed content data. In processing block 1201, a multiply-add operation is performed on a line of packed byte data 1210 stored in SRC1 and all four lines of packed coefficients 1220 stored in SRC2 to generated 16-bit products that are summed by pairs to generate packed 16-bit sums of products 1241 in DEST. In processing block 1202, a second multiply-add operation is performed on the second packed byte data 1250 stored in SRC1 and packed coefficients 1260 stored in SRC2 to generated 16-bit products that are summed by pairs to generate packed 16-bit sums of products 1242 in DEST of the second multiply-add. Processing proceeds to processing block 1203 where a horizontal-add operation is performed to sum the packed 16-bit sums of products 1141 in SRC1 and the packed 16-bit sums of products 1142 in SRC2 by pairs to generate 16-bit sums of products 1290 in DEST of the horizontal-add, which represent the results of applying a separable 4×4 integer transform to 8 bytes of content data in one dimension. For example, one embodiment of the horizontal-add operation of processing block 1203 sums the packed 16-bit sums of products 1241, fw-ex and ey-fz, in SRC1 of the horizontal-add and the packed 16-bit sums of products 1242, fs-et and eu-fv, in SRC2 of the horizontal-add to generate, respectively, two 16-bit sums of products 1290, Z' and V', in DEST, in similarity to the process of FIG. 9c.

It will be appreciated that saturating multiply-add operations and/or horizontal-add operations may be applied as shown to 8 bytes of packed content data or may be applied to 4 or 16 or more bytes of packed content data. It will also be appreciated that the bytes of content data may be unsigned bytes and that the bytes of coefficient data may be signed bytes. For one embodiment of an integer transform, it may be convenient to arrange the content data in a packed format, using prior art unpacking operations for example, to facilitate efficient processing with multiply-add and horizontal-add operations or to arrange the results in a packed format for further processing and/or for storage in memory. For one alternative embodiment of and integer transform, it may also be convenient to transform an entire block of content data in both the horizontal and the vertical directions without storing temporary results to memory.

Figure 13:
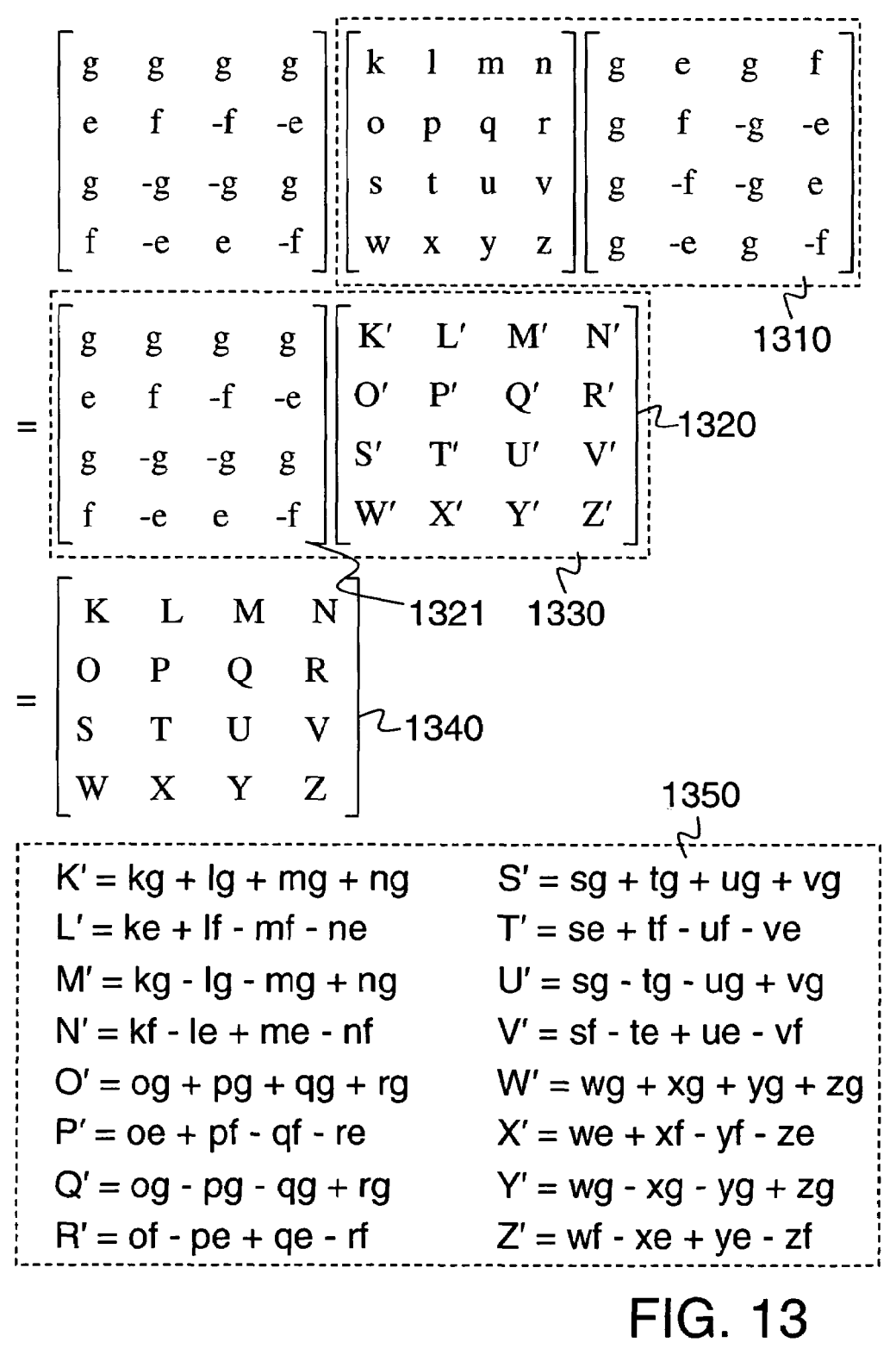

FIG. 13 illustrates one exemplary embodiment of an integer transform for processing of content data. The content data may be expressed as 4×4 matrix, for example a two dimensional array of pixel values may be written as shown in FIG. 13 as follows:

$$D = \begin{bmatrix} k & l & m & n \\ o & p & q & r \\ s & t & u & v \\ w & x & y & z \end{bmatrix}$$

As described above, an integer transform may be expressed as 4×4 matrix of coefficient values, which may be written as follows:

$$T_4 = \begin{bmatrix} g & g & g & g \\ e & f & -f & -e \\ g & -g & -g & g \\ f & -e & e & -f \end{bmatrix}$$

and the integer transform calculation may be expressed as a matrix product of the integer transform matrix, the content matrix and the transpose of the integer transform matrix, written as follows:

$$A = T_4 D T_4^T.$$

This application describes a method and apparatus for including in a processor instructions for performing integer transforms on packed data. One embodiment of an integer transform performs the matrix operations from right to left, computing first the matrix product 1320 from the matrix multiplication 1310 as:

$$B = DT_4^T,$$

and computing next the matrix product 1340 from the matrix multiplication 1330 as:

$$A = T_4 B.$$

For example, a well known set of equations 1350 for computing the elements of the matrix product 1320 are illustrated in FIG. 13. It will be appreciated that the techniques herein described are of a general nature and are applicable to any matrix multiplication or to any chained matrix multiplications and not just integer transforms or those wherein one matrix is the transpose of another matrix.

FIGS. 14a-14f illustrate flow diagrams of another alternative embodiment of a process for efficient integer transform processing 16 bytes of packed content data. In processing block 1401, a multiply-add operation is performed on four lines of packed byte data 1421 stored in SRC1 and a line of packed coefficients 1431 stored in SRC2 to generated 16-bit products that are summed by pairs to generate packed 16-bit sums of products 1441 in DEST. In processing block 1402, a second multiply-add operation is performed on the packed byte data 1451 stored in SRC1 and another line of packed coefficients 1461 stored in SRC2 to generated 16-bit products that are summed by pairs to generate packed 16-bit sums of products 1442 in DEST of the second multiply-add operation. Processing proceeds to processing block 1403 where a horizontal-add operation is performed to sum the packed 16-bit sums of products 1441 in SRC1 and the packed 16-bit sums of products 1442 in SRC2 by pairs to generate 16-bit sums of products 1491 in DEST in similarity to the process of FIG. 9c, 16-bit sums of products 1491 representing half the results of applying a separable 4×4 integer transform to 16 bytes of content data in a first dimension.

In processing block 1404, a third multiply-add operation is performed on packed byte data 1422 stored in SRC1 and packed coefficients 1432 stored in SRC2 to generated 16-bit products that are summed by pairs to generate packed 16-bit sums of products 1443 in DEST of the third multiply-add. In processing block 1405, a fourth multiply-add operation is performed on the packed byte data 1452 stored in SRC1 and packed coefficients 1462 stored in SRC2 to generated 16-bit products that are summed by pairs to generate packed 16-bit sums of products 1444 in DEST of the fourth multiply-add. Processing proceeds to processing block 1406 where a second horizontal-add operation is performed to sum the packed 16-bit sums of products 1443 in SRC1 and the packed 16-bit sums of products 1444 in SRC2 by pairs to generate 16-bit sums of products 1492 in DEST representing the other half of the results of applying a separable 4×4 integer transform to 16 bytes of content data in the first dimension.

It will be appreciated that upon completion of one embodiment of a 4×4 integer transform of content data in the first dimension, the results 1491 and 1492 may be arranged in column order to facilitate applying the separable 4×4 integer transform in the second dimension.

Figure 14B:
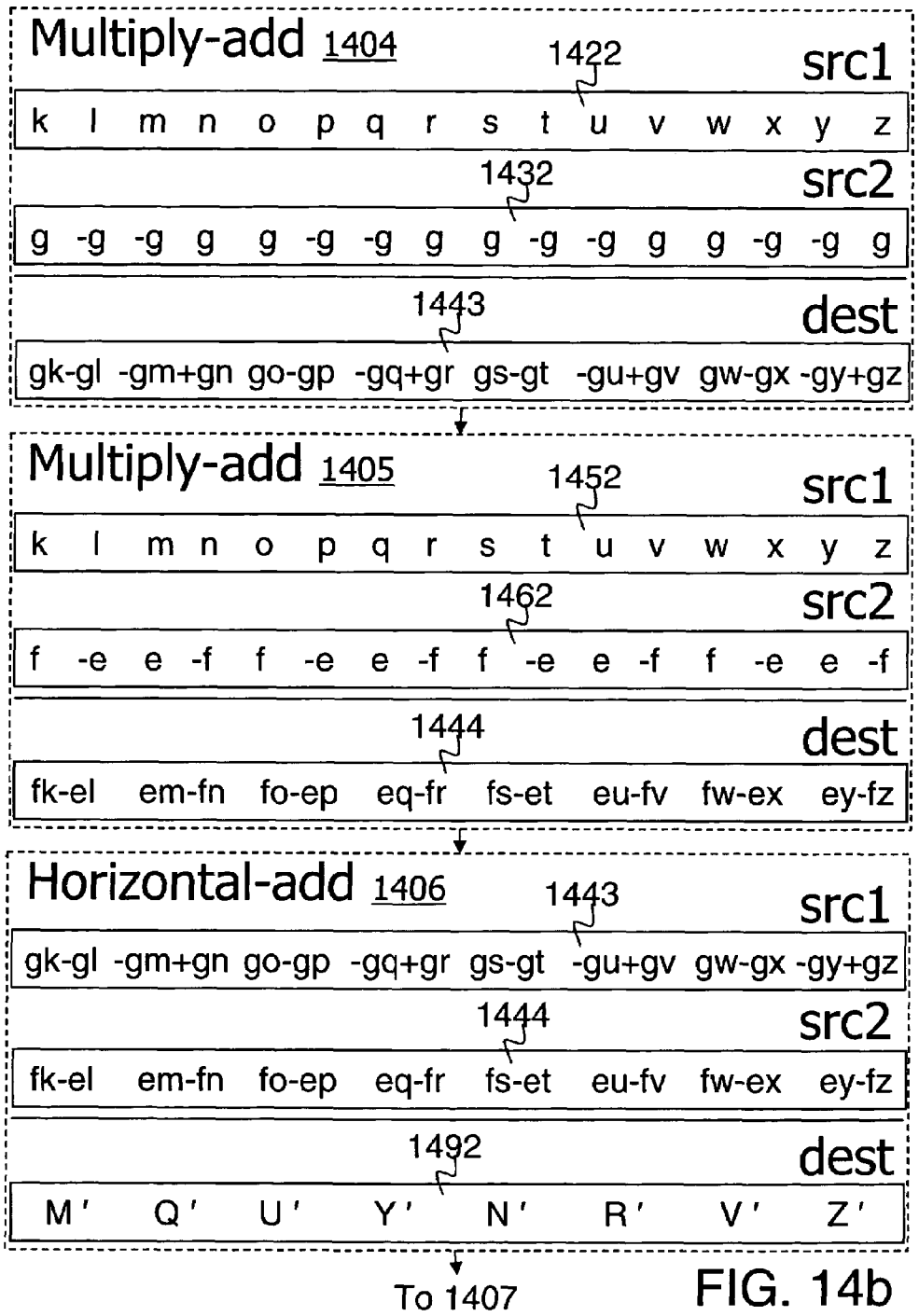
Figure 14C:
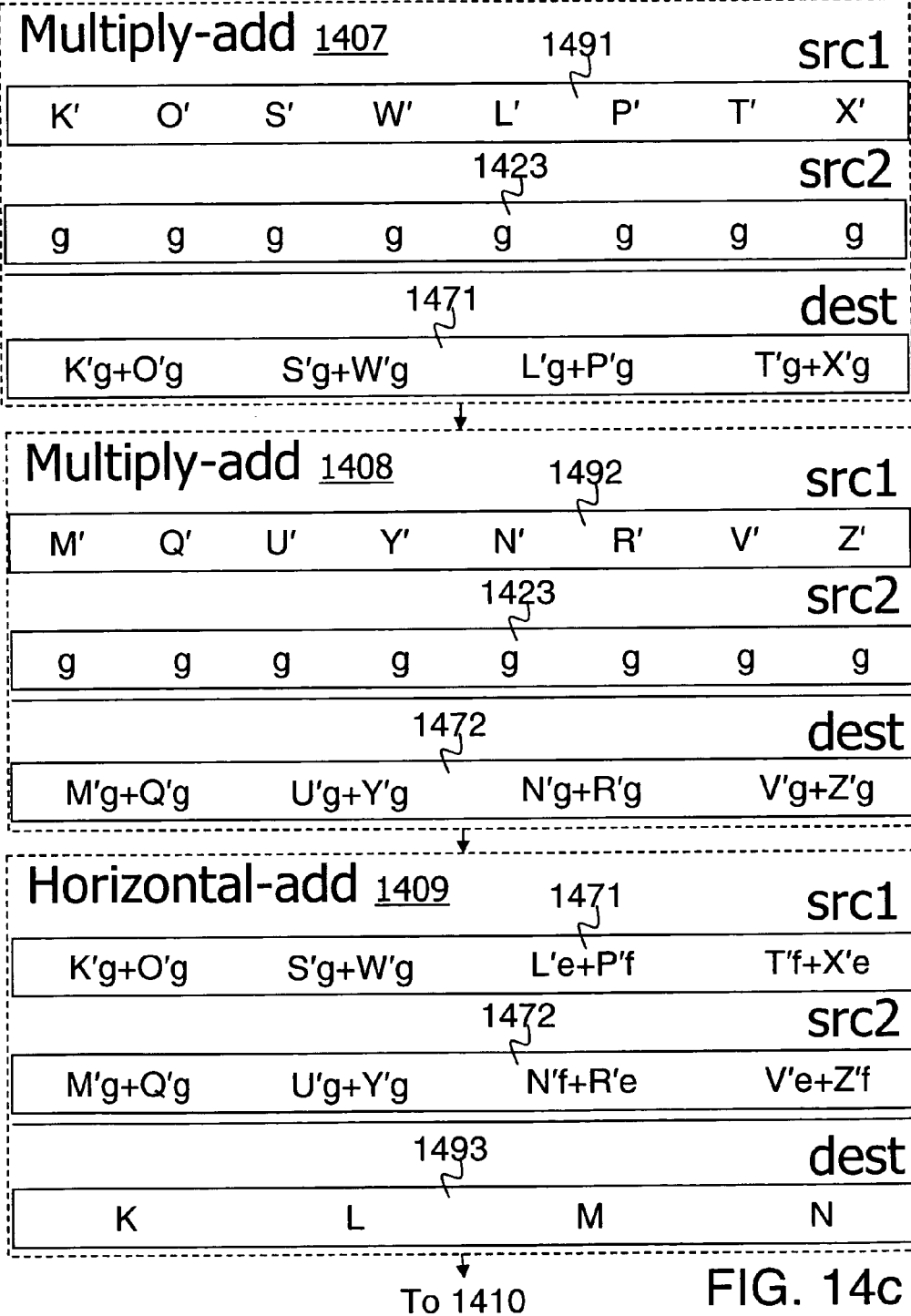
Figure 14D:
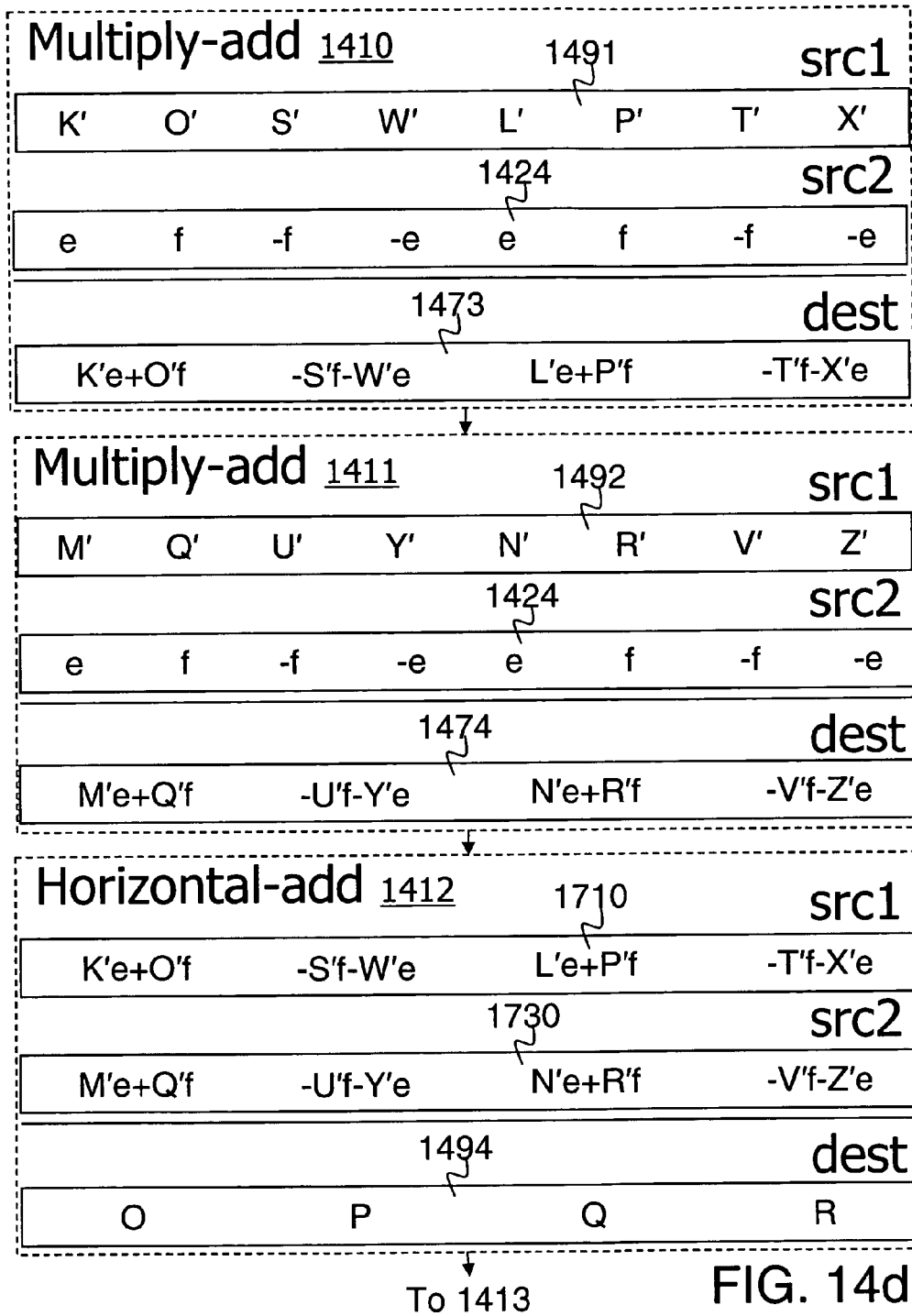
Figure 14E:
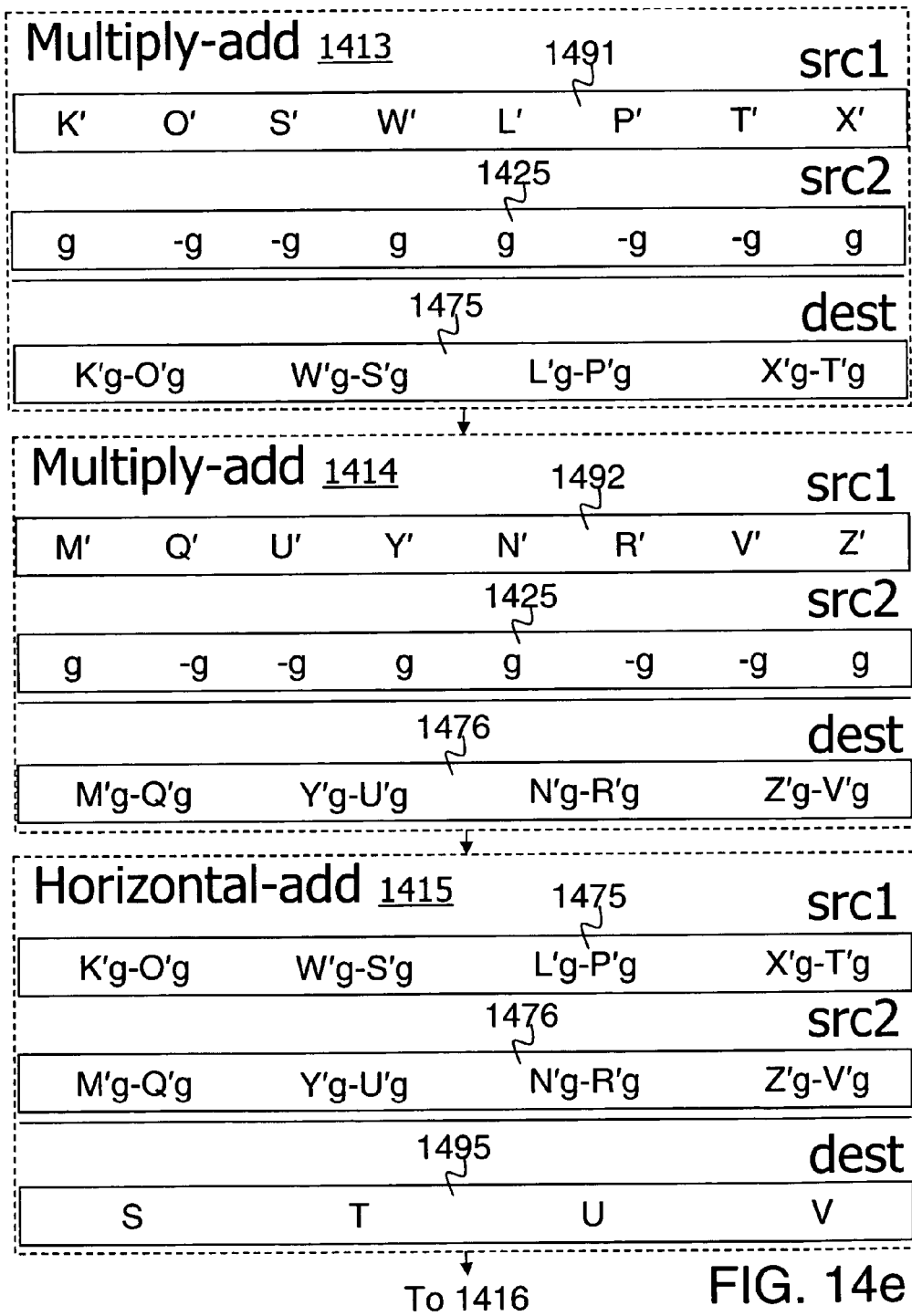
Figure 14F:
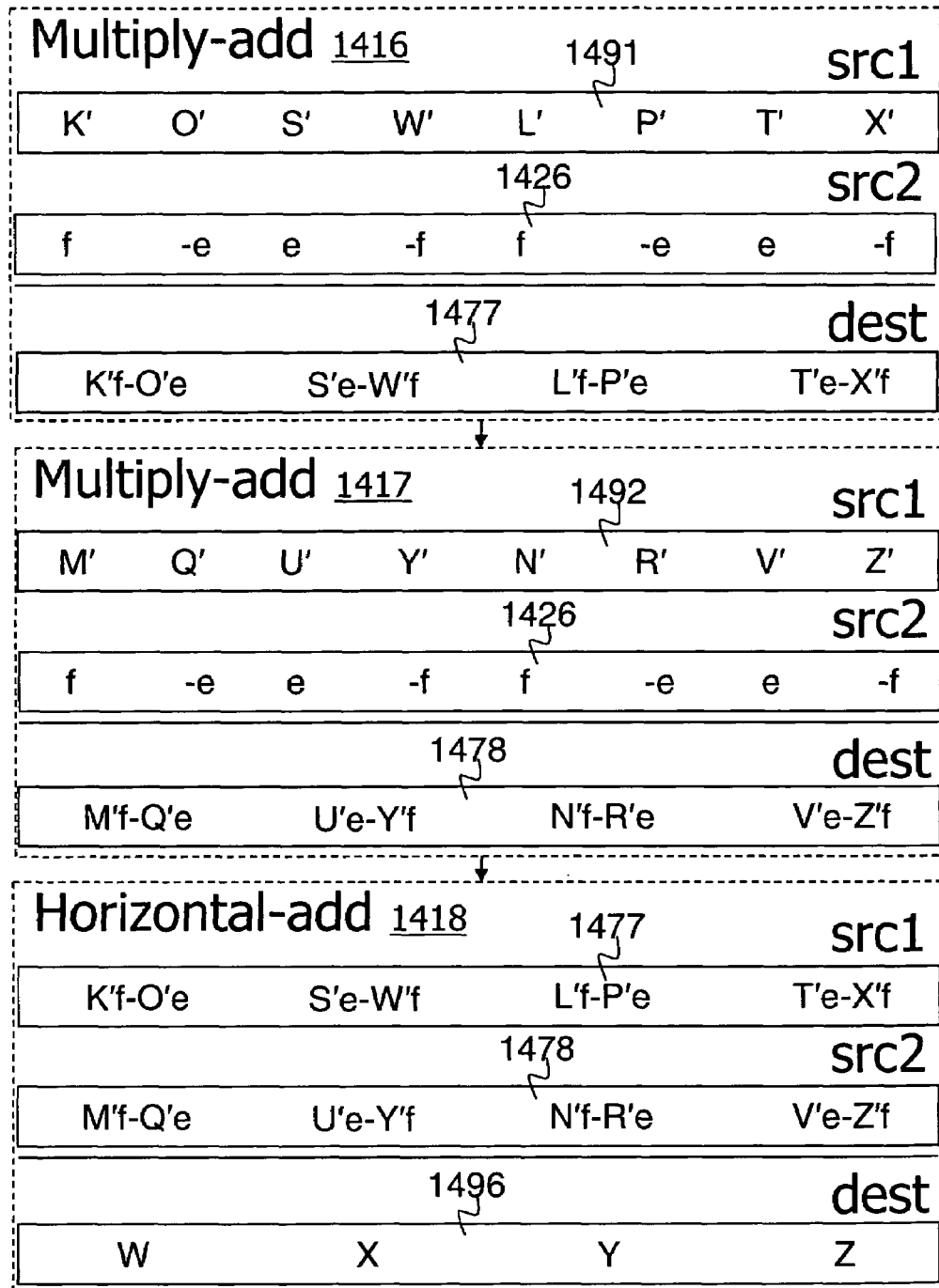

In FIG. 14c processing optionally proceeds to processing block 1407, where a fifth multiply-add operation is performed on two lines of packed 16-bit data 1491 stored in SRC1 and a line of packed coefficients 1423 stored in SRC2 to generated 32-bit products that are summed by pairs to generate packed 32-bit sums of products 1471 in DEST of the fifth multiply-add. In processing block 1408, a sixth multiply-add operation is performed on two more lines of the packed 16-bit data 1492 stored in SRC1 and packed coefficients 1423 stored in SRC2 to generated 32-bit products that are summed by pairs to generate packed 32-bit sums of products 1472 in DEST of the sixth multiply-add. Processing proceeds to processing block 1409 where a third horizontal-add operation is performed to sum the packed 32-bit sums of products 1471 in SRC1 and the packed 32-bit sums of products 1472 in SRC2 by pairs to generate 16-bit sums of products 1493 in DEST representing one fourth of the results of applying a separable 4×4 integer transform to 16 bytes of content data in the second dimension.

Processing proceeds to processing block 1410, where a seventh multiply-add operation is performed on packed 16-bit data 1491 stored in SRC1 and packed coefficients 1424 stored in SRC2 to generated 32-bit products that are summed by pairs to generate packed 32-bit sums of products 1473 in DEST of the seventh multiply-add. In processing block 1411, a eighth multiply-add operation is performed on the packed 16-bit data 1492 stored in SRC1 and packed coefficients 1424 stored in SRC2 to generated 32-bit products that are summed by pairs to generate packed 32-bit sums of products 1474 in DEST of the eighth multiply-add. Processing proceeds to processing block 1412 where a fourth horizontal-add operation is performed to sum the packed 32-bit sums of products 1473 in SRC1 and the packed 32-bit sums of products 1474 in SRC2 by pairs to generate 32-bit sums of products 1494 in DEST representing two fourths of the results of applying a separable 4×4 integer transform to 16 bytes of content data in the second dimension.

Processing proceeds to processing block 1413, where a ninth multiply-add operation is performed on packed 16-bit data 1491 stored in SRC1 and packed coefficients 1425 stored in SRC2 to generated 32-bit products that are summed by pairs to generate packed 32-bit sums of products 1475 in DEST of the ninth multiply-add. In processing block 1414, a tenth multiply-add operation is performed on the packed 16-bit data 1492 stored in SRC1 and packed coefficients 1425 stored in SRC2 to generated 32-bit products that are summed by pairs to generate packed 32-bit sums of products 1476 in DEST of the tenth multiply-add. Processing proceeds to processing block 1415 where a fifth horizontal-add operation is performed to sum the packed 32-bit sums of products 1475 in SRC1 and the packed 32-bit sums of products 1476 in SRC2 by pairs to generate 32-bit sums of products 1495 in DEST representing three fourths of the results of applying a separable 4×4 integer transform to 16 bytes of content data in the second dimension.

Processing proceeds to processing block 1416, where a eleventh multiply-add operation is performed on packed 16-bit data 1491 stored in SRC1 and packed coefficients 1426 stored in SRC2 to generated 32-bit products that are summed by pairs to generate packed 32-bit sums of products 1477 in DEST of the eleventh multiply-add. In processing block 1417, a twelfth multiply-add operation is performed on the packed 16-bit data 1492 stored in SRC1 and packed coefficients 1426 stored in SRC2 to generated 32-bit products that are summed by pairs to generate packed 32-bit sums of products 1478 in DEST of the twelfth multiply-add. Processing proceeds to processing block 1418 where a sixth horizontal-add operation is performed to sum the packed 32-bit sums of products 1477 in SRC1 and the packed 32-bit sums of products 1478 in SRC2 by pairs to generate 32-bit sums of products 1496 in DEST completing the results of applying a 4×4 integer transform to 16 bytes of content data in the second dimension.

Figure 15A:
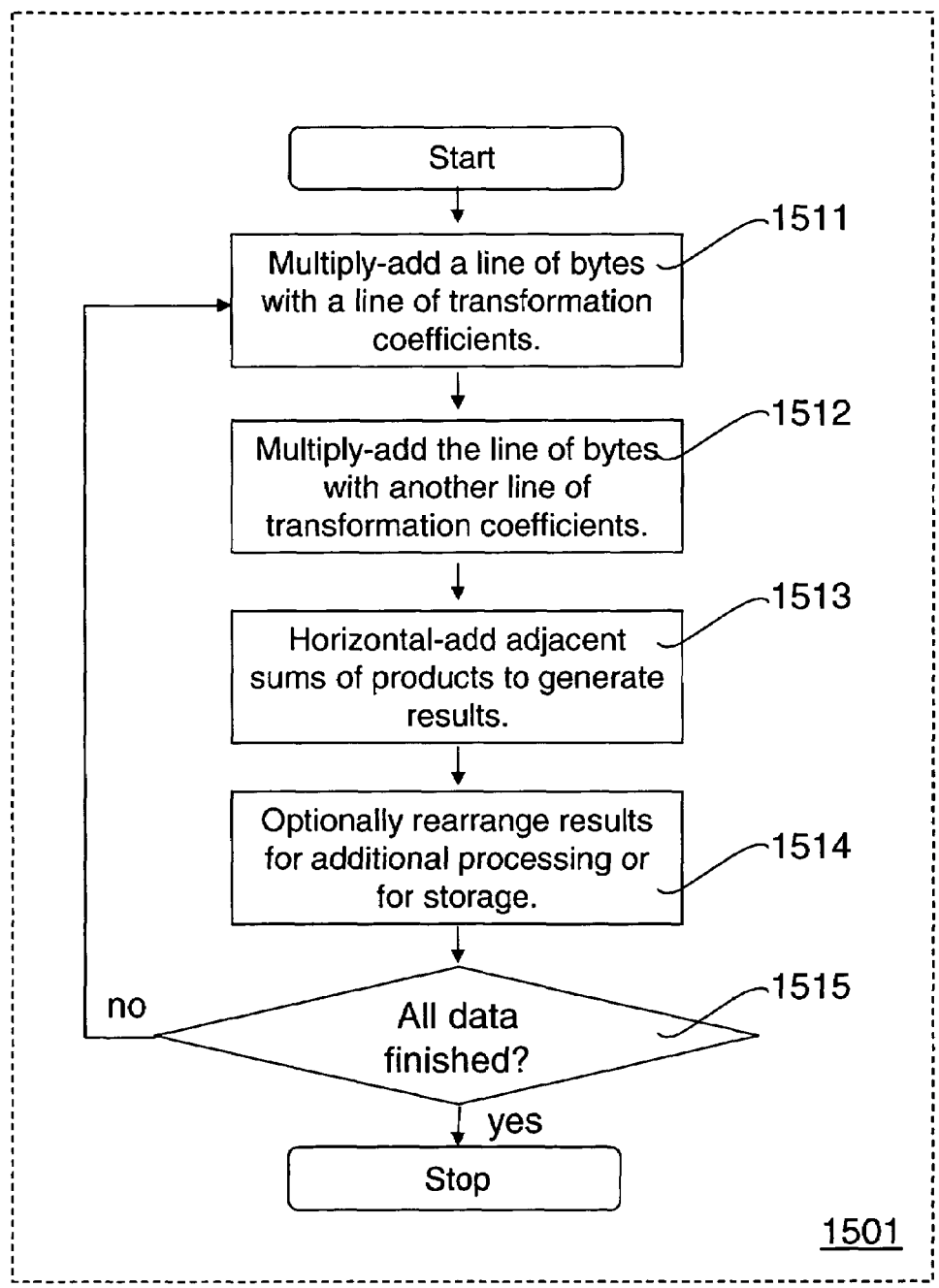
FIGS. 15a-15c illustrate flow diagrams of alternative embodiments of processes for efficient integer transform processing of content data.

FIG. 15*a* illustrates a flow diagram for one alternative embodiment of a process 1501 for efficient integer transform processing of content data in accordance with FIGS. 1*a*-1*b* and with FIGS. 14*a*-14*b*. In processing block 1511, a multiply-add operation is performed on a first line of packed byte data and a first line of packed transform coefficients to generated an intermediate data including packed sums of products. In processing block 1512 a second multiply-add operation is performed on the first line of packed byte data and a second line of packed transform coefficients to generate another intermediate data including packed sums of products. In processing block 1513, a horizontal-add operation is performed on the sums of products of the intermediate data to generate a plurality of packed results. In processing block 1514, the results may optionally be rearranged for further processing or for storage to memory. In processing block 1515, a test is performed to determine if all the lines of data have been processed, and if so processing terminates. Otherwise, processing repeats at processing block 1511.

Figure 15B:
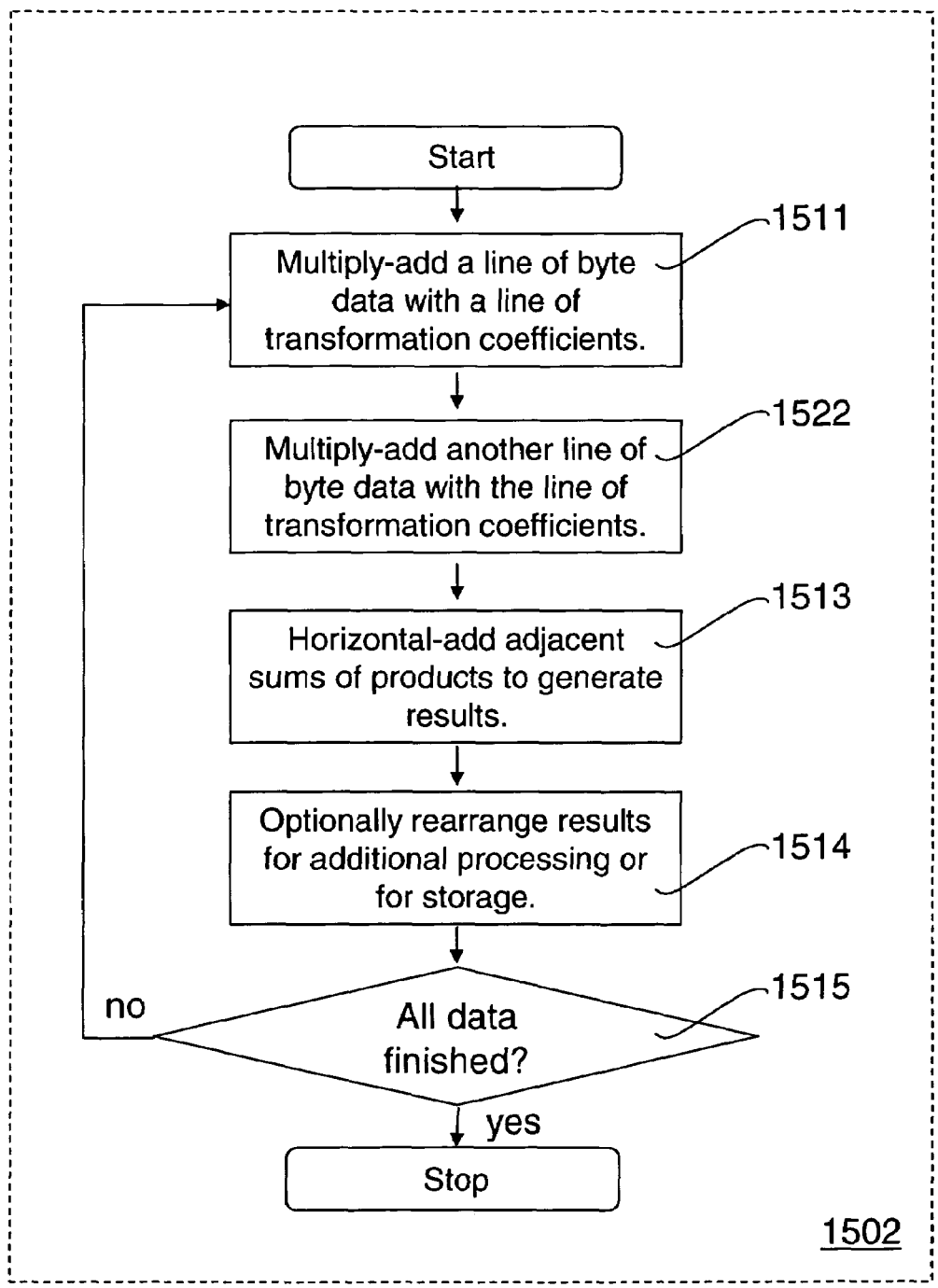

FIG. 15*b* illustrates a flow diagram for another alternative embodiment of a process 1501 for efficient integer transform processing of content data in accordance with FIG. 12. In processing block 1511, a multiply-add operation is performed on a first line of packed byte data and a first line of packed transform coefficients to generated an intermediate data including packed sums of products. In processing block 1522 a second multiply-add operation is performed on a second line of packed byte data and the line of packed transform coefficients to generate another intermediate data including packed sums of products. In processing block 1513, a horizontal-add operation is performed on the sums of products of the intermediate data to generate a plurality of packed results. In processing block 1514, the results may optionally be rearranged for further processing or for storage to memory. In processing block 1515, a test is performed to determine if all the lines of data have been processed, and if so processing terminates. Otherwise, processing repeats at processing block 1511.

Figure 15C:
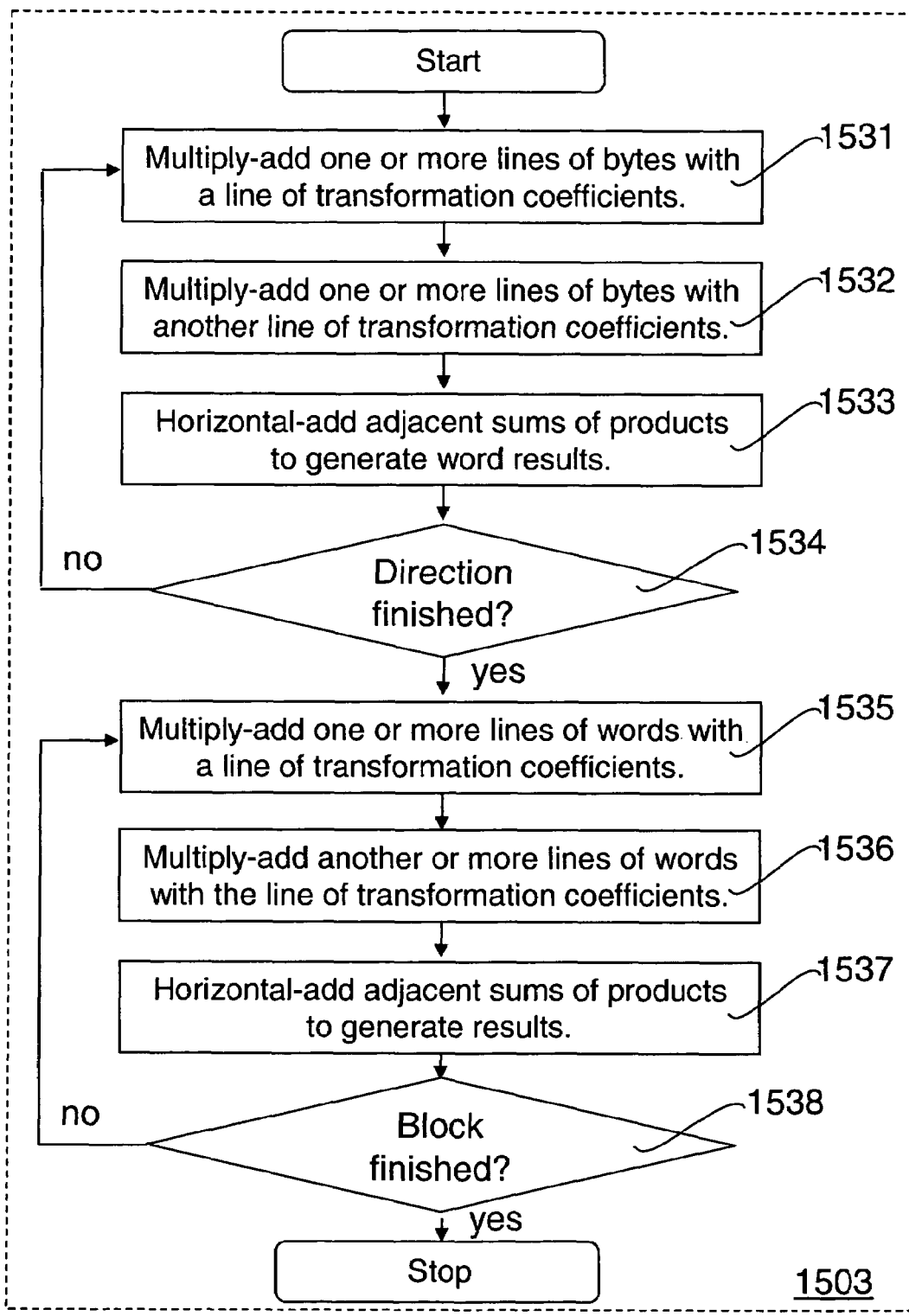

FIG. 15*c* illustrates a flow diagram for another alternative embodiment of a process 1503 for efficient integer transform processing of content data in accordance with FIG. 14*a*-14*f*. In processing block 1531, a multiply-add operation is performed on one or more lines of packed byte data and a first line of packed transform coefficients to generated an intermediate data including packed sums of products. In processing block 1532 a second multiply-add operation is performed on one or more lines of packed byte data and another line of packed transform coefficients to generate another intermediate data including packed sums of products. In processing block 1533, a horizontal-add operation is performed on the sums of products of the intermediate data to generate a plurality of packed word results. In processing block 1534, a test is performed to determine if all word results of a first direction have been produced, and if so processing proceeds in processing block 1535. Otherwise, processing repeats at processing block 1531. In processing block 1535, a multiply-add operation is performed on one or more lines of packed word data and a line of packed transform coefficients to generated an intermediate data including packed sums of products. In processing block 1536 a second multiply-add operation is performed on another or more lines of packed word data and the line of packed transform coefficients to generate another intermediate data including packed sums of products. In processing block 1537, a horizontal-add operation is performed on the sums of products of the intermediate data to generate a plurality of packed results. In processing block 1538, a test is performed to determine if all results of the block of content data have been produced, and if so processing terminates.

Otherwise, processing repeats at processing block 1535.

While the invention has been described in terms of several embodiments, those skilled in the art will recognize that the invention is not limited to the embodiments described. For example, numerous alternative orderings of content data and of area coefficients may be employed to effectively use the multiply-add instructions and the horizontal-add instructions for performing integer transforms of content data. The description is thus to be regarded as illustrative instead of limiting on the invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims.

What is claimed is:

1. A machine-readable medium comprising one or more selected from a group consisting of floppy diskettes, optical disks, Compact Disc Read-Only Memories (CD-ROMs), magneto-optical disks, Read-Only Memories (ROMs), Random Access Memories (RAMs), Erasable Programmable Read-Only Memories (EPROMs), Electrically Erasable Programmable Read-Only Memories (EEPROMs), magnetic cards, optical cards, and flash memory, said medium including a plurality of instructions for transforming one of audio content data and image content data of one of a still a video image, said instructions, when accessed by one or more machines, causes said one or more machines to:

multiply-add a first line of packed byte content data with a first line of packed transform coefficients with a packed multiply-add circuit of the one or more machines, the packed multiply-add circuit responsive to a first instruction of the plurality, to generate a first intermediate packed data including a first sum of products and a second sum of products; and horizontal-add the first sum of products and the second sum of products with circuitry of the one or more machines that is responsive to a second instruction of the plurality to generate a first transformed content result of a first plurality of packed results.

2. The machine-readable medium of claim 1 wherein the instructions, when accessed by said one or more machines, cause said one or more machines to:

multiply-add a second line of packed byte content data with the first line of the packed transform coefficients to generate a second intermediate packed data including a third sum of products and a fourth sum of products; and horizontal-add the third sum of products and the fourth sum of products to generate a second transformed content result of the first plurality of the packed results.

3. The machine-readable medium of claim 1 further including instructions that, when accessed by said one or more machines, cause said one or more machines to:

multiply-add the first line of the packed byte content data with a second line of packed transform coefficients to generated a second intermediate packed data including a third sum of products and a fourth sum of products; and horizontal-add the third sum of products and the fourth sum of products to generate a second transformed content result of the first plurality of the packed results.

4. The machine-readable medium of claim 1 wherein the first instruction when accessed by said one or more machines, causes said one or more machines to treat elements of the first line of packed byte content data as unsigned bytes in generating the first and second sums of products of the first intermediate packed data.

5. The machine-readable medium of claim 4 wherein the first instruction, when accessed by said one or more machines, causes said one or more machines to treat elements of the first line of packed transform coefficients as signed bytes in generating the first and second sums of products of the first intermediate packed data.

6. The machine-readable medium of claim 5 wherein the second instruction, when accessed by said one or more machines, causes said one or more machines to treat elements of the first intermediate packed data as signed 16-bit words in generating the first transformed content result and to horizontal-add the first and second sums of products using saturation.

7. The machine-readable medium of claim 1 including data that, when accessed by said one or more machines, causes said one or more machines to overwrite the first line of packed byte data with a second intermediate packed data and to overwrite the second intermediate packed data with the first plurality of packed results.

8. A method in a processor for transforming one of audio content data and image content data of one of a still image and a video image, the method comprising:

decoding with a decoder of the processor a first multiply-add instruction, a second multiply-add instruction and a horizontal-add instruction, each of an instruction format to specify a first operand and a second operand;

responsive to said first multiply-add instruction, accessing from a first register that is specified by the first multiply-add instruction a first packed data including $a_1$, $a_2$, $a_3$ and $a_4$ byte content data elements, and accessing from a second register that is specified by the first multiply-add instruction a second packed data including $b_1$, $b_2$, $b_3$ and $b_4$ byte data elements, performing with a packed multiply-add circuit of the processor an operation $(a_1 \times b_1) + (a_2 \times b_2)$ to generate a 16-bit data element $e_1$ of a third packed data, performing an operation $(a_3 \times b_3) + (a_4 \times b_4)$ to generate a 16-bit data element $e_2$ of the third packed data;

responsive to said second multiply-add instruction, wherein said second multiply-add instruction specifies a fourth packed data including $c_1$, $c_2$, $c_3$ and $c_4$ byte content data elements, and a fifth packed data including $d_1$, $d_2$, $d_3$ and $d_4$ byte data elements, performing an operation $(c_1 \times d_1) + (c_2 \times d_2)$ to generate a 16-bit data element $f_1$ of a sixth packed data, performing an operation $(c_3 \times d_3) + (c_4 \times d_4)$ to generate a 16-bit data element $f_2$ of the sixth packed data; and responsive to said horizontal-add instruction, wherein said horizontal-add instruction specifies the third packed data and the sixth packed data, performing an operation $(e_1 + e_2)$ to generate a transformed content data element $g_1$ of a seventh packed data, performing an operation $(f_1 + f_2)$ to generate a transformed content data element $g_2$ of the seventh packed data.

9. The method of claim 8 wherein elements of the first and fourth packed data are treated as unsigned bytes.

10. The method of claim 9 wherein elements of the second and fifth packed data are treated as signed bytes.

11. A method in a processor for transforming one of audio content data and image content data of one of a still image and a video image, the method comprising:

decoding with a decoder of the processor a multiply-add instruction and a horizontal-add instruction, both of a variable length instruction format comprising at least an opcode field, a first source field and a second source field, said first and second source fields of the multiply-add instruction respectively indicating a first operand having a first plurality of byte content data elements including at least A1, A2, A3, and A4 byte content data elements, and a second operand having a second plurality of byte data elements including at least B1, B2, B3, and B4 byte data elements;

responsive to decoding said multiply-add instruction, performing with a first circuit of the processor the operation (A1×B1)+(A2×B2) to generate a first 16-bit data element of a first packed data, and performing the operation (A3×B3)+(A4×B4) to generate a second 16-bit data element of the first packed data; and responsive to said horizontal-add instruction, adding with a second circuit of the processor the first and second 16-bit data elements of the first packed data to generate a third 16-bit data element and storing the third 16-bit data element as one of a plurality of transformed content data elements of a packed result.

12. The method of claim 11, said first plurality of byte content data elements including at least 16 byte content data elements and said second plurality of data elements including at least 16 byte data elements.

13. The method of claim 11, said first plurality of byte content data elements further including at least A5, A6, A7, and A8 as byte content data elements, and said second plurality of data elements further including at least B5, B6, B7, and B8 as data elements, the method further comprising:

responsive to an opcode field of the multiply-add instruction, enabling an execution unit with the decoded multiply-add instruction to perform the operation (A5×B5)+(A6×B6) to generate a third 16-bit data element of the first packed data, and to perform the operation (A7×B7)+(A8×B8) to generate a fourth 16-bit data element of the first packed data.

14. An apparatus to perform the method of claim 13 comprising:

an operation control unit; and a machine-accessible medium including data that, when accessed by said operation control unit responsive to an opcode field, causes the execution unit to perform the method of claim 13.

15. The method of claim 13 wherein said first source field comprises bits five through three of the variable length instruction format.

16. The method of claim 15 wherein said second source field comprises bits two through zero of the variable length instruction format.

17. The method of claim 16 wherein said first plurality of byte data elements is overwritten by said packed result data responsive to the multiply-add instruction.

18. The method of claim 11 wherein said first plurality of content data elements are treated as unsigned bytes.

19. The method of claim 18 wherein said second plurality of data elements are treated as signed bytes.

20. The method of claim 19 wherein each of said first, second, third and fourth 16-bit data elements are generated using signed saturation.

21. An apparatus to perform the method of claim 11 comprising:

at least one state machine; and a machine-accessible medium including data that, when accessed by said at least one state machine, causes said at least one state machine to enable the first and second circuits to perform the method of claim 11.

* * * * *